United States Patent
Suito et al.

(10) Patent No.: US 10,532,907 B2
(45) Date of Patent: *Jan. 14, 2020

(54) ADHESIVE TAPE CARTRIDGE, ADHESIVE TAPE ROLL, AND MANUFACTURING METHOD OF ADHESIVE TAPE ROLL

(71) Applicant: Brother Kogyo Kabushiki Kaisha, Nagoya-shi, Aichi-ken (JP)

(72) Inventors: Yoshikatsu Suito, Nagoya (JP); Chie Nakashima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/719,910

(22) Filed: Sep. 29, 2017

(65) Prior Publication Data

US 2018/0094170 A1    Apr. 5, 2018

(30) Foreign Application Priority Data

Sep. 30, 2016   (JP) .................................. 2016-195291

(51) Int. Cl.
*B65H 35/00*   (2006.01)
*B41J 15/04*   (2006.01)
(Continued)

(52) U.S. Cl.
CPC ........ *B65H 35/0026* (2013.01); *B41J 15/044* (2013.01); *B41J 3/4075* (2013.01);
(Continued)

(58) Field of Classification Search
CPC ....... C09J 7/385; C09J 7/38; C09J 7/30; C09J 7/0296; C09J 7/0246; C09J 2203/334; B41J 3/4075; B41J 15/044
See application file for complete search history.

(56) References Cited

U.S. PATENT DOCUMENTS

| 4,436,377 | A | * | 3/1984 | Miller | .................. | G02B 5/0242 |
|   |   |   |   |   |   | 283/91 |
| 6,503,620 | B1 | * | 1/2003 | Xie | .......................... | B32B 7/06 |
|   |   |   |   |   |   | 428/354 |

(Continued)

FOREIGN PATENT DOCUMENTS

| DE | 102009046625 A1 | 5/2011 |
| EP | 1803575 A1 | 7/2007 |

(Continued)

OTHER PUBLICATIONS

Katakura et al. "JP 2002-194301, machine translation", published Jul. 10, 2002.*

(Continued)

*Primary Examiner* — Alex B Efta
(74) *Attorney, Agent, or Firm* — Banner & Witcoff, Ltd.

(57) ABSTRACT

An adhesive tape cartridge can include an adhesive tape roll that winds a double-faced adhesive tape. The double-faced adhesive tape includes a base material layer, a first adhesive layer, a second adhesive layer, a third adhesive layer, and a separation material layer. The first adhesive layer is disposed on one side of the base material layer and includes an adhesive with a first pigment added. The second adhesive layer is disposed on the one side of the first adhesive layer and includes an adhesive with a second pigment added. The third adhesive layer is disposed on the other side of the base material layer. The separation material layer is disposed on the other side of the third adhesive layer. A volume ratio of the first pigment in the first adhesive layer is greater than a volume ratio of the second pigment in the second adhesive layer.

9 Claims, 46 Drawing Sheets

(51) Int. Cl.
  *B41J 3/407* (2006.01)
  *C09J 7/38* (2018.01)
  *C09J 7/30* (2018.01)
  *C09J 7/20* (2018.01)
  *C09J 7/22* (2018.01)

(52) U.S. Cl.
  CPC .. *C09J 7/30* (2018.01); *C09J 7/38* (2018.01); *C09J 7/385* (2018.01); *C09J 2201/36* (2013.01); *C09J 2203/102* (2013.01); *C09J 2203/334* (2013.01)

(56) References Cited

U.S. PATENT DOCUMENTS

| | | | |
|---|---|---|---|
| 7,656,298 B2* | 2/2010 | Nagae | G06K 19/07718 340/572.1 |
| 2006/0025609 A1* | 2/2006 | Hutchenson | B01J 27/24 549/263 |
| 2007/0252704 A1* | 11/2007 | Nagae | G06K 19/041 340/572.8 |
| 2008/0084274 A1* | 4/2008 | Ohashi | G06K 19/07718 340/10.1 |
| 2009/0129844 A1* | 5/2009 | Yamada | B41J 15/044 400/241 |
| 2012/0135175 A1* | 5/2012 | Servida | C09J 7/0246 428/41.7 |
| 2014/0210935 A1* | 7/2014 | Norimatsu | C09J 201/00 347/214 |

FOREIGN PATENT DOCUMENTS

| | | |
|---|---|---|
| JP | 2002194301 A * | 7/2002 |
| JP | 2013-082789 A | 5/2013 |

OTHER PUBLICATIONS

H.B. Fuller, "HM-1591 Technical Data Sheet" published Apr. 17, 2003.*

Jan. 31, 2018—(EP) Extended Search Report—App 17193274.2.

* cited by examiner

[FIG. 1]
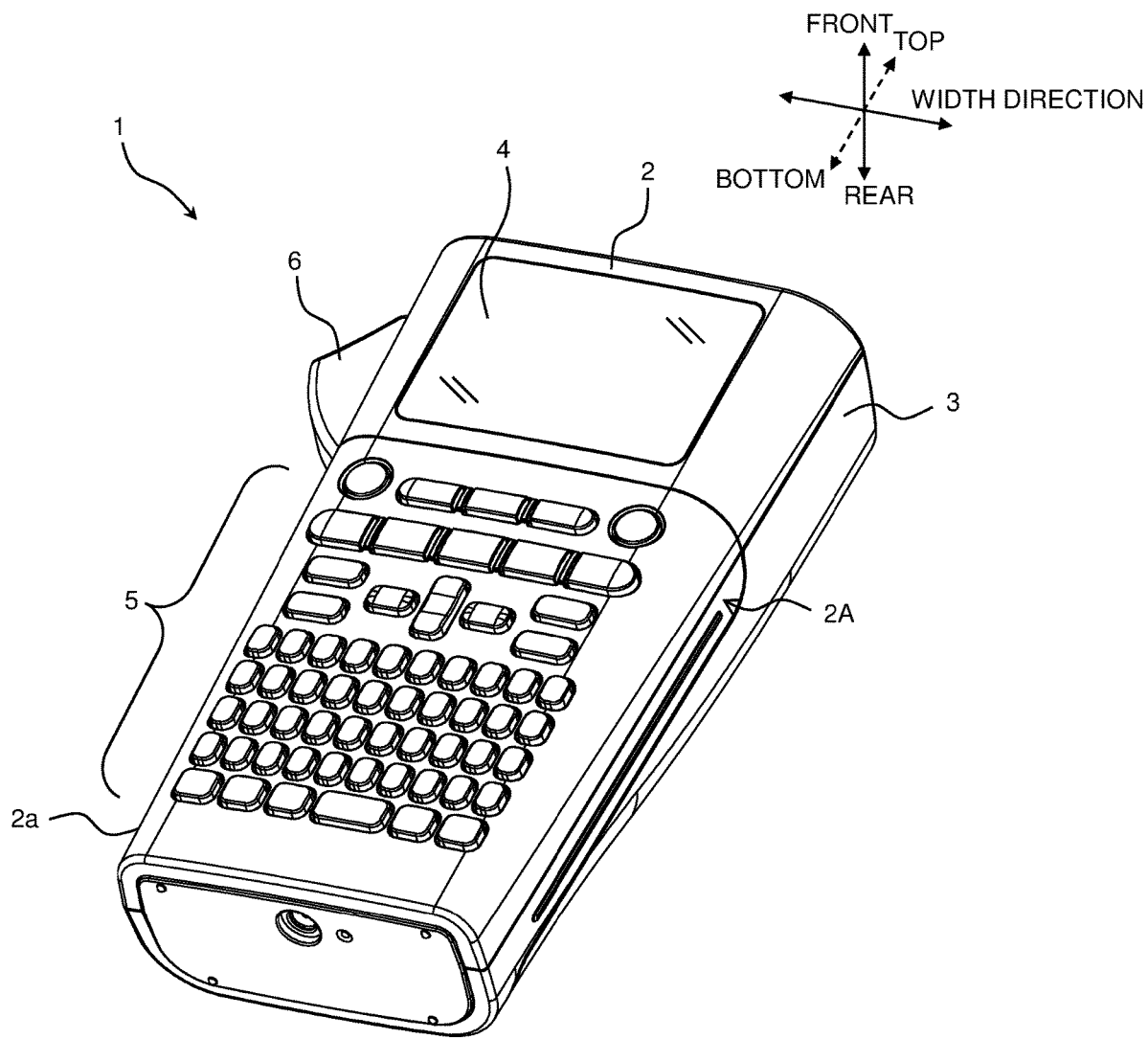

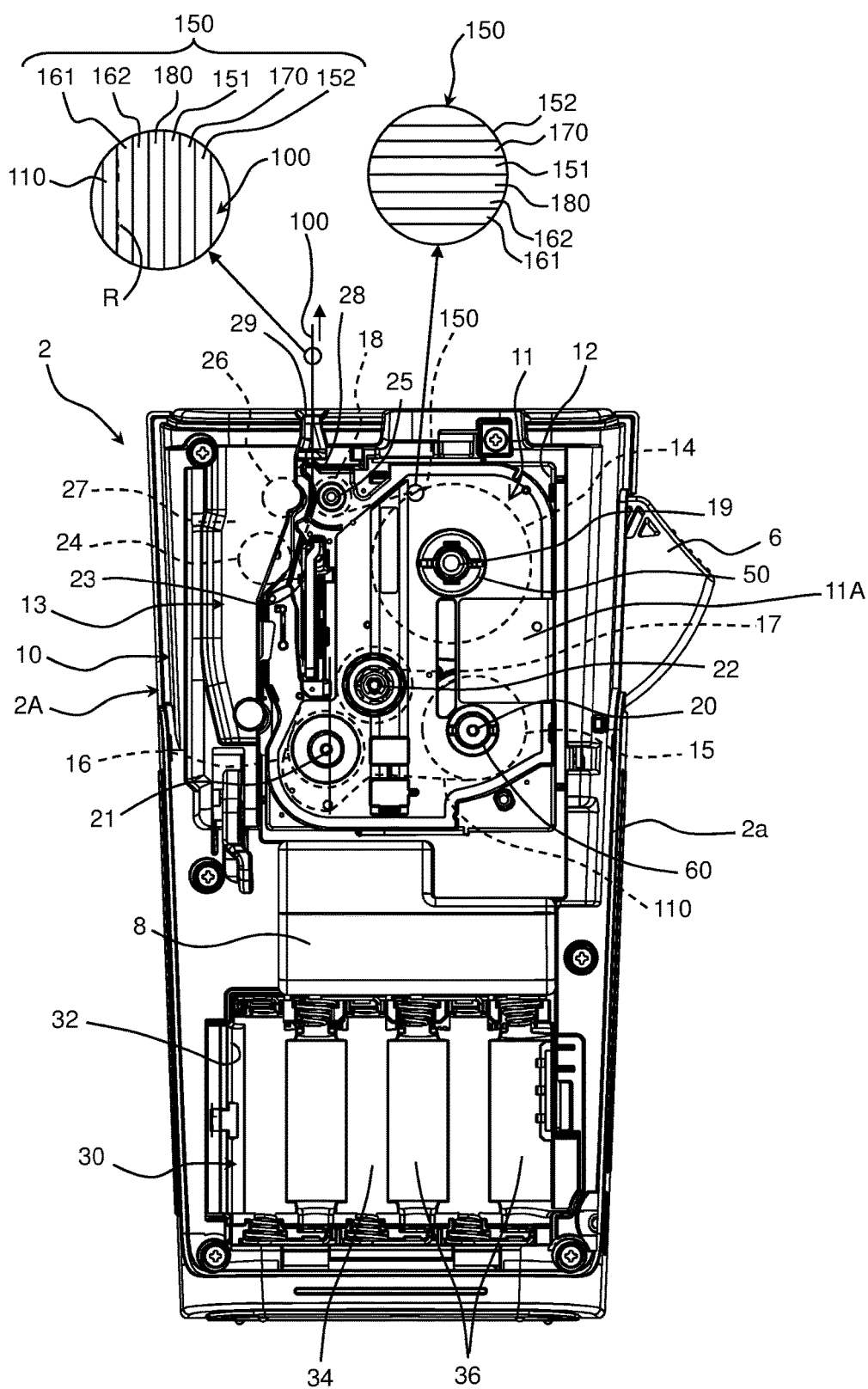

[FIG. 3]
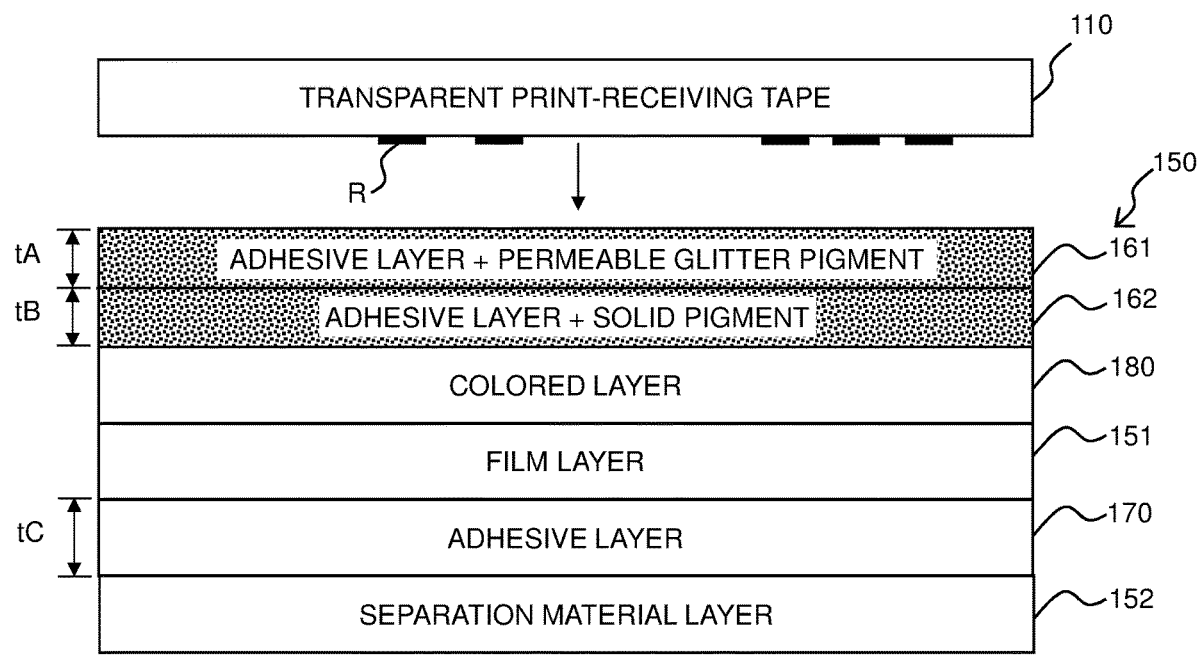

[FIG. 4A]
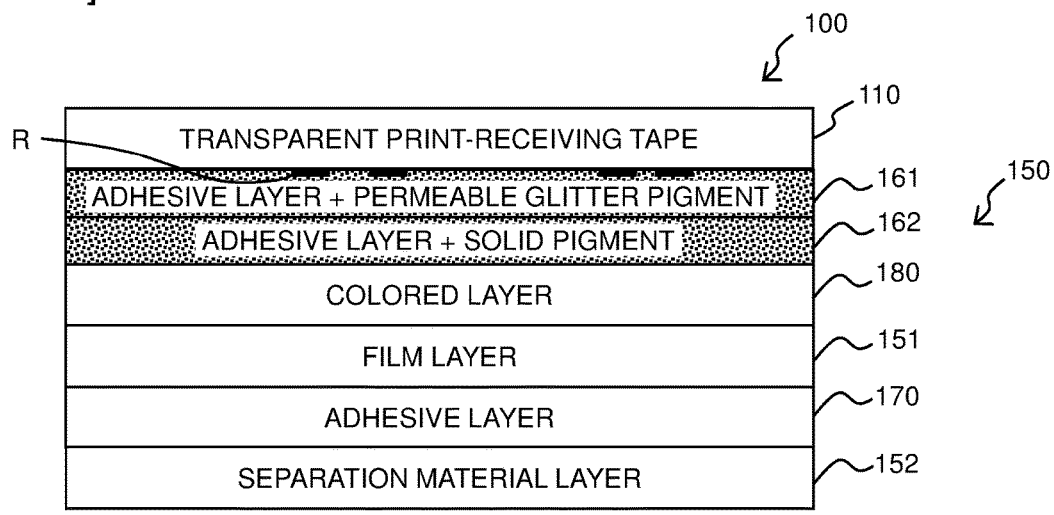
[FIG. 4B]
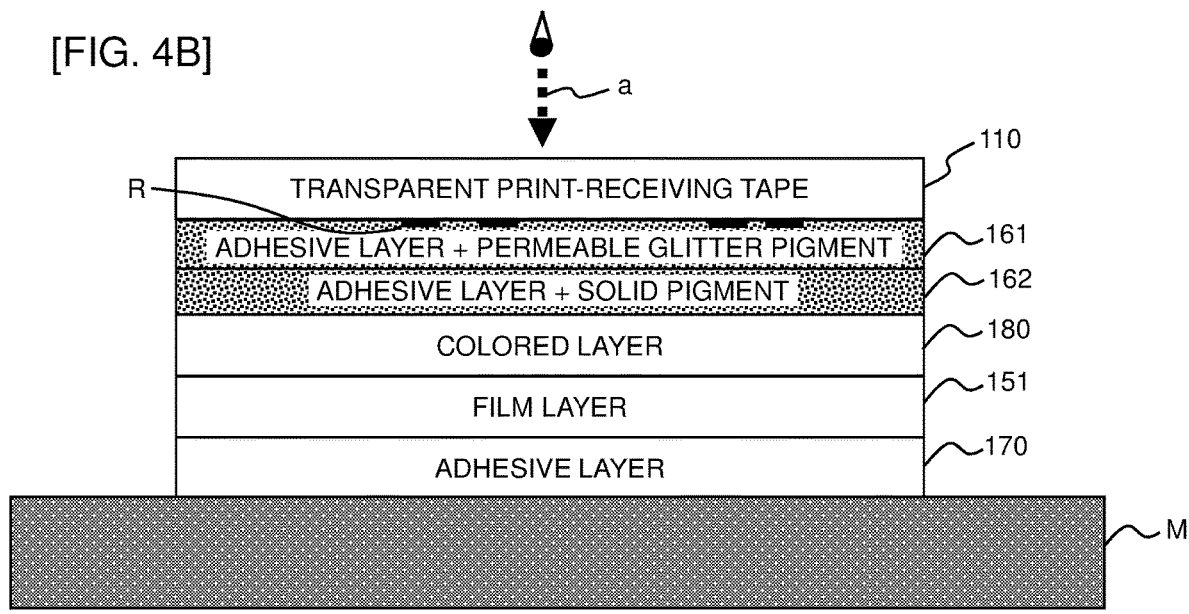

[FIG. 5A]
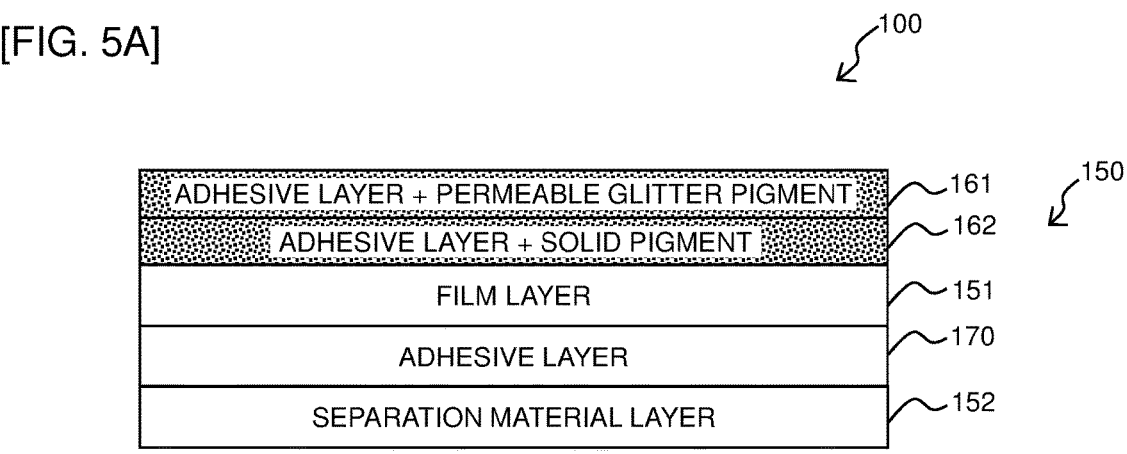
[FIG. 5B]
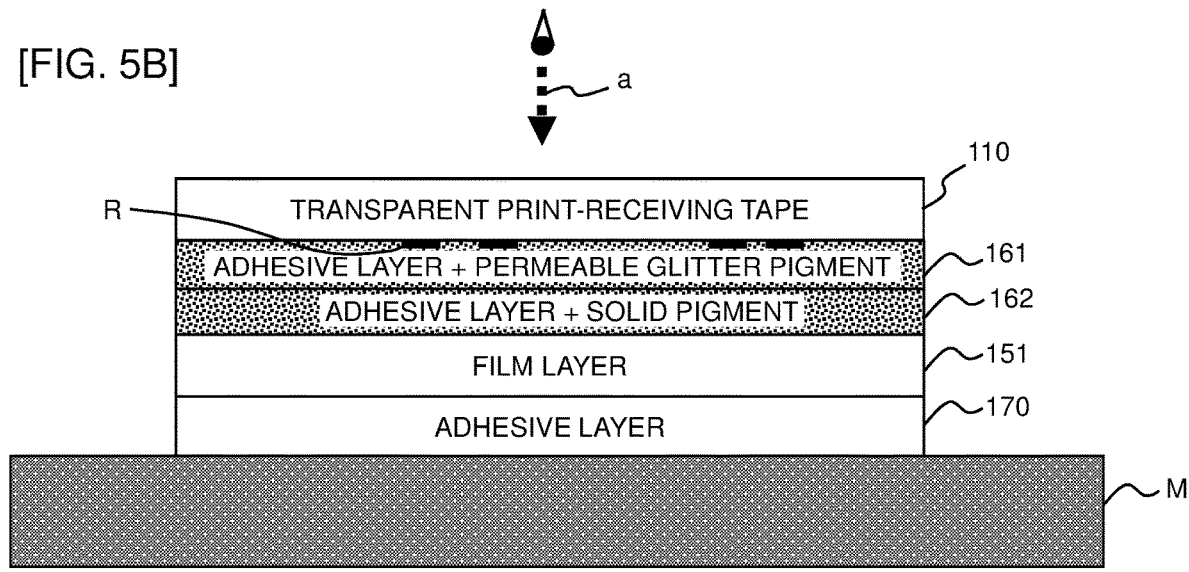

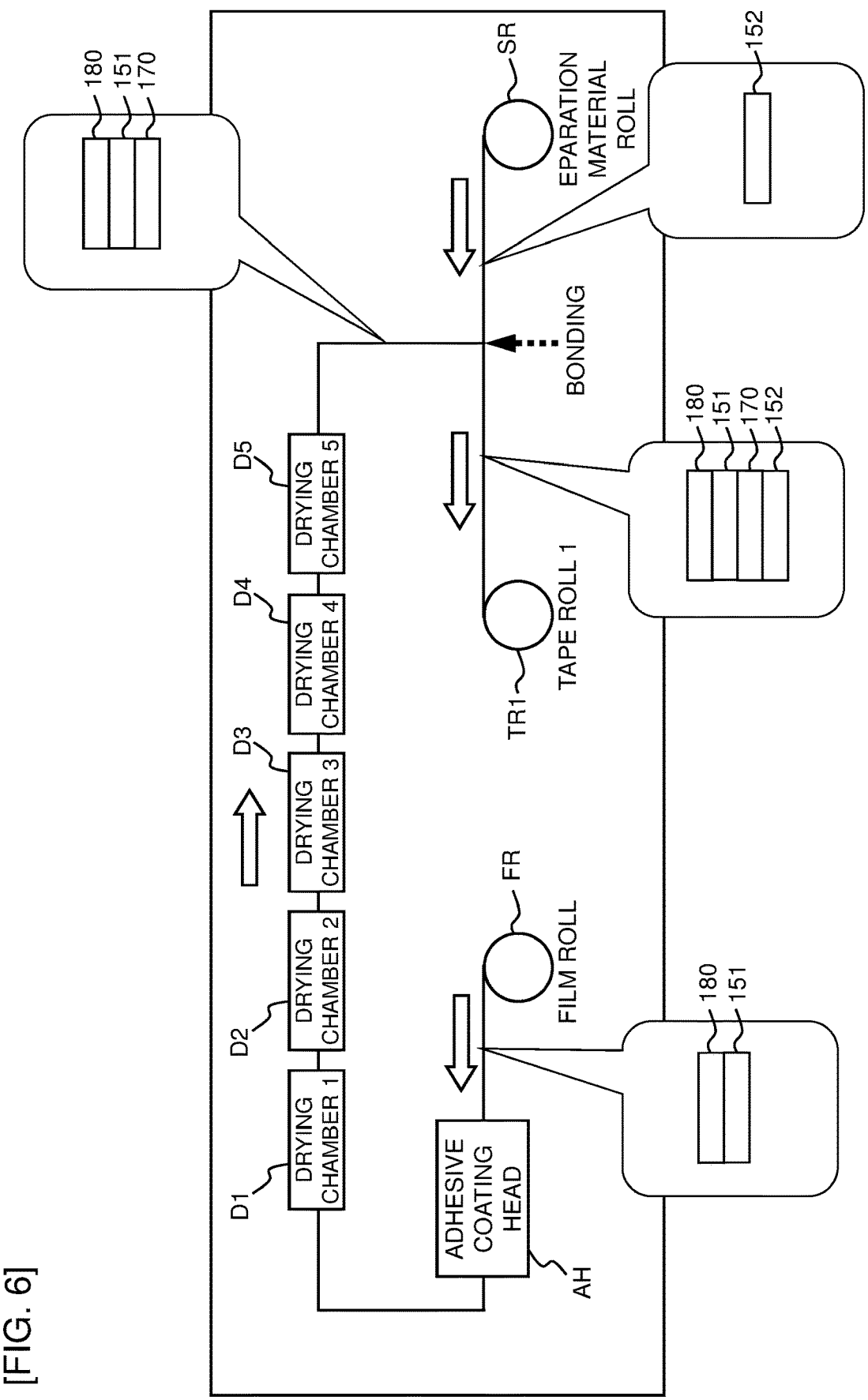
[FIG. 6]

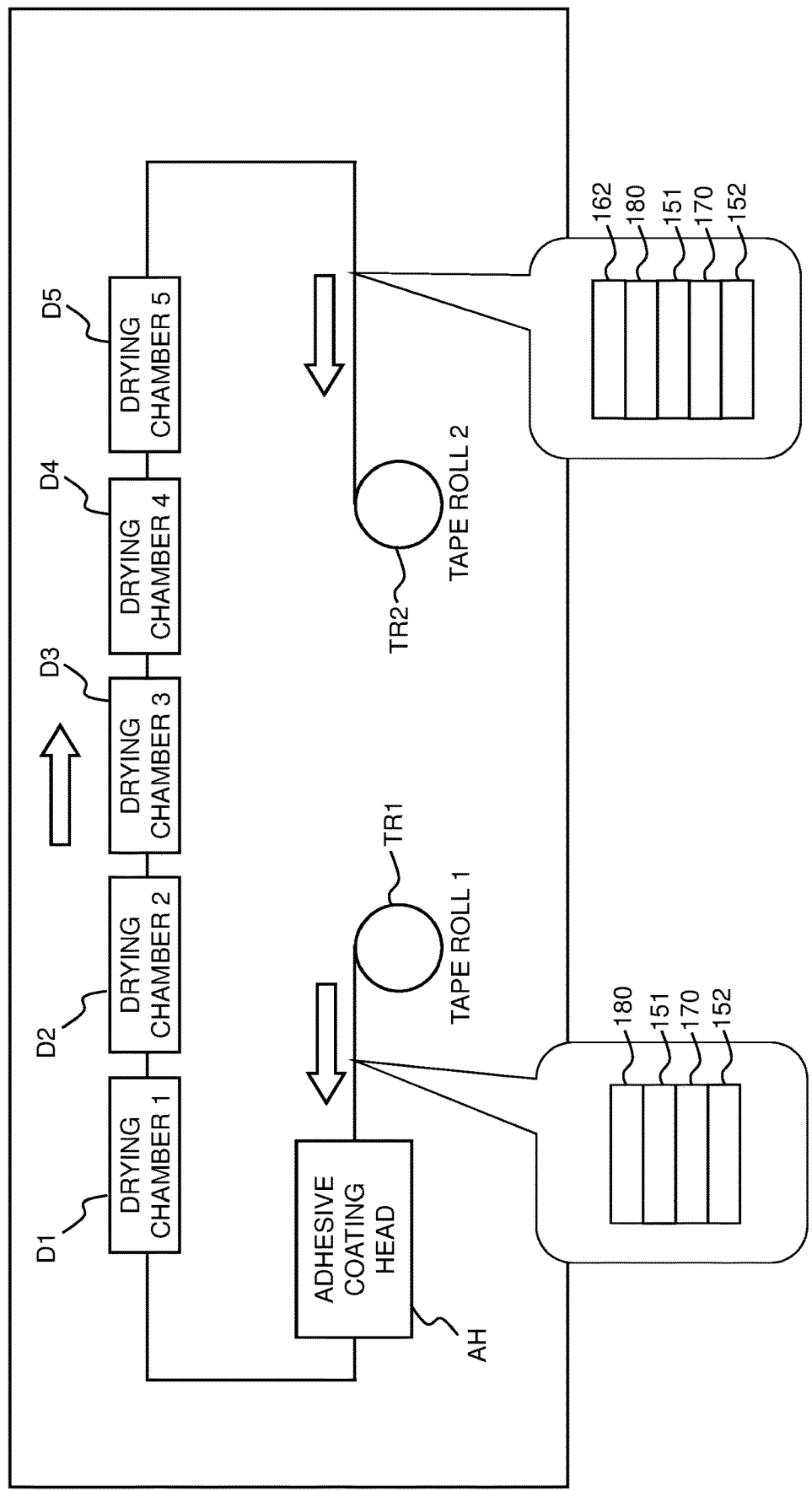

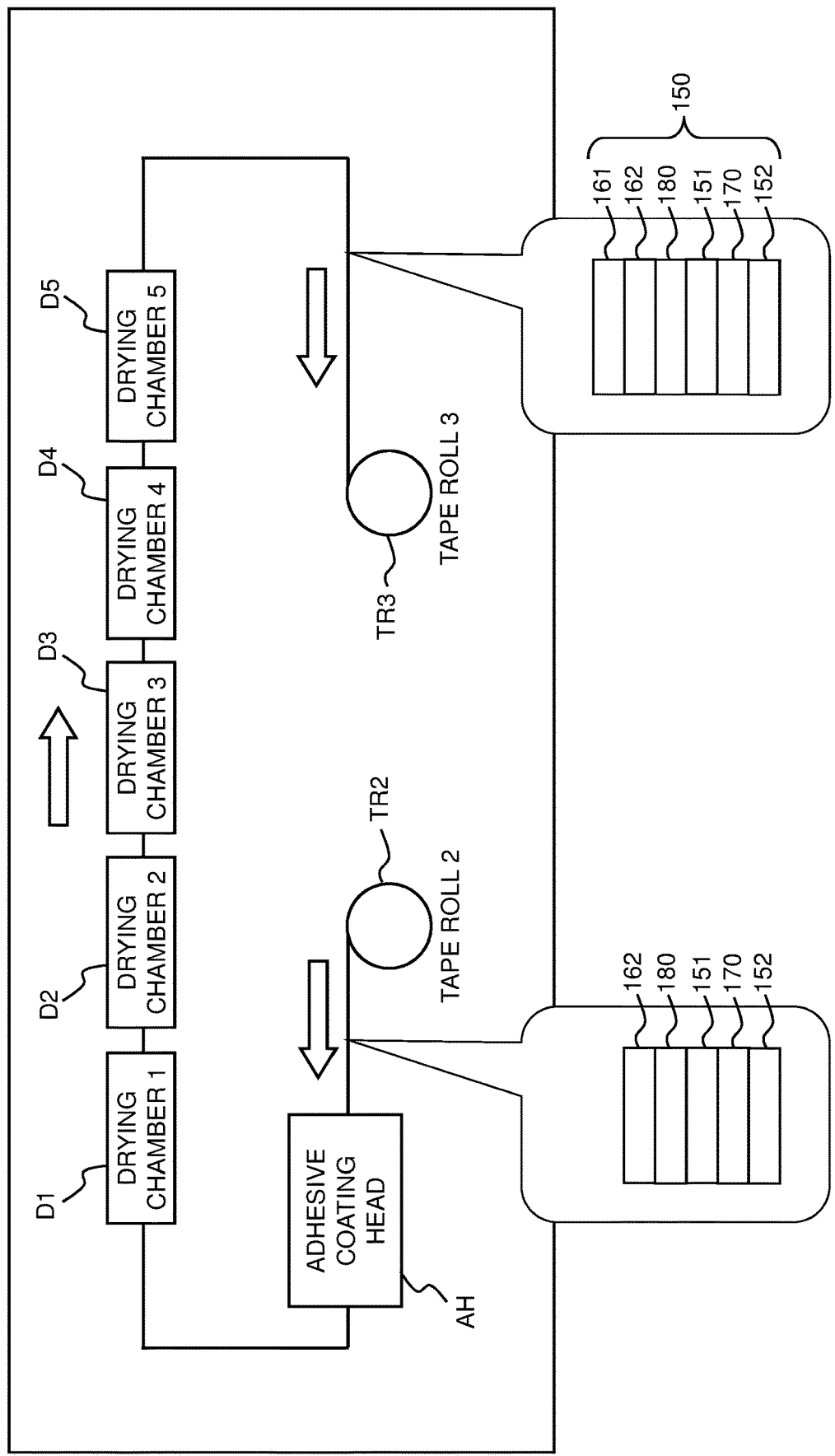
[FIG. 8]

[FIG. 9A]
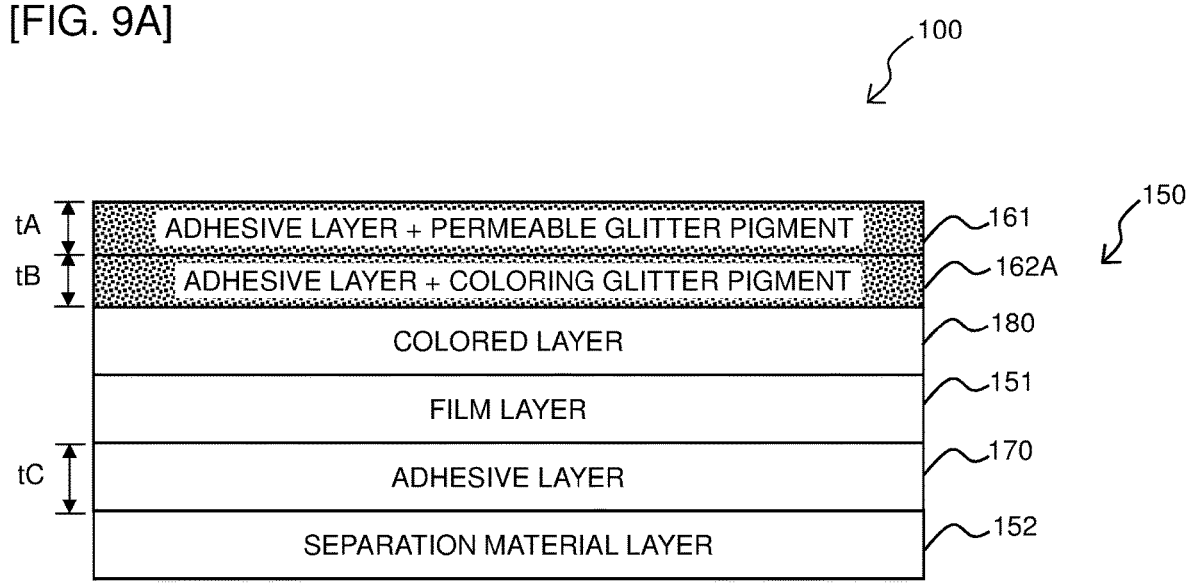
[FIG. 9B]
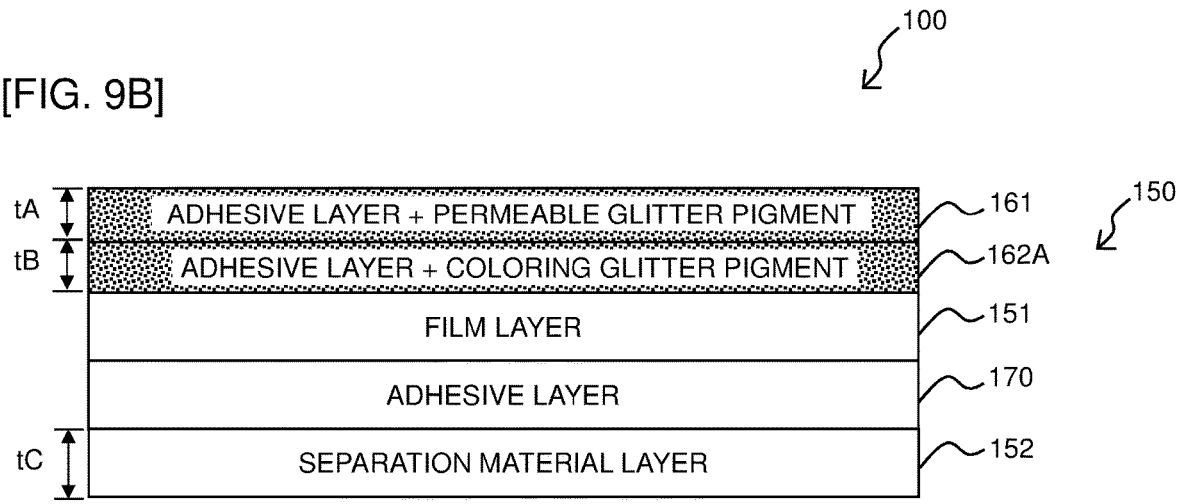

[FIG. 10A]
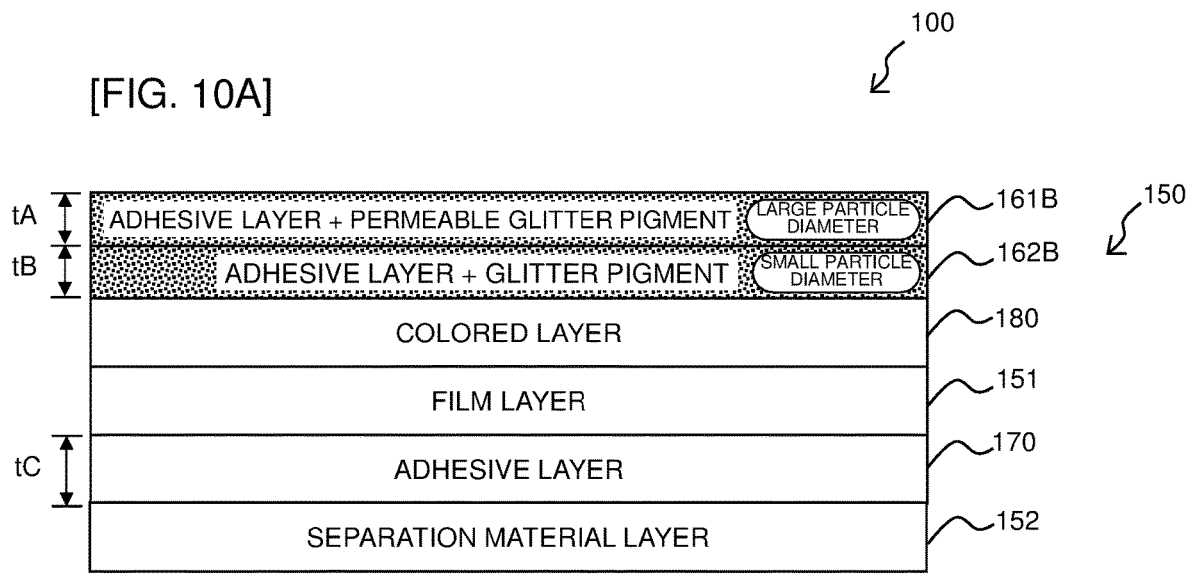
[FIG. 10B]
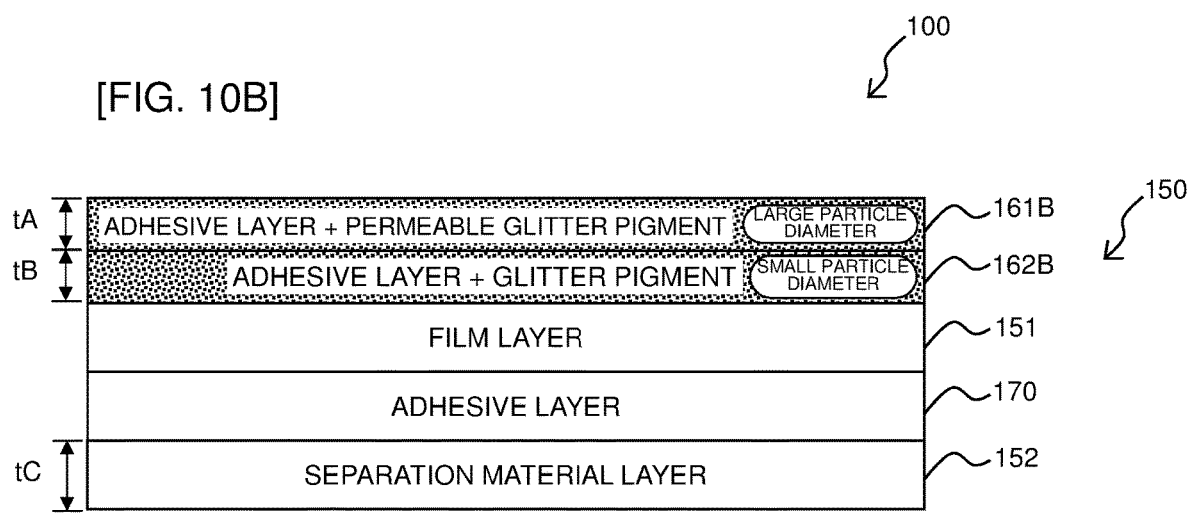

[FIG. 11A]
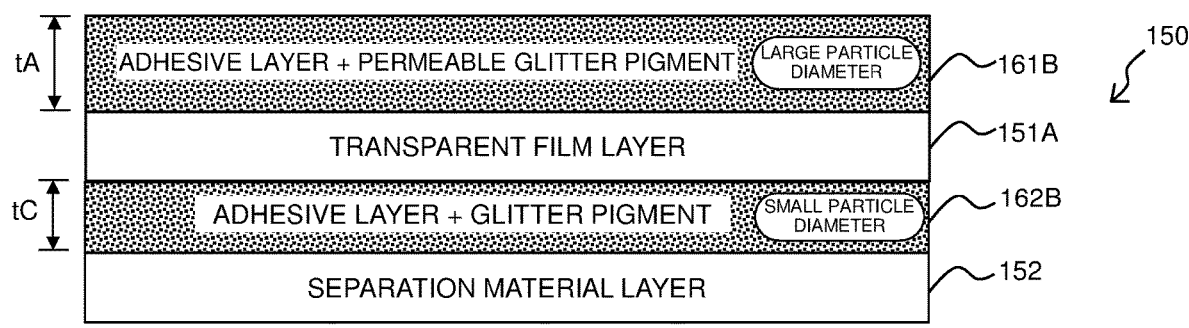
[FIG. 11B]
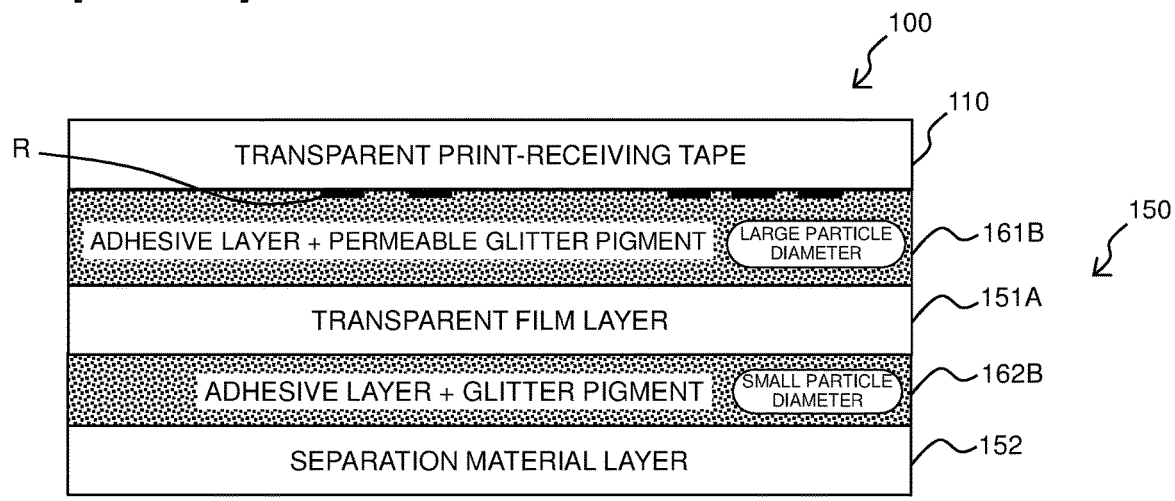

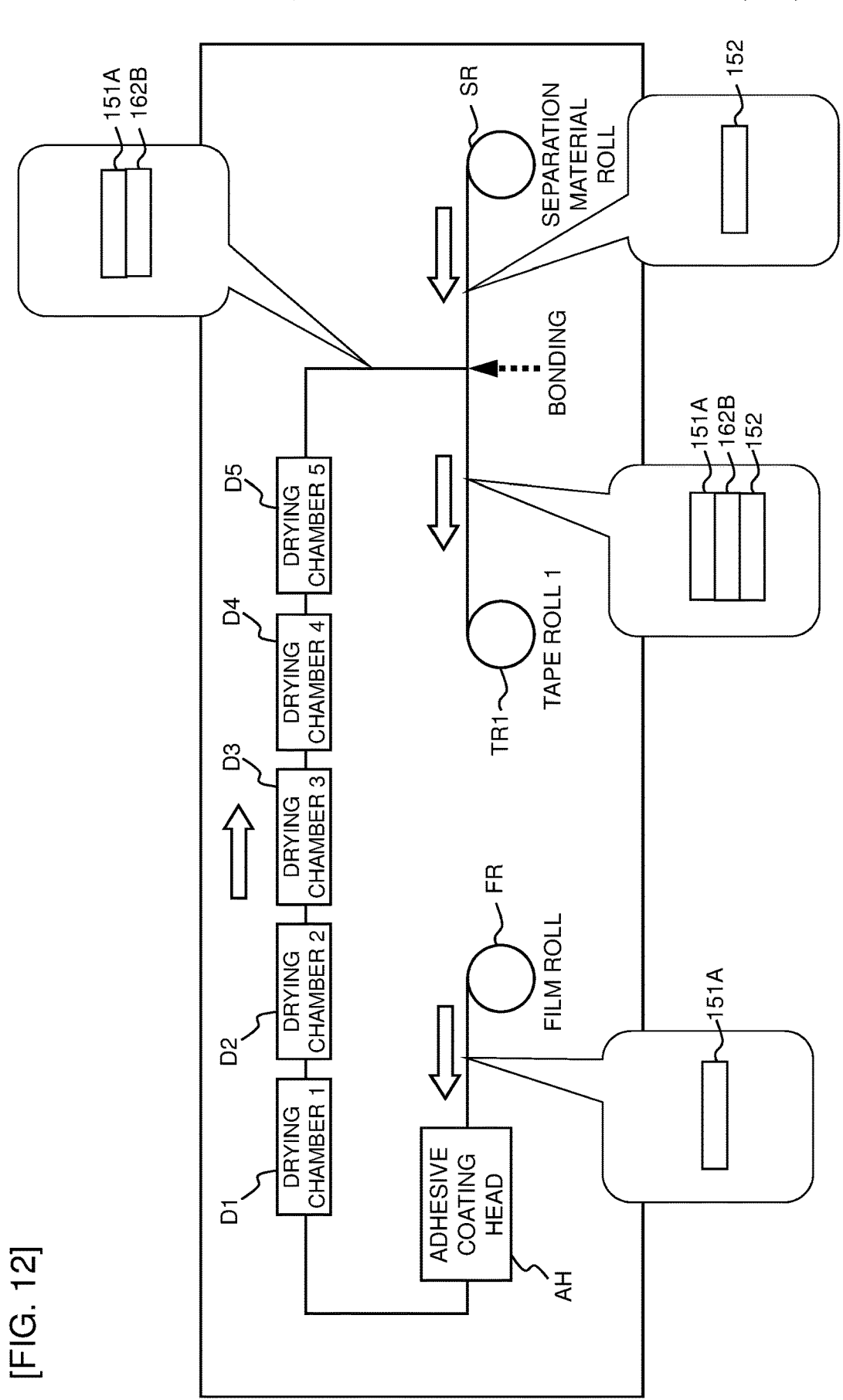
[FIG. 12]

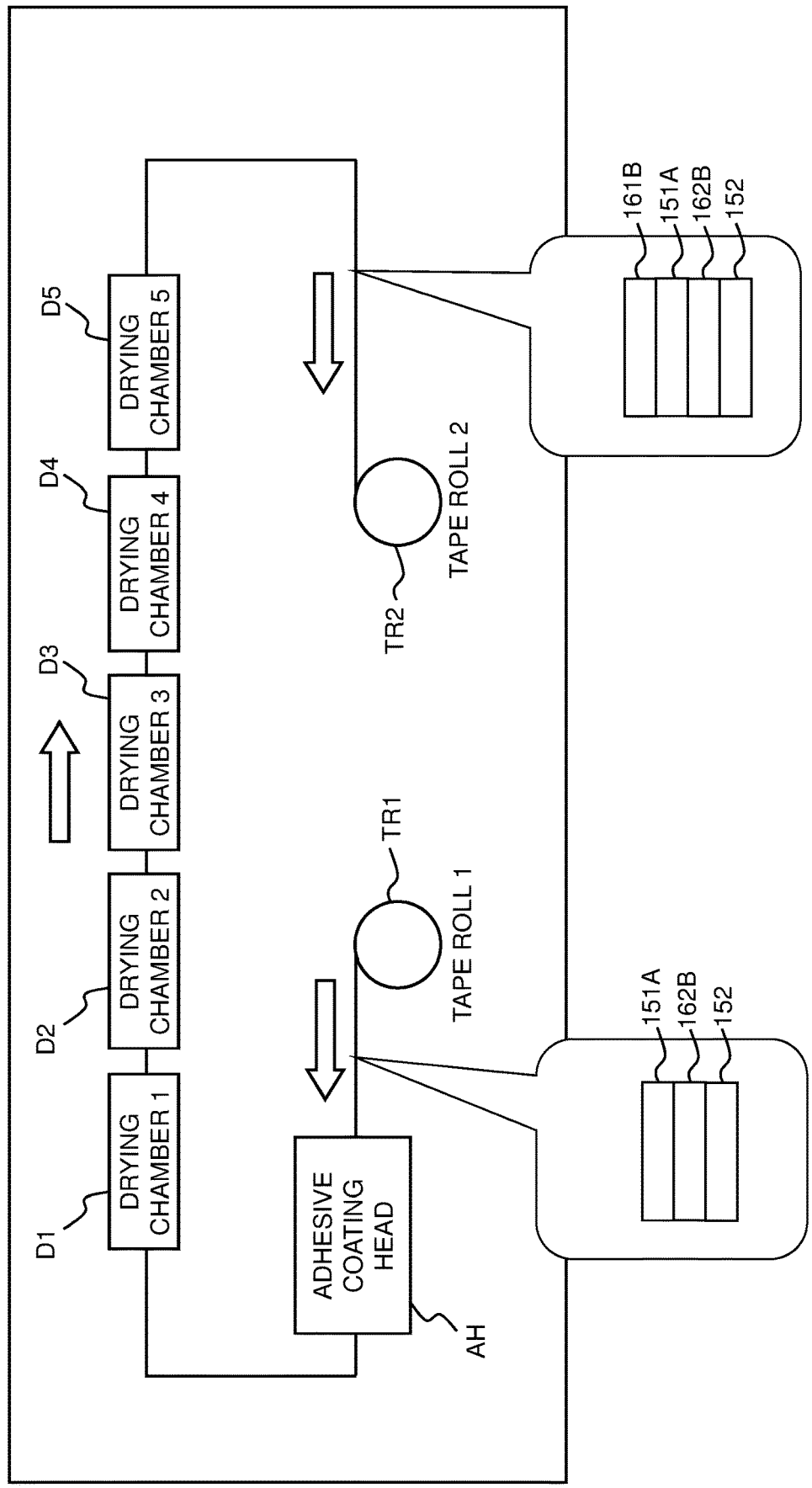
[FIG. 13]

[FIG. 14A]
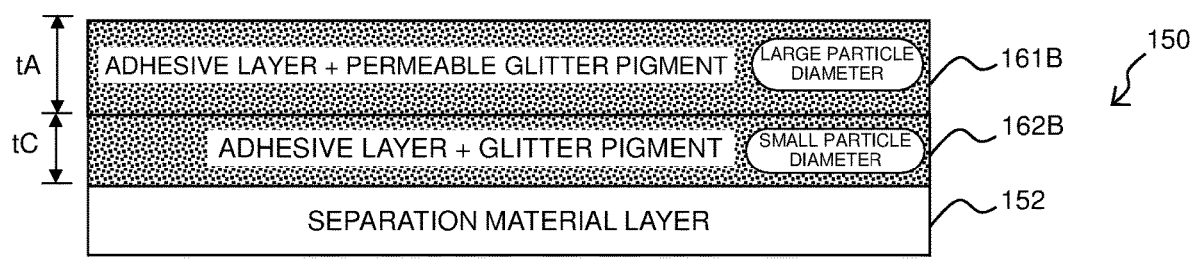
[FIG. 14B]
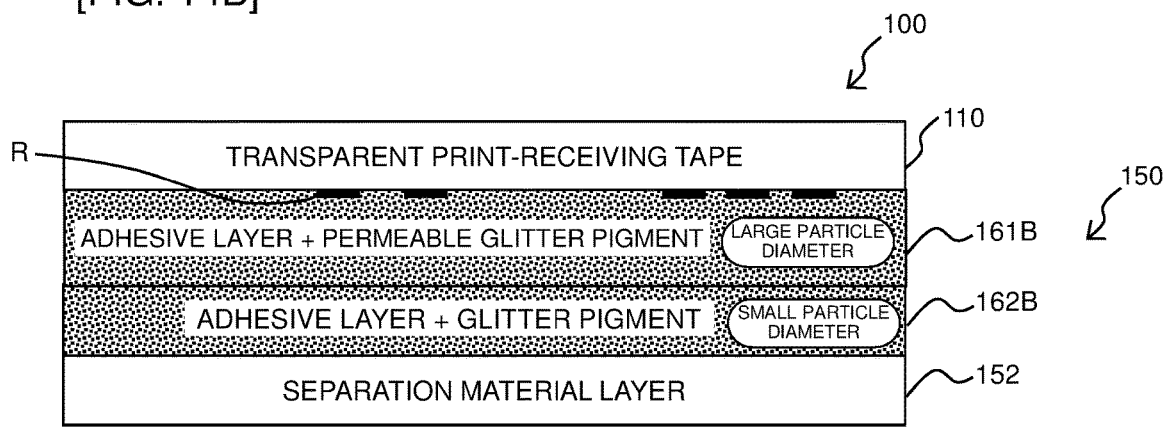

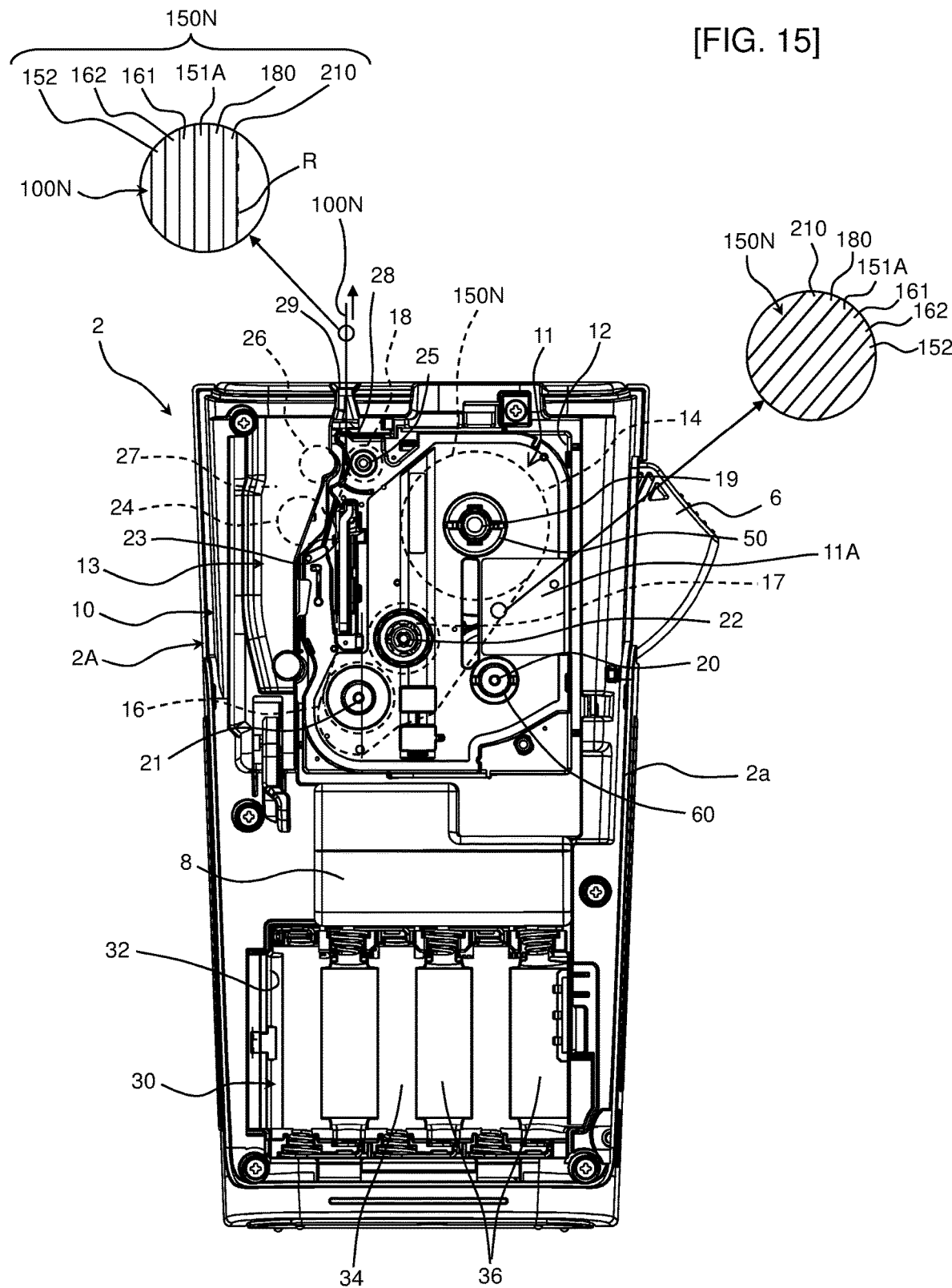
[FIG. 15]

[FIG. 16A]
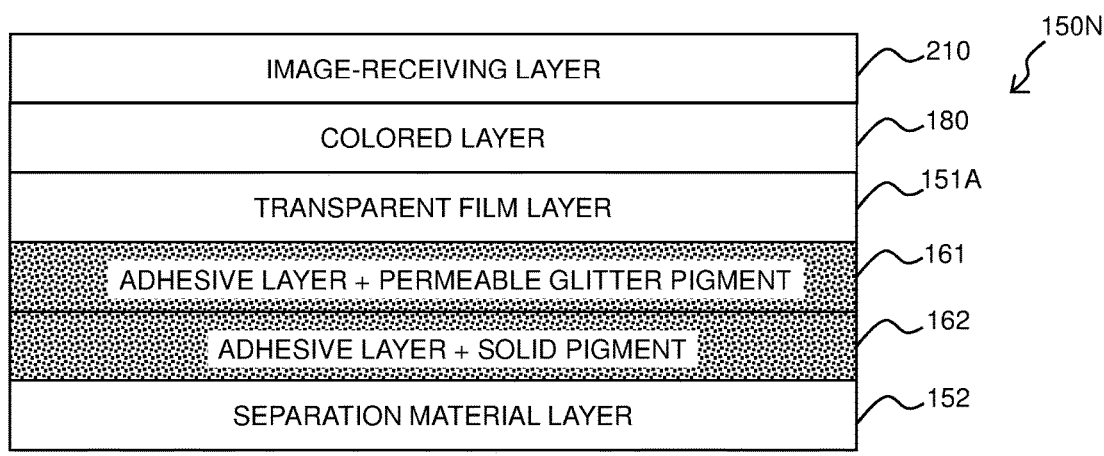
[FIG. 16B]
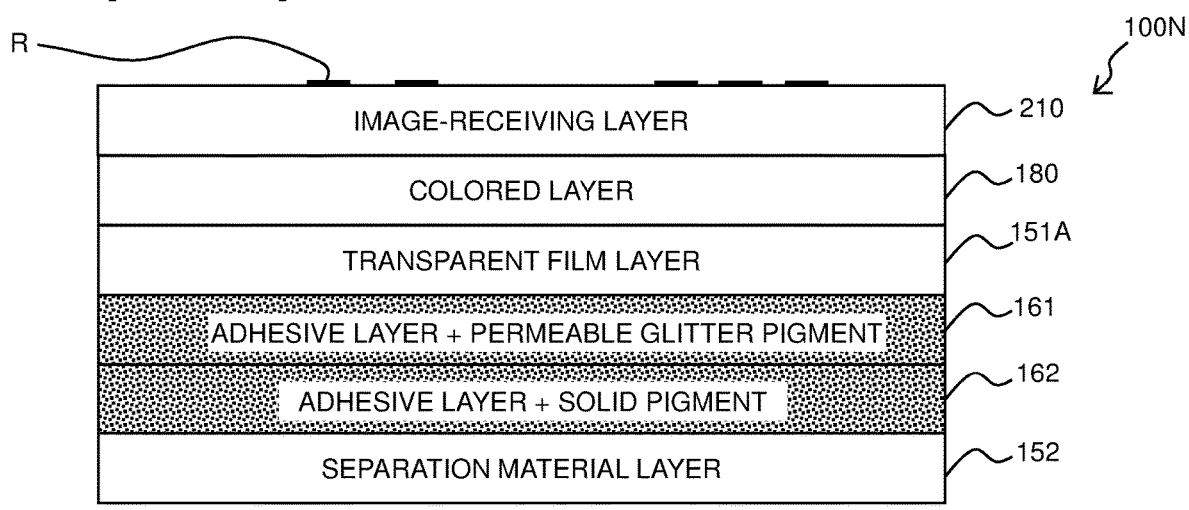

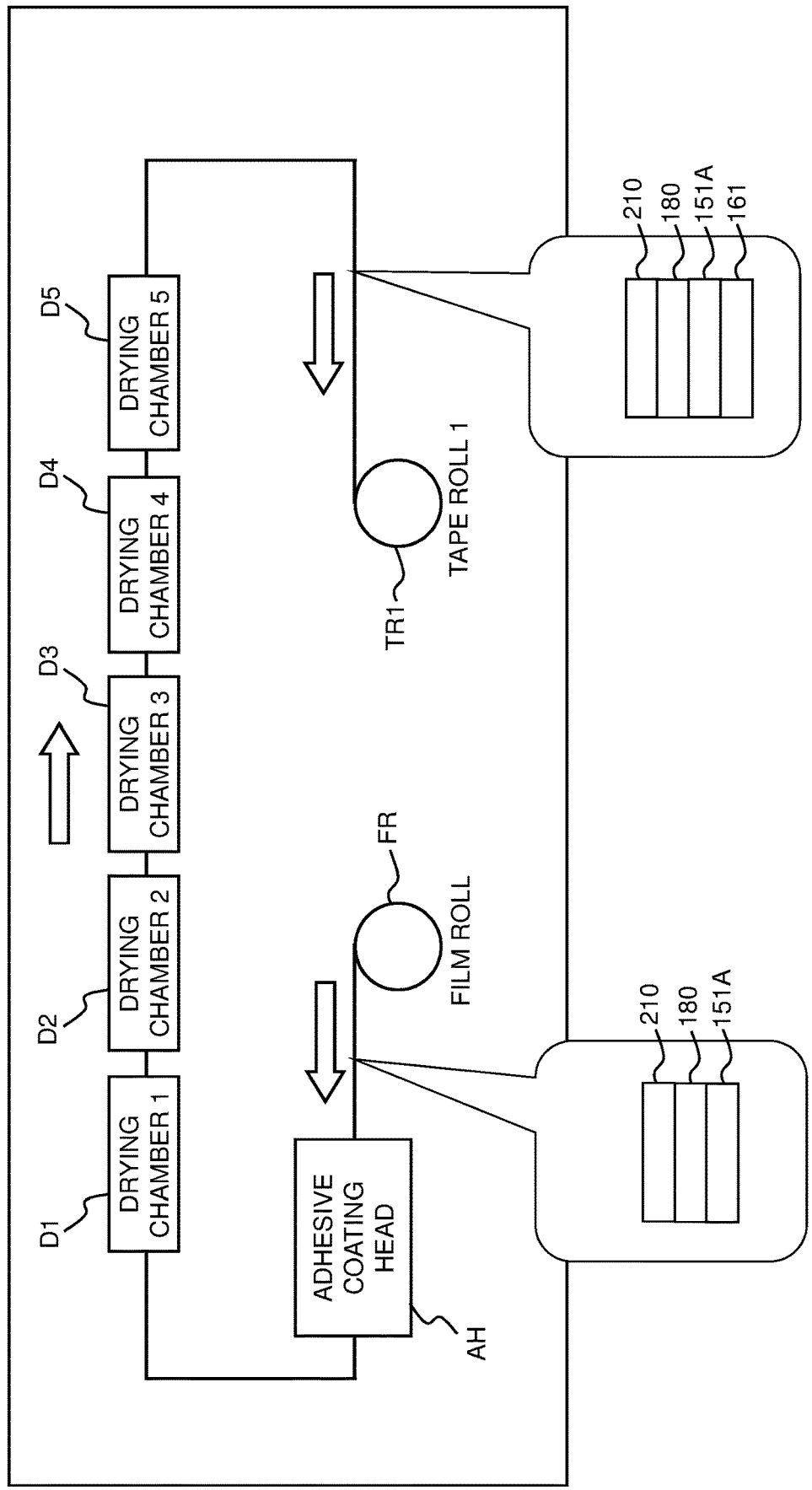
[FIG. 17]

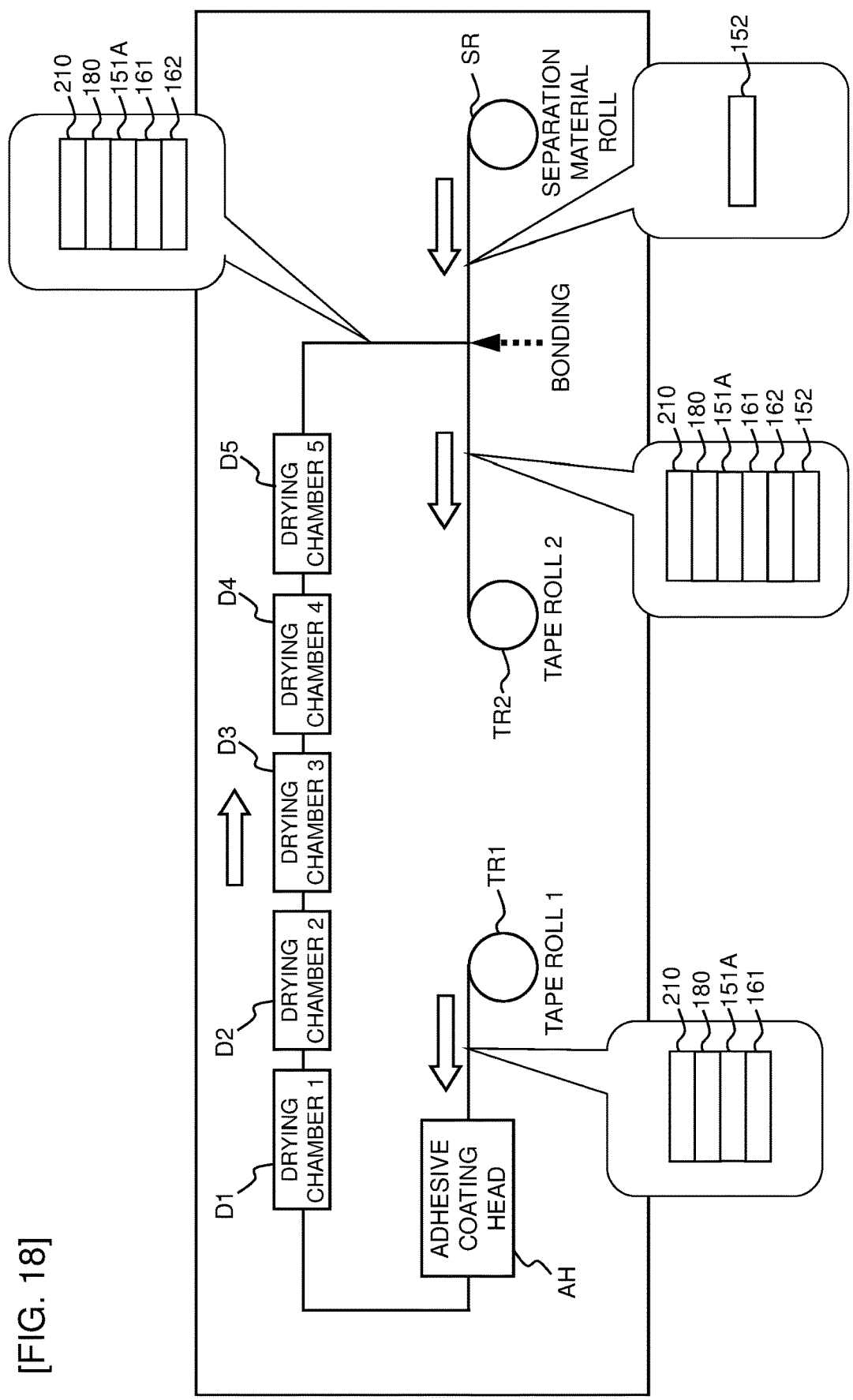
[FIG. 18]

[FIG. 19A]
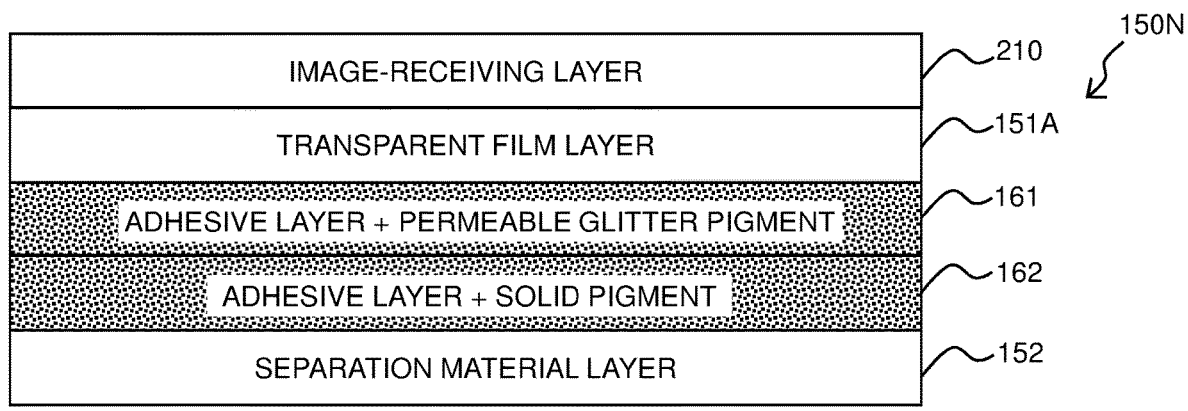
[FIG. 19B]
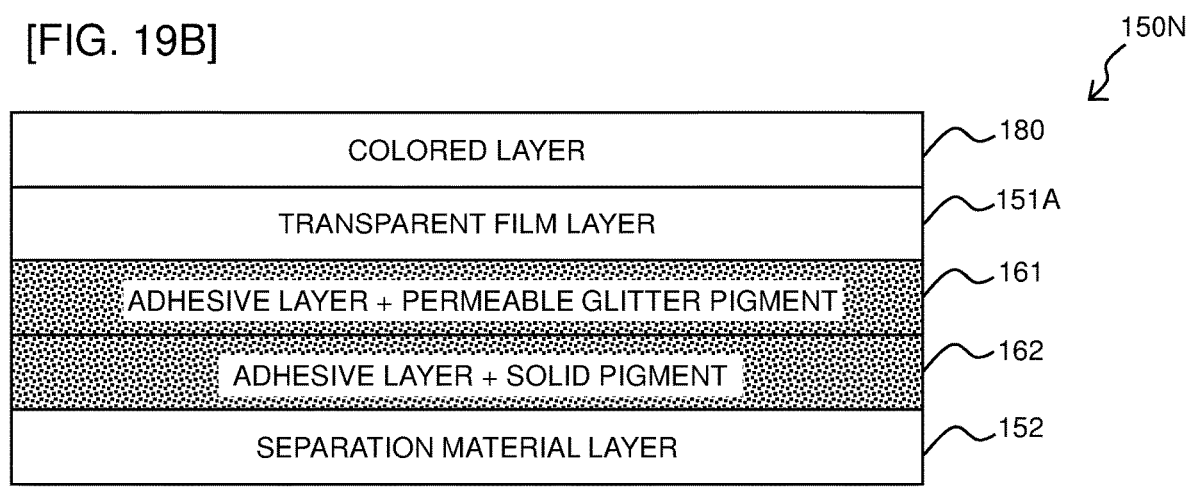

[FIG. 20A]
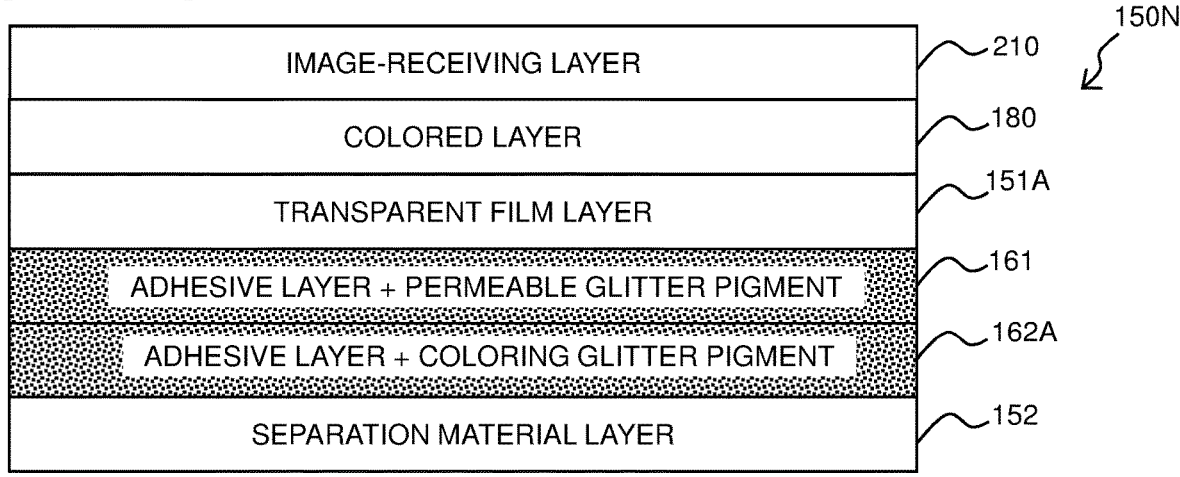
[FIG. 20B]
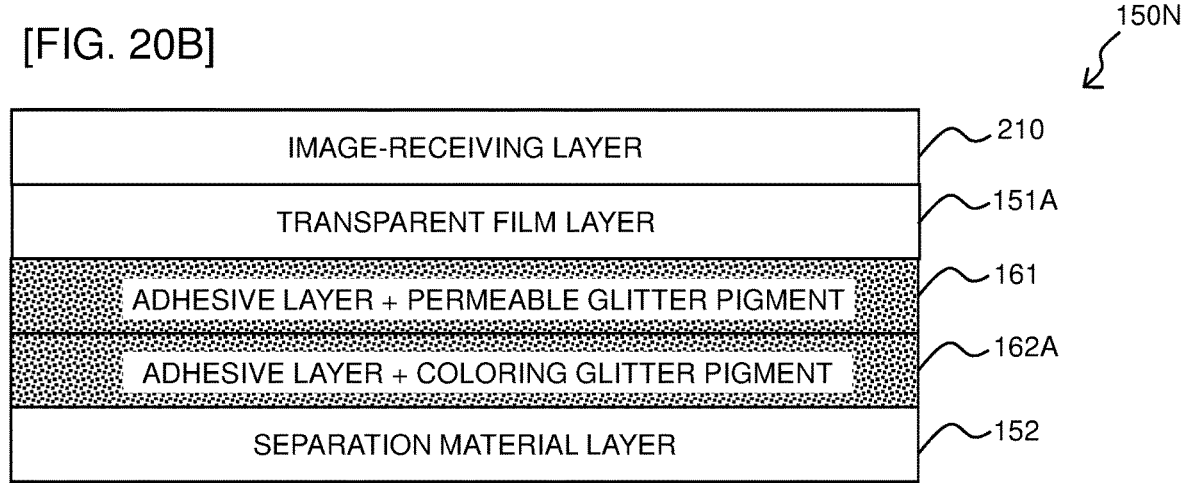
[FIG. 20C]
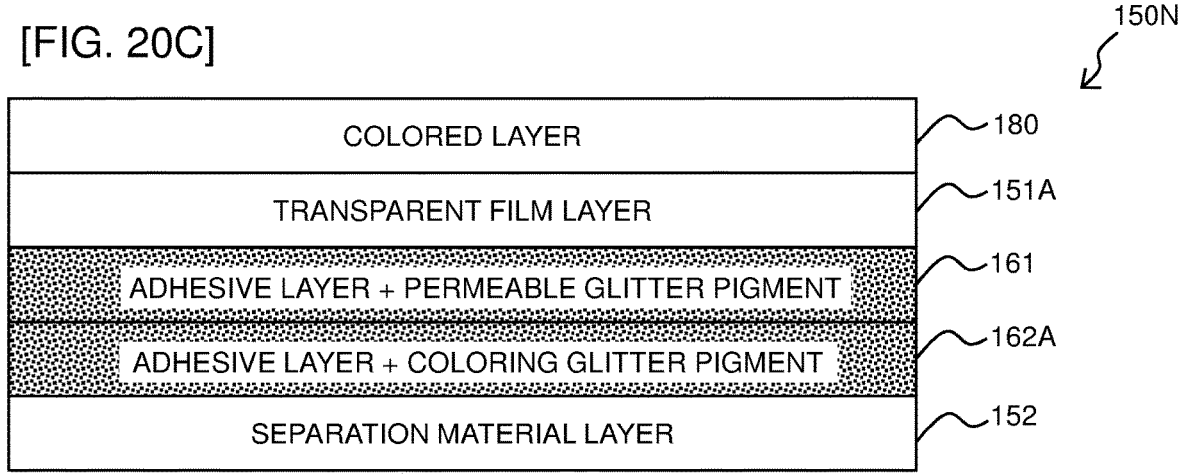

[FIG. 21A]
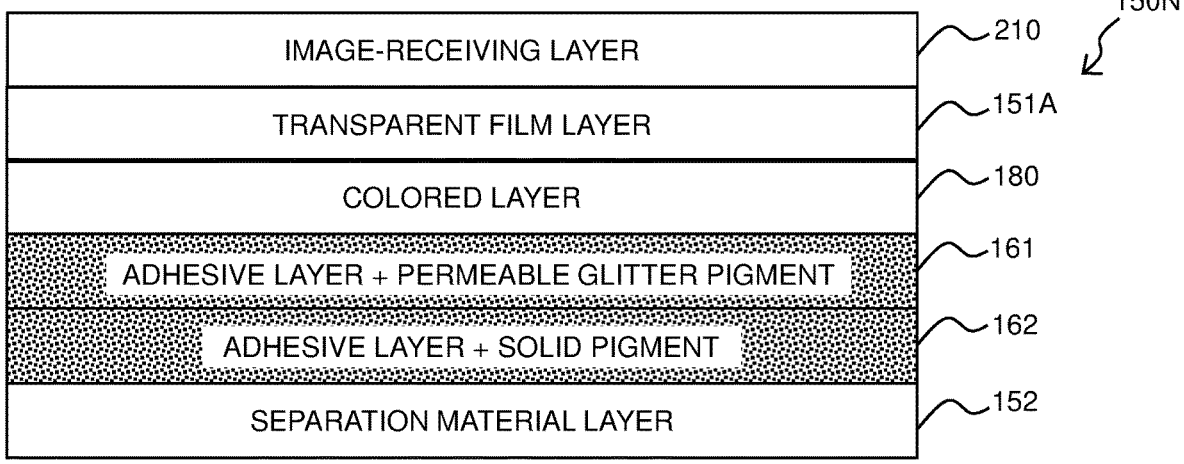
[FIG. 21B]
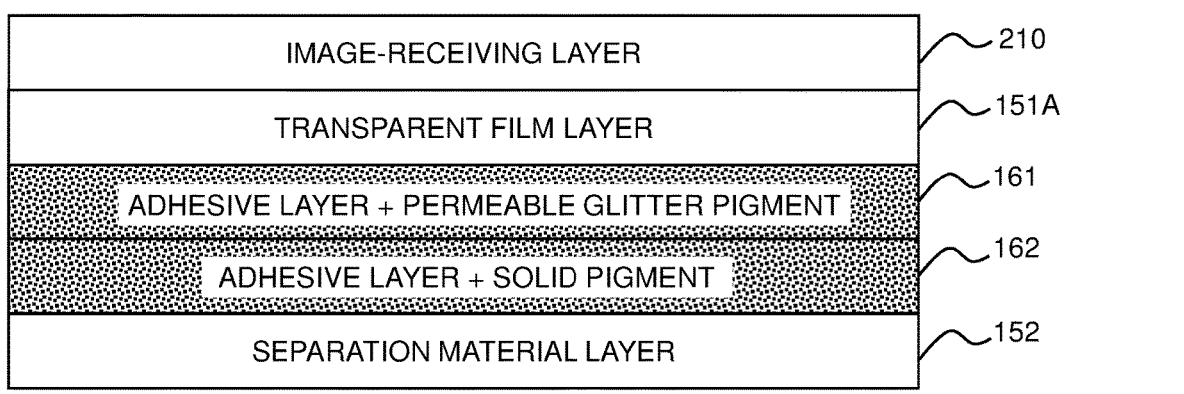
[FIG. 21C]
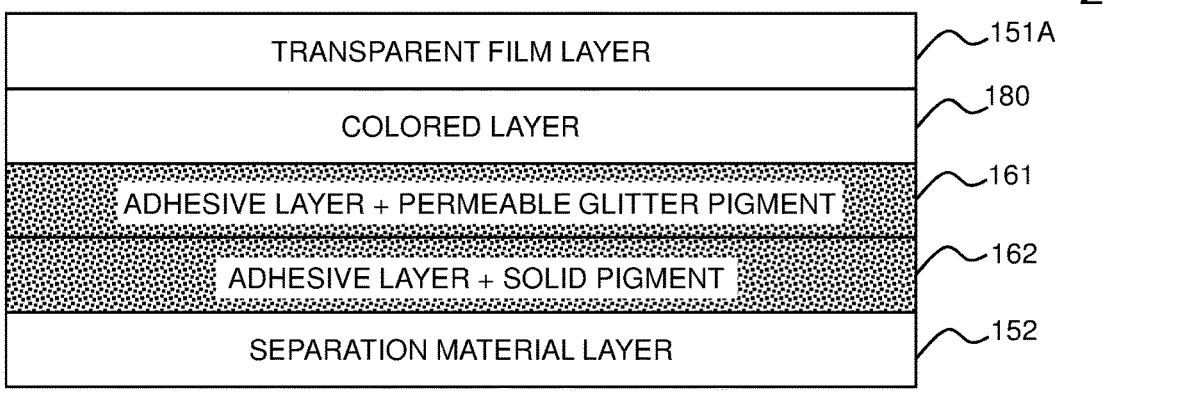

[FIG. 22A]
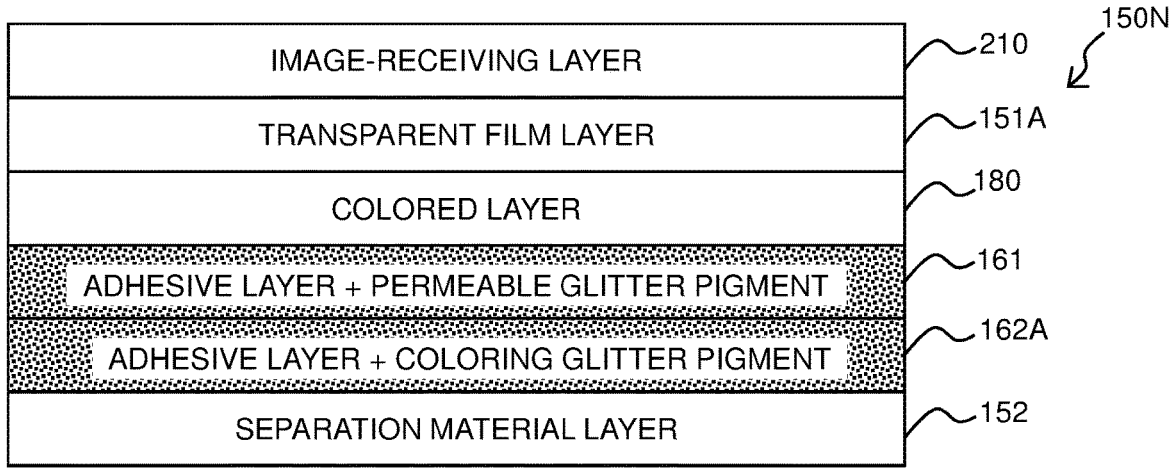
[FIG. 22B]
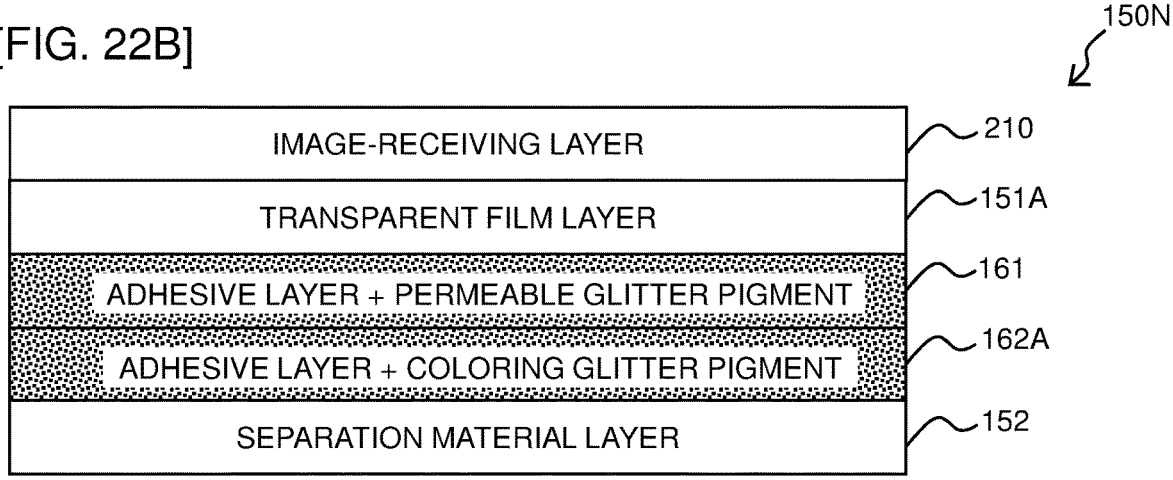
[FIG. 22C]
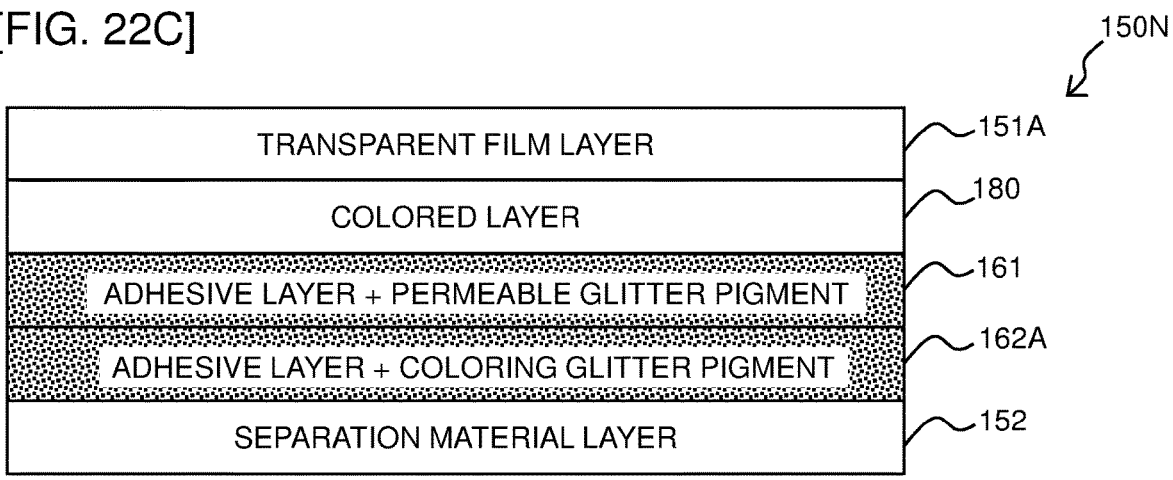

[FIG. 23A]
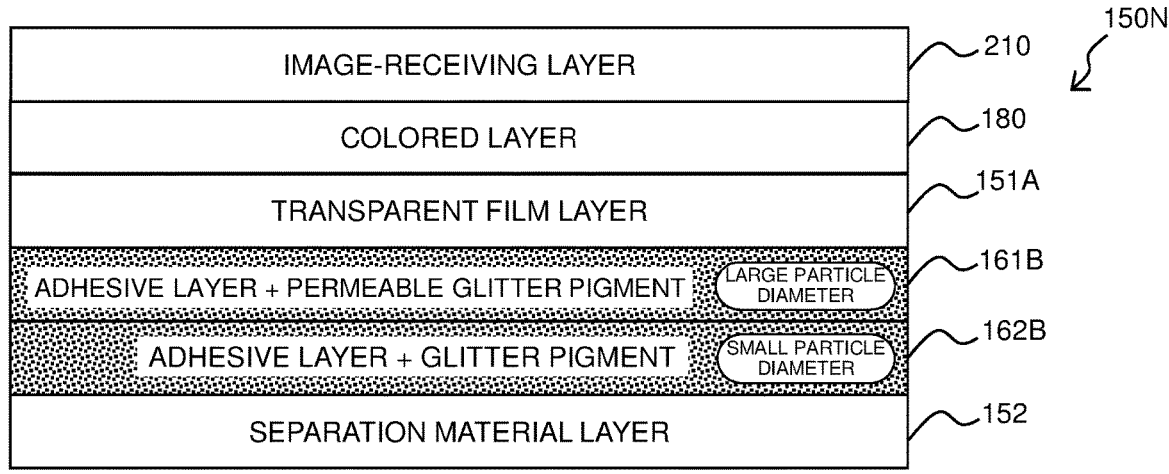
[FIG. 23B]
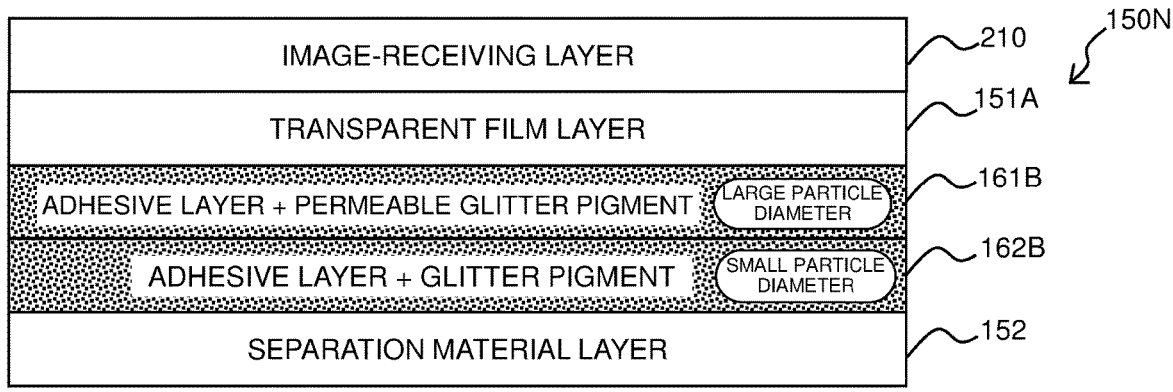
[FIG. 23C]
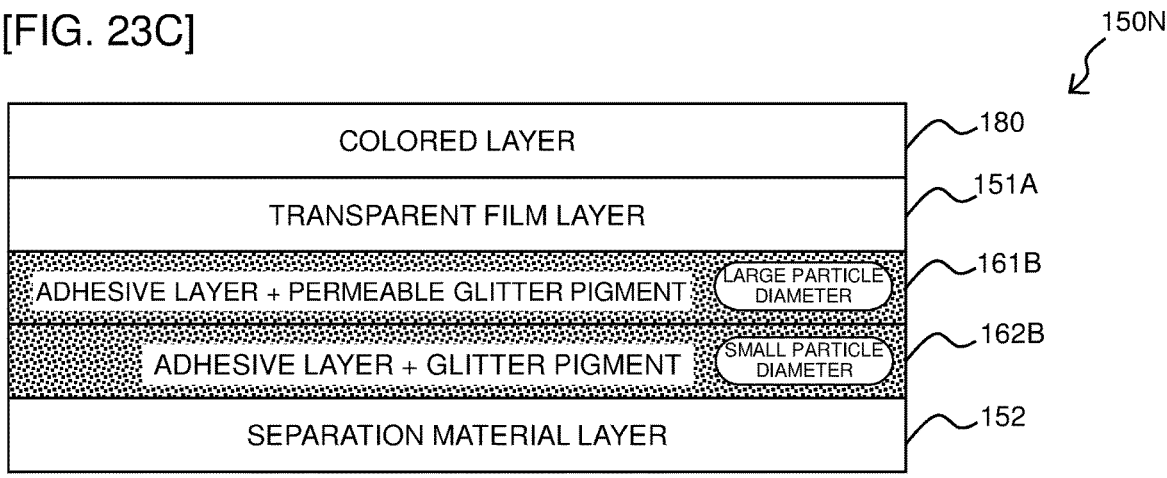

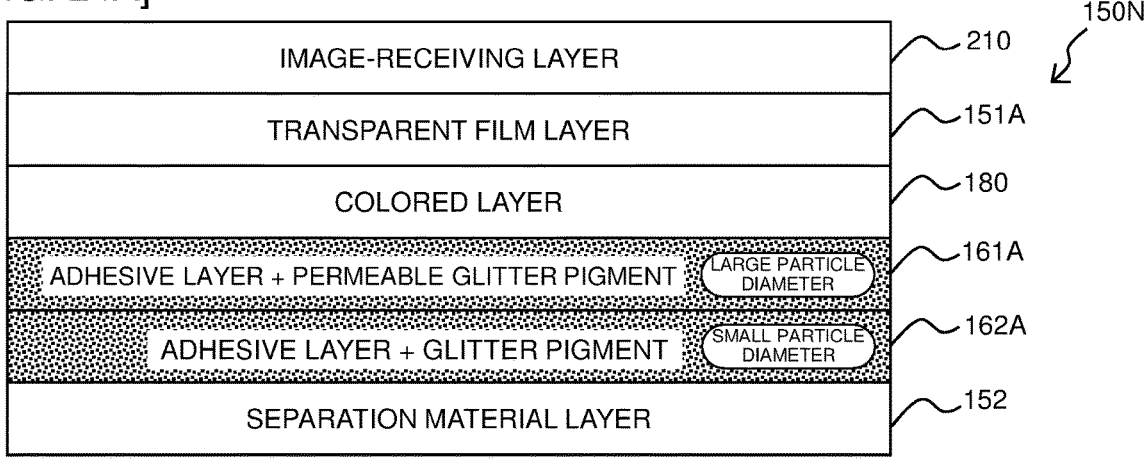
[FIG. 24A]
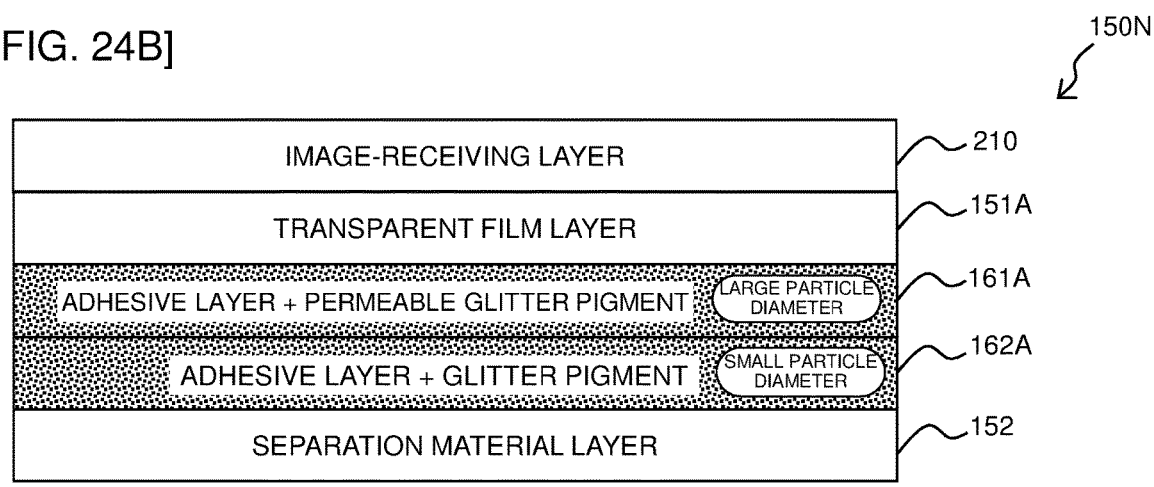
[FIG. 24B]
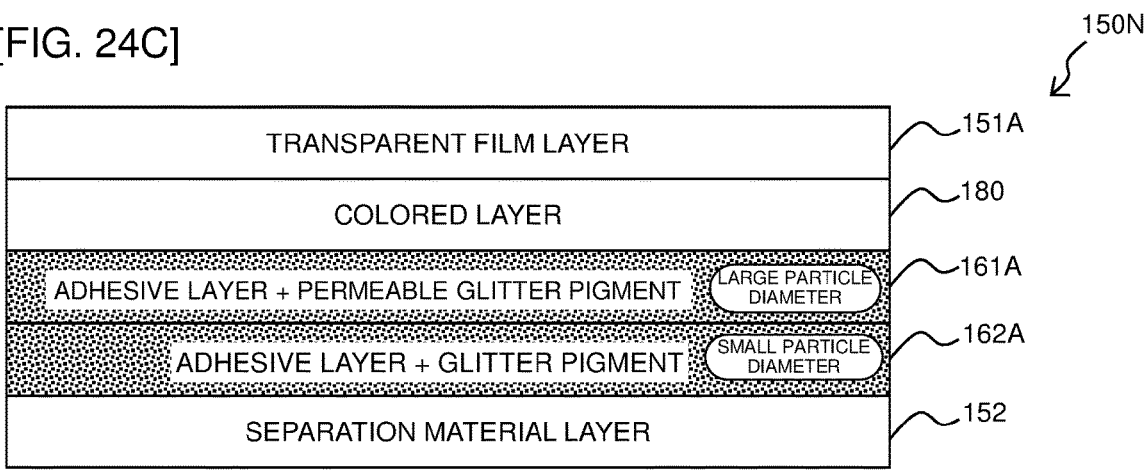
[FIG. 24C]

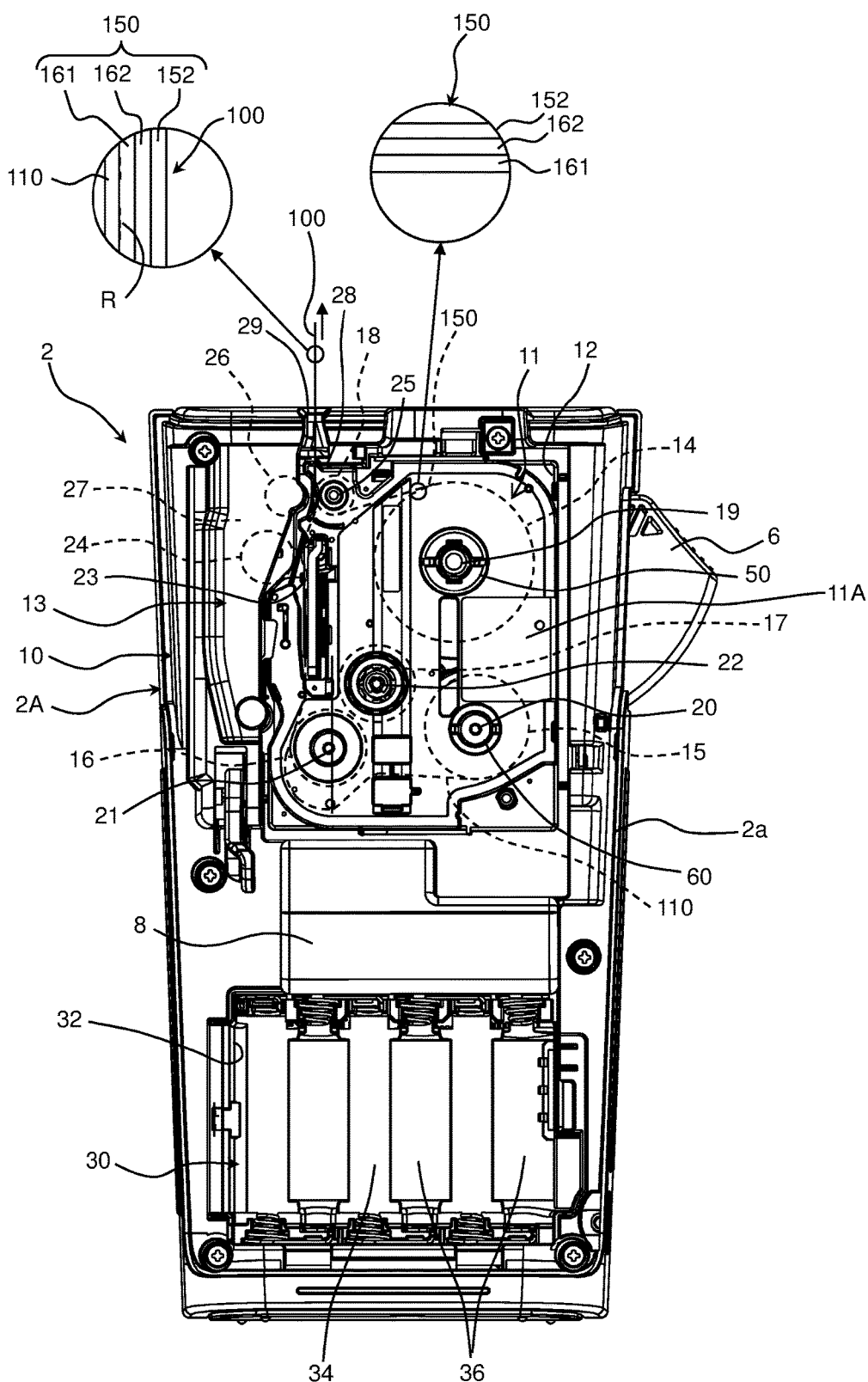
[FIG. 25]

[FIG. 26]
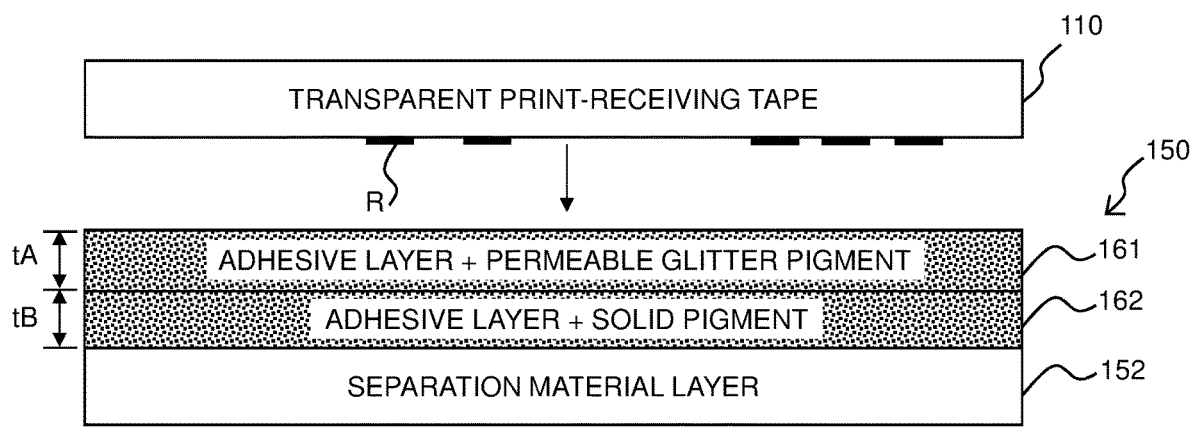

[FIG. 27A]
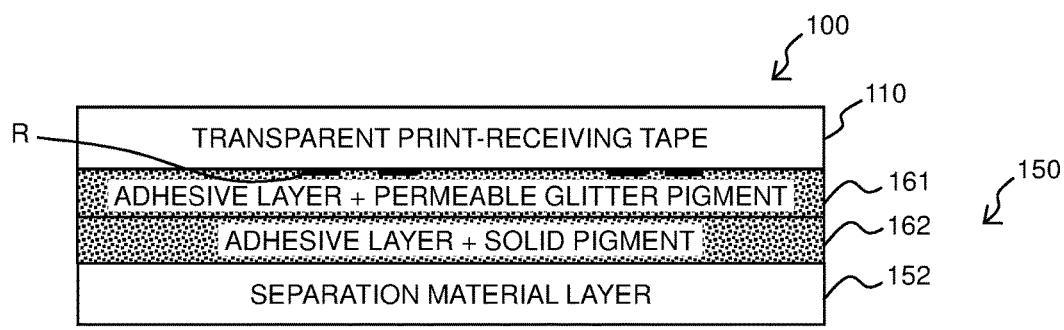
[FIG. 27B]
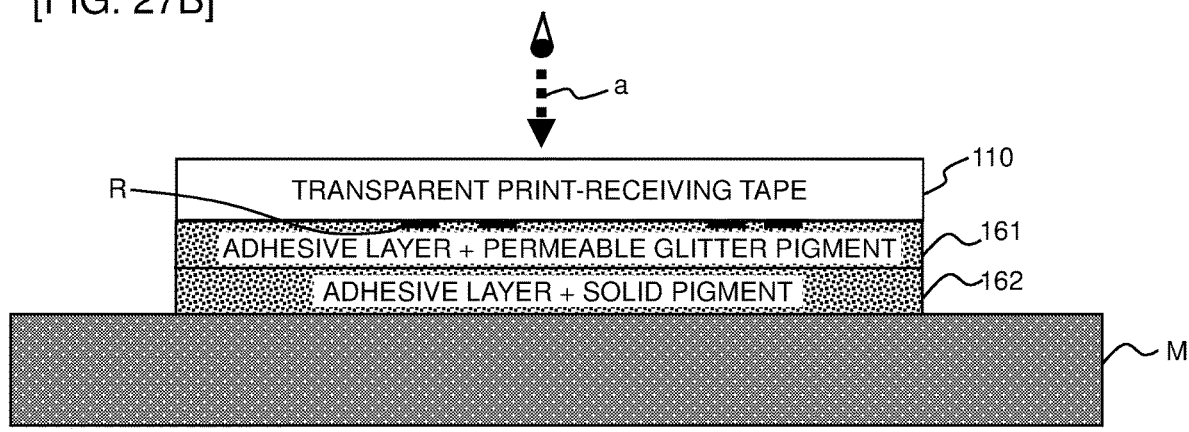

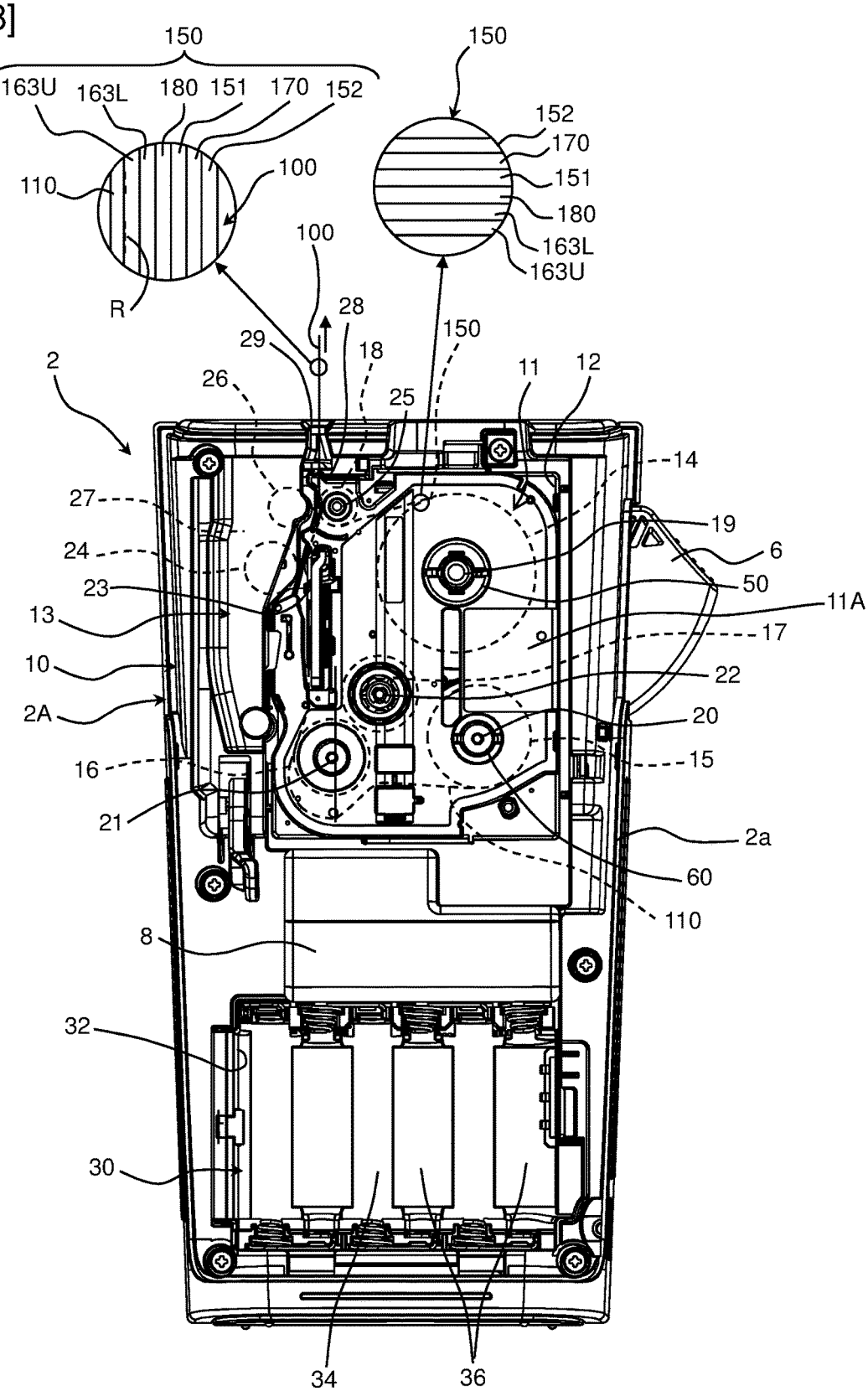
[FIG. 28]

[FIG. 29]
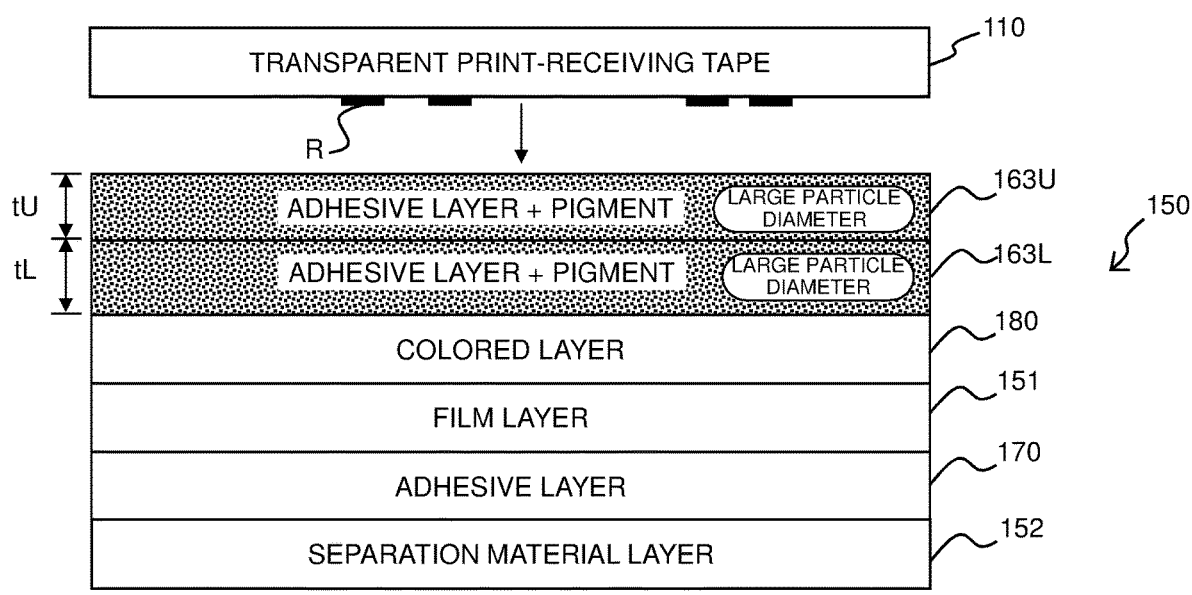

[FIG. 30A]
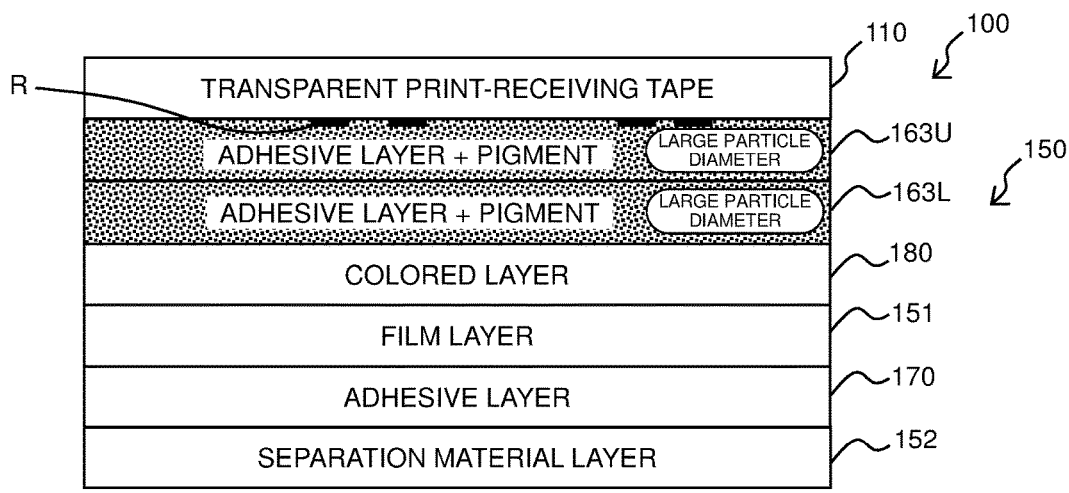
[FIG. 30B]
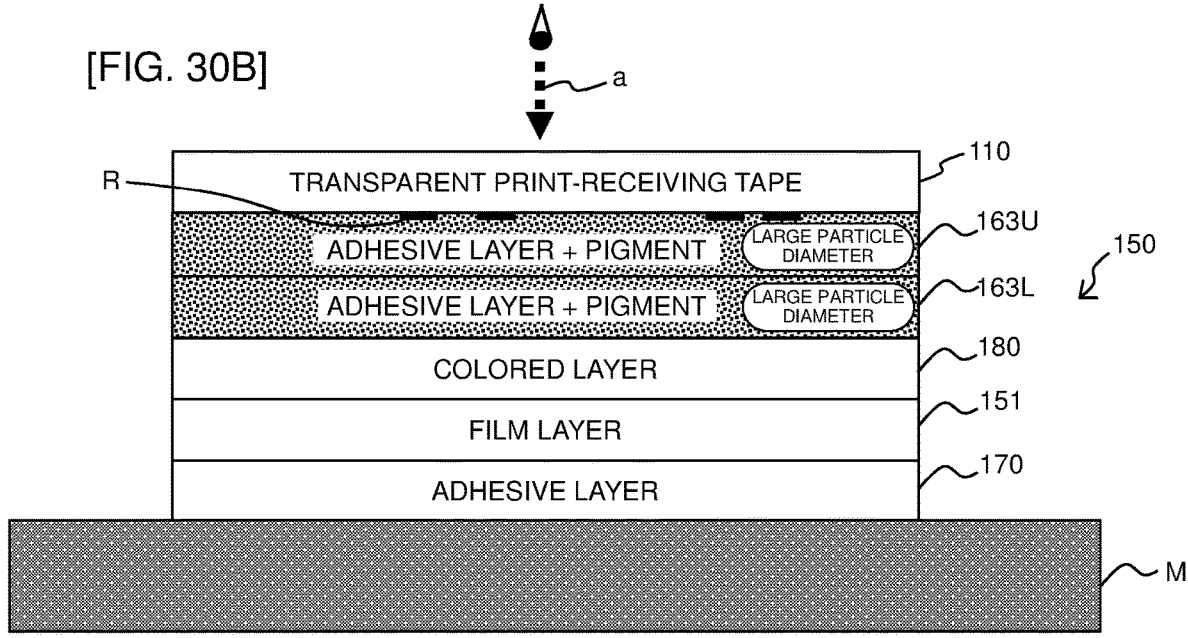

[FIG. 31]
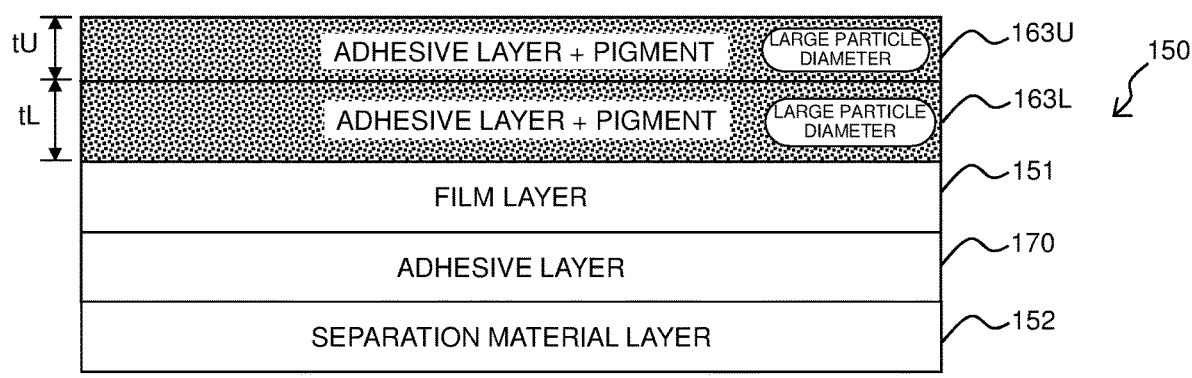

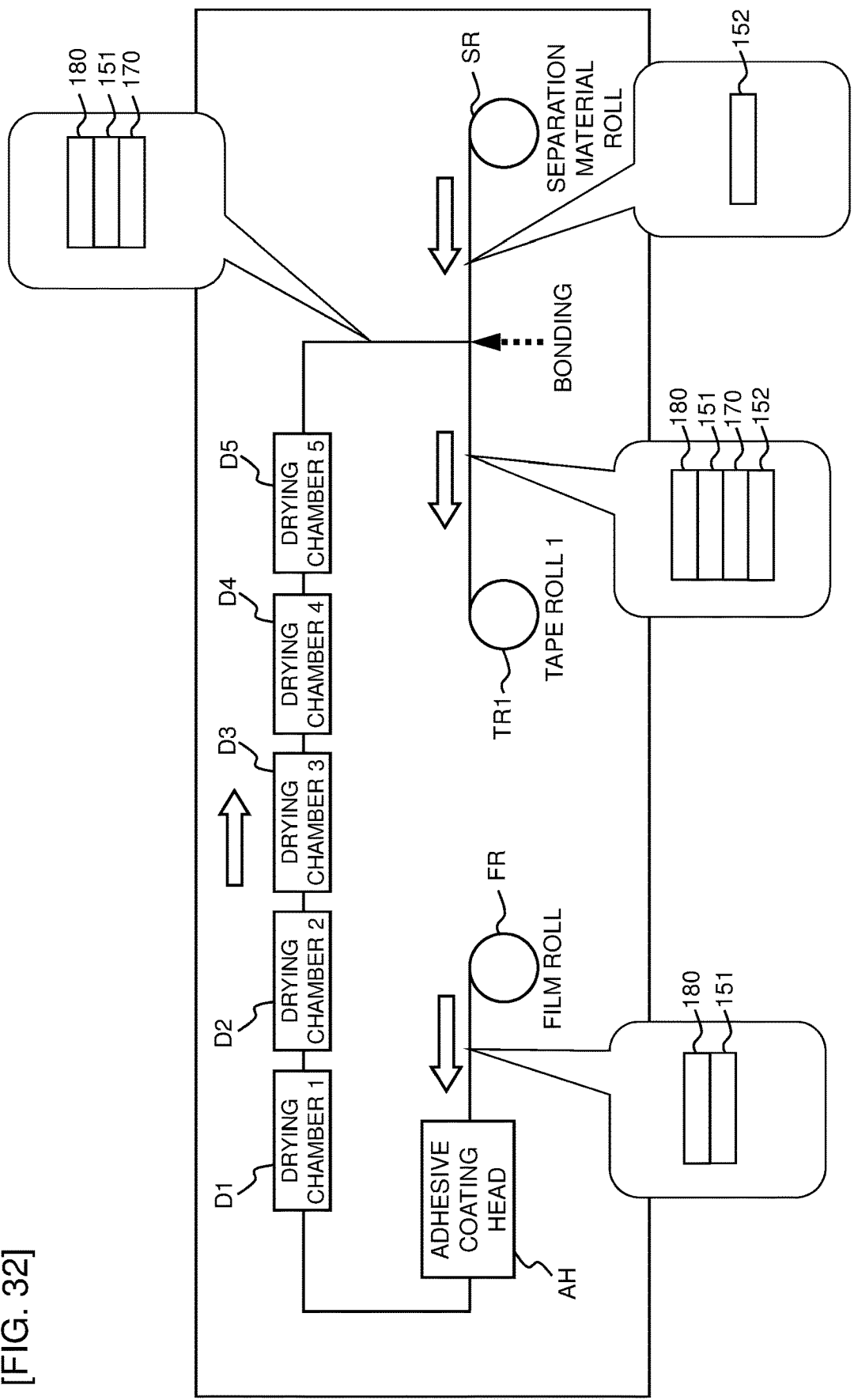
[FIG. 32]

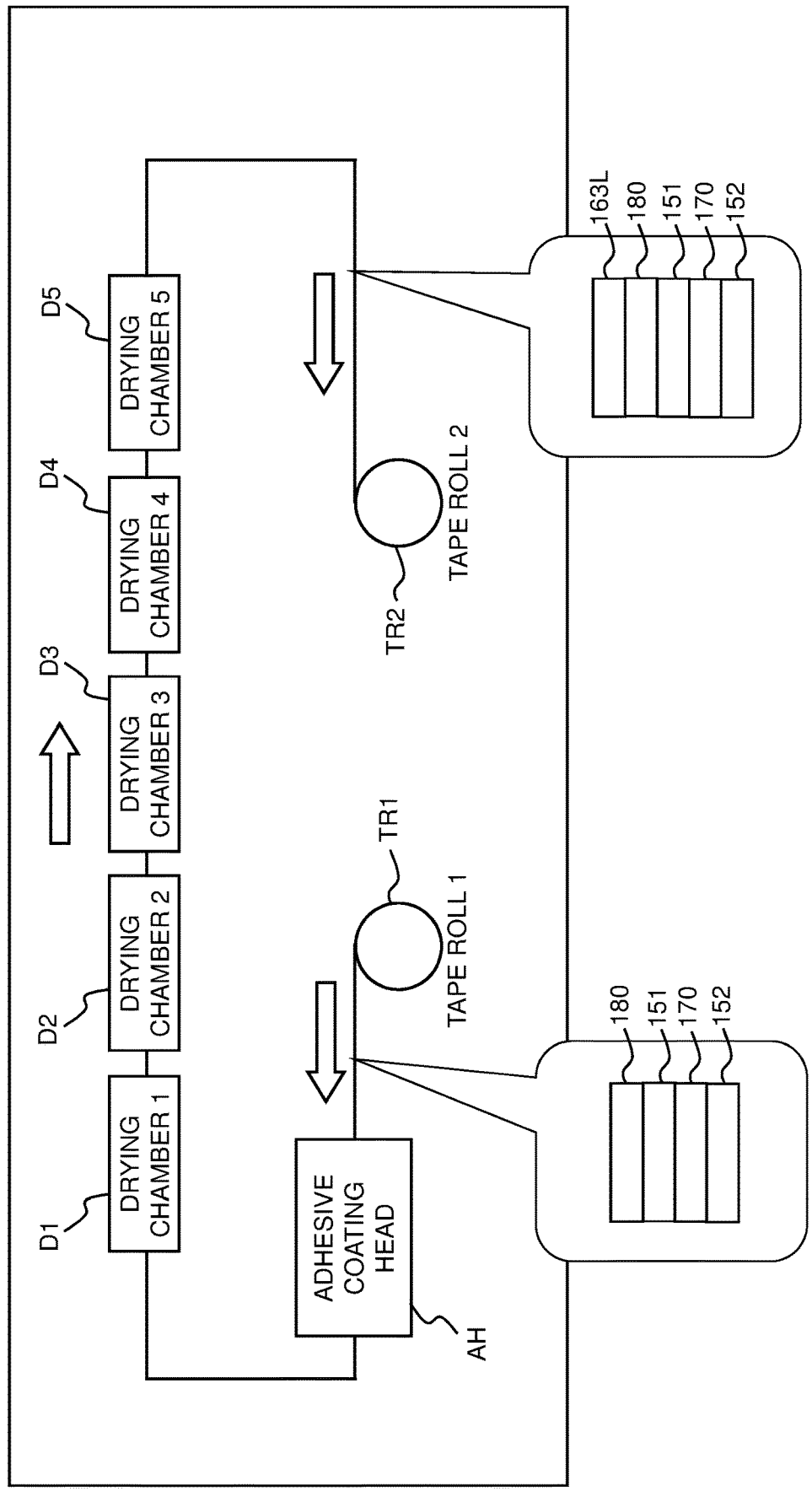
[FIG. 33]

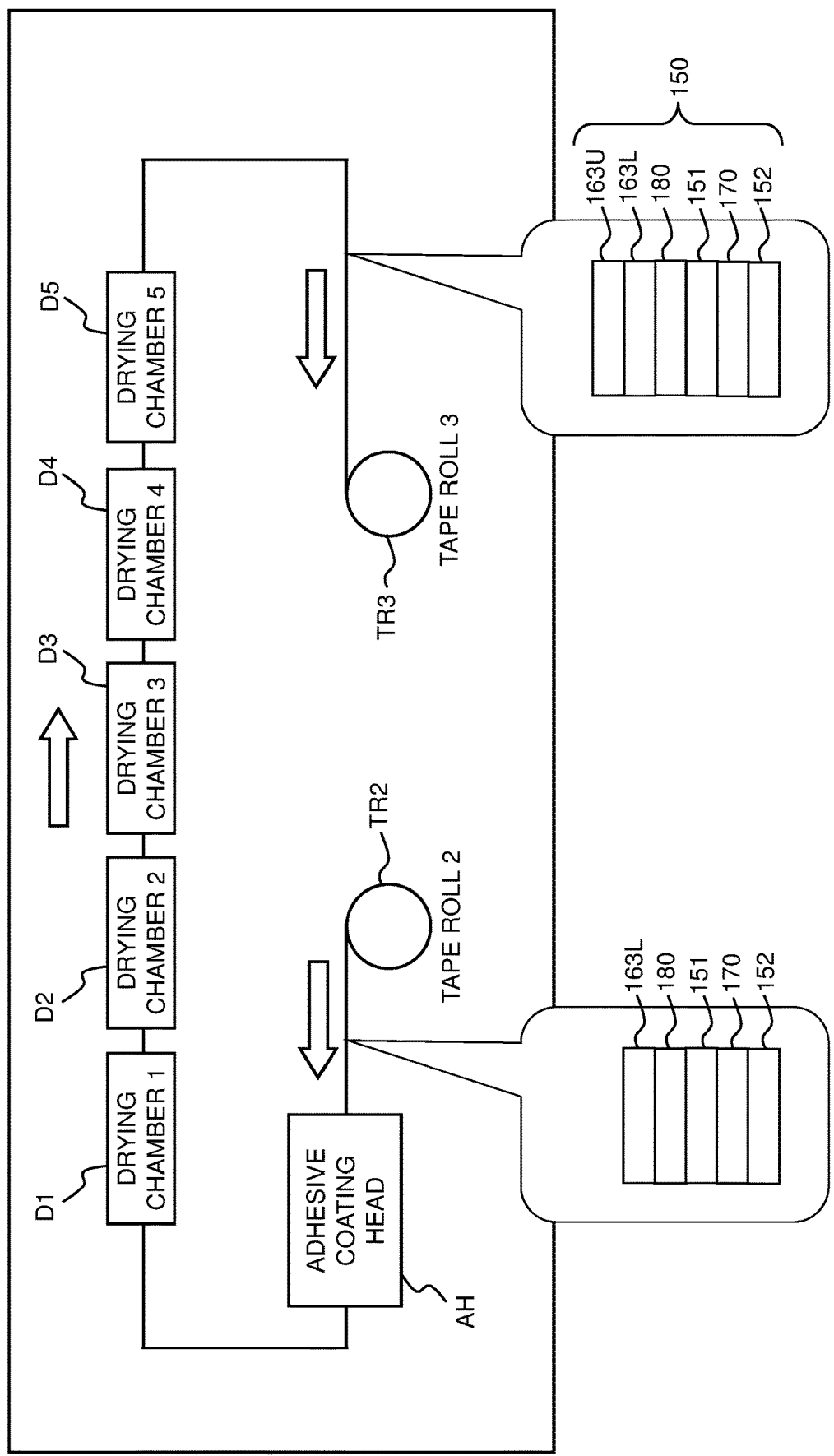

[FIG. 35]
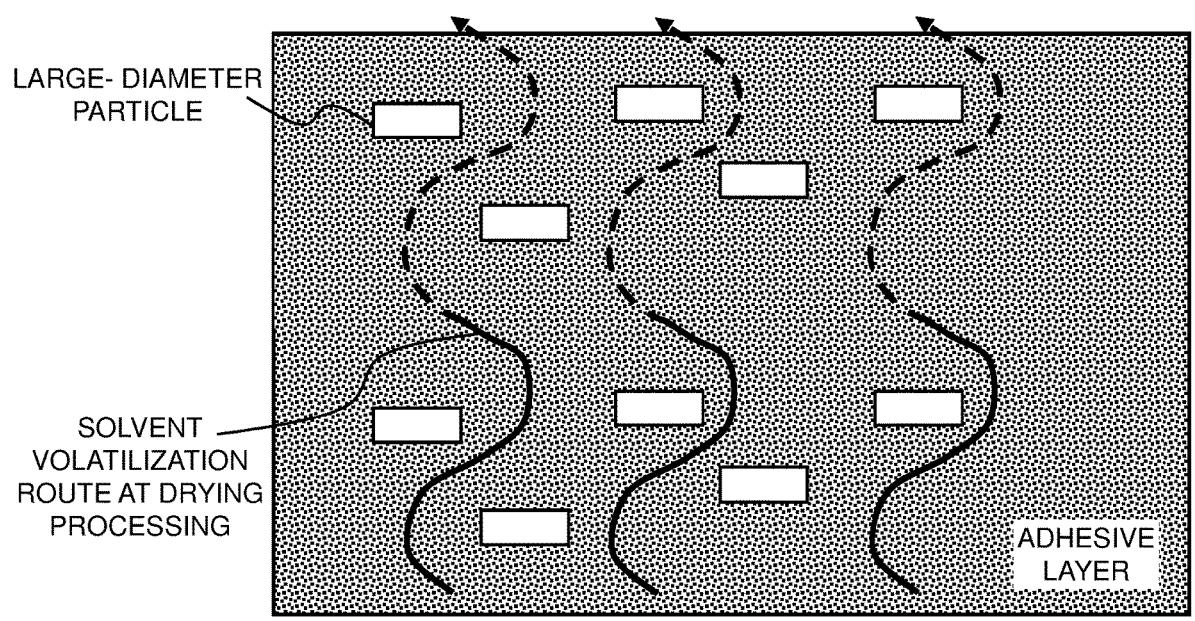

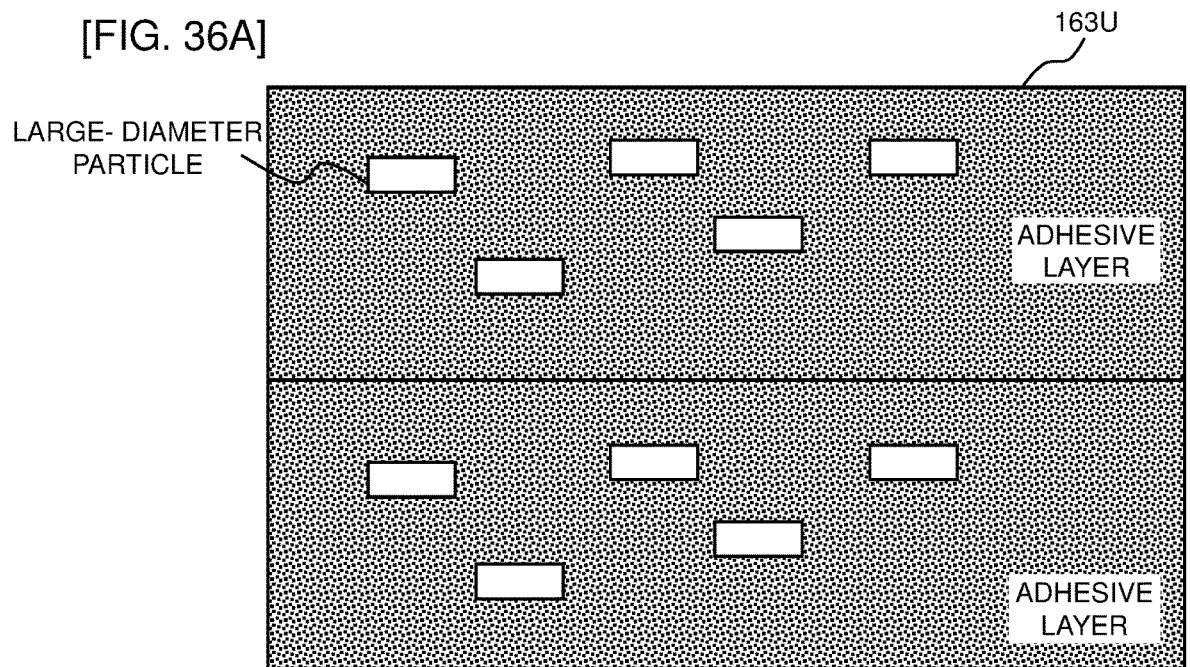
[FIG. 36A]
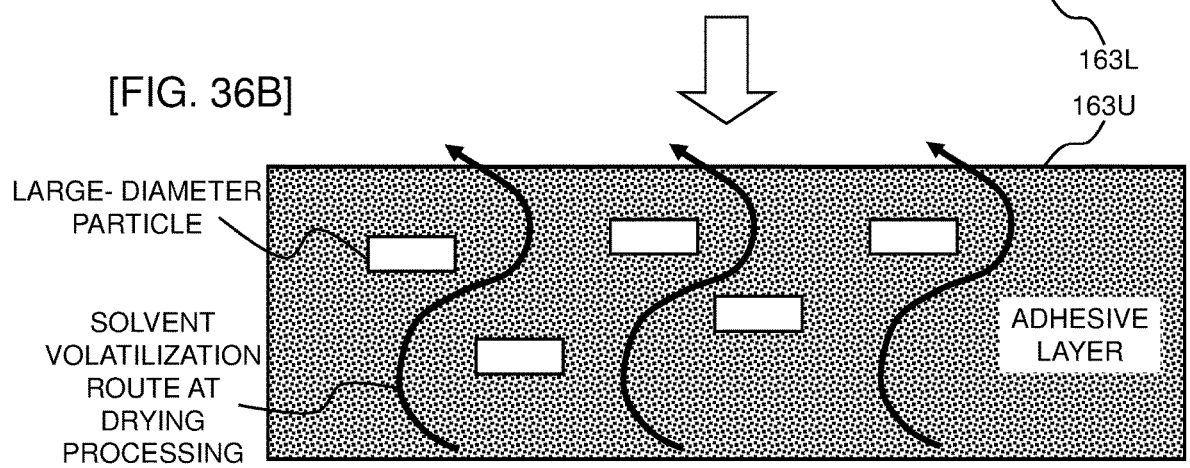
[FIG. 36B]
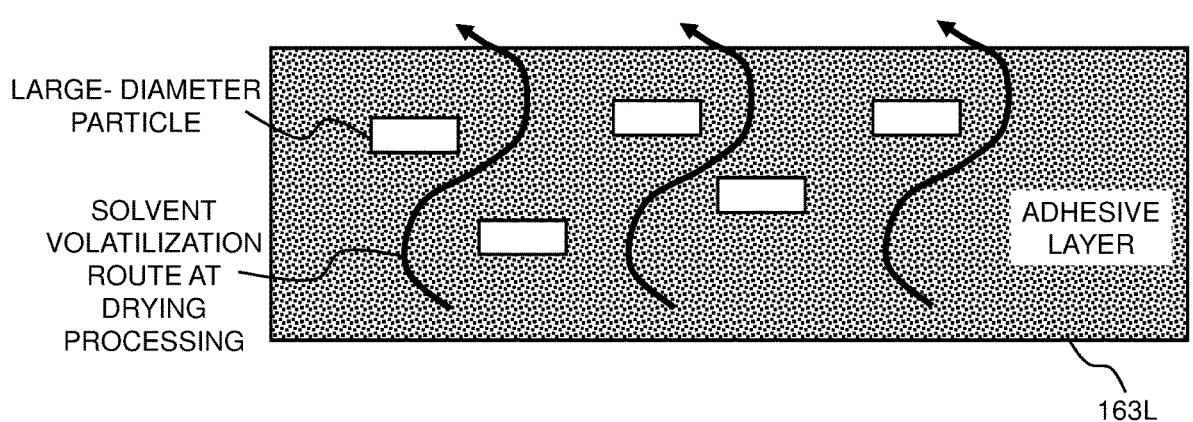

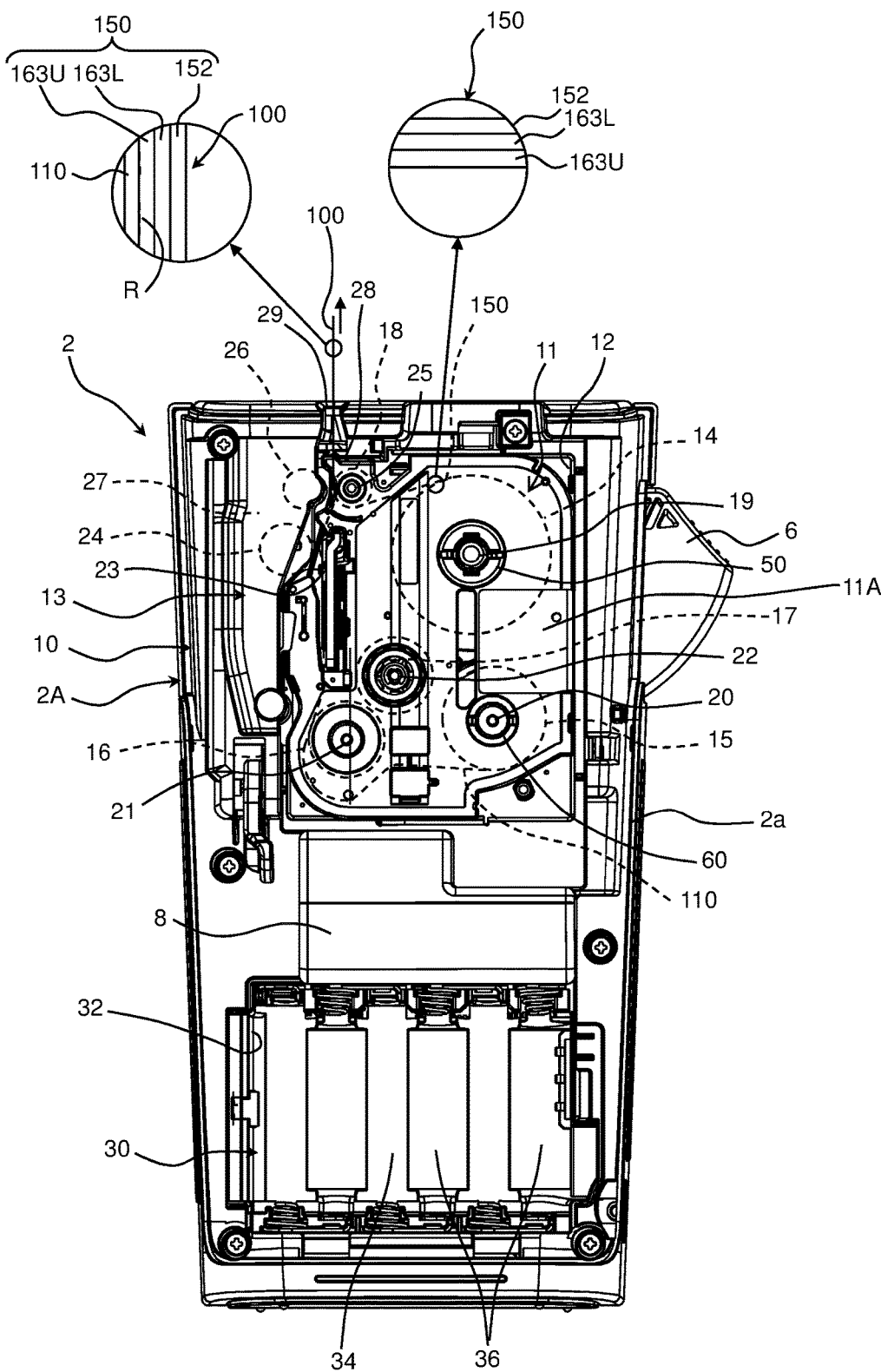
[FIG. 37]

[FIG. 38]
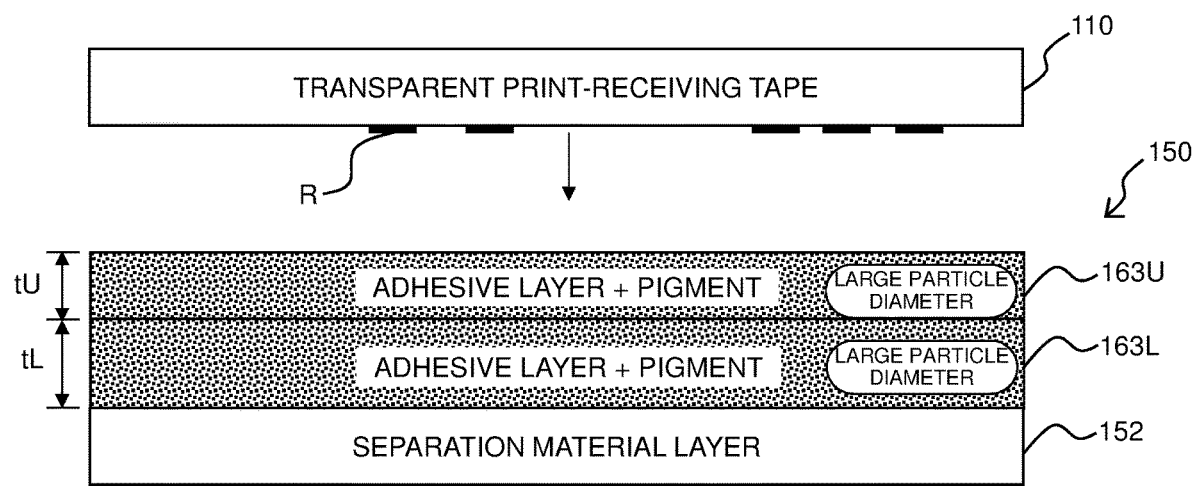

[FIG. 39A]
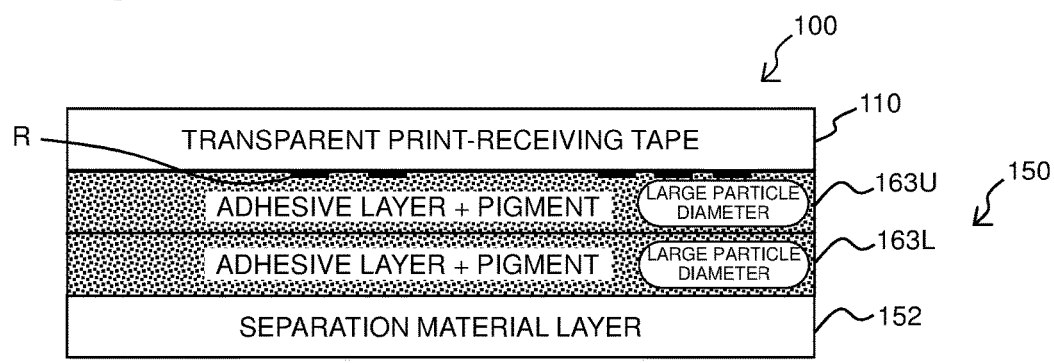
[FIG. 39B]
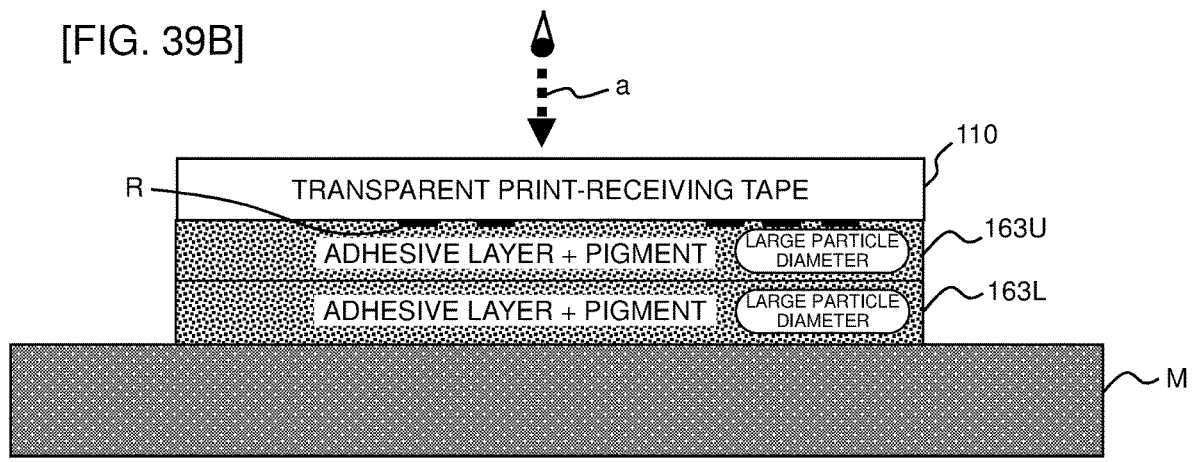

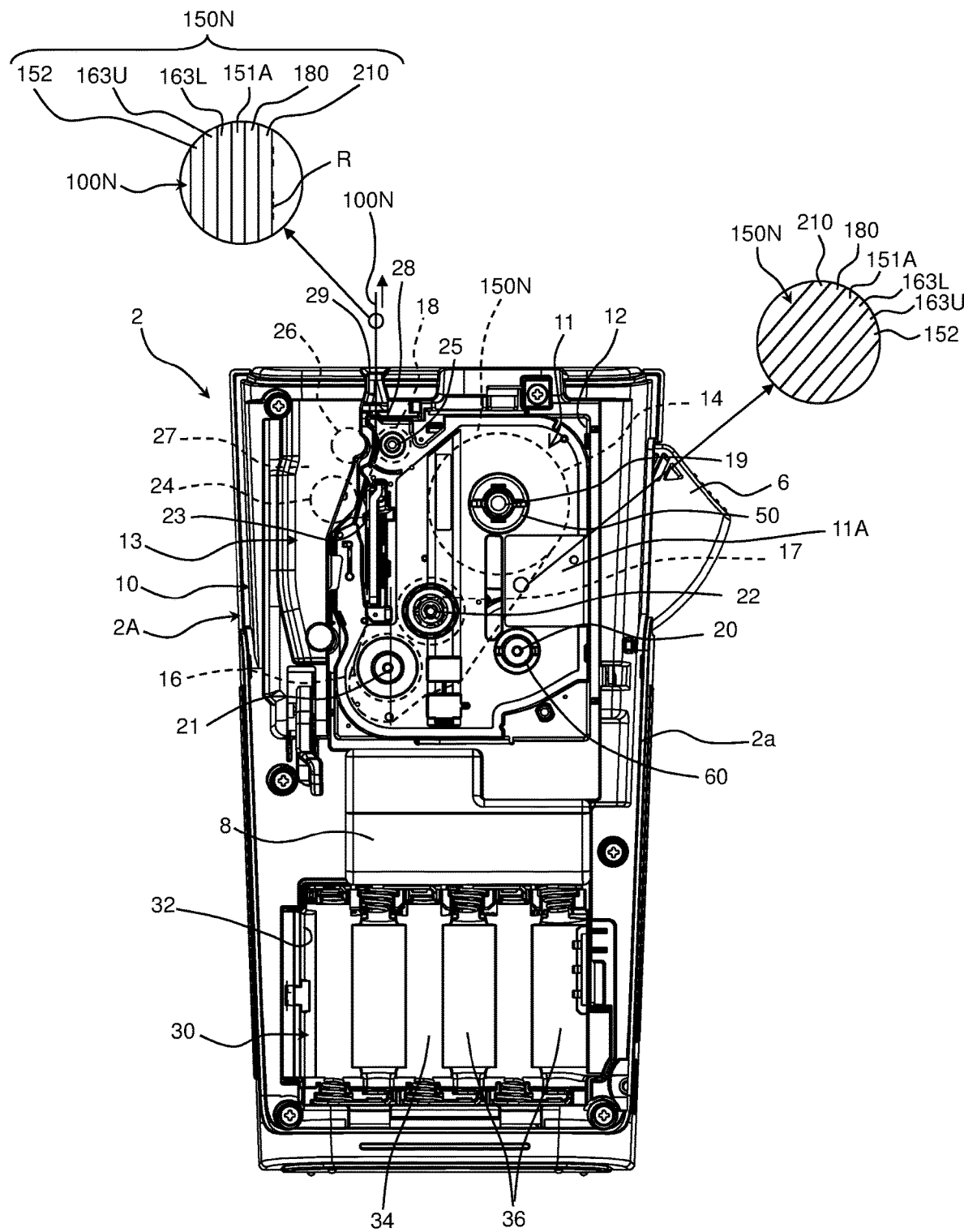
[FIG. 40]

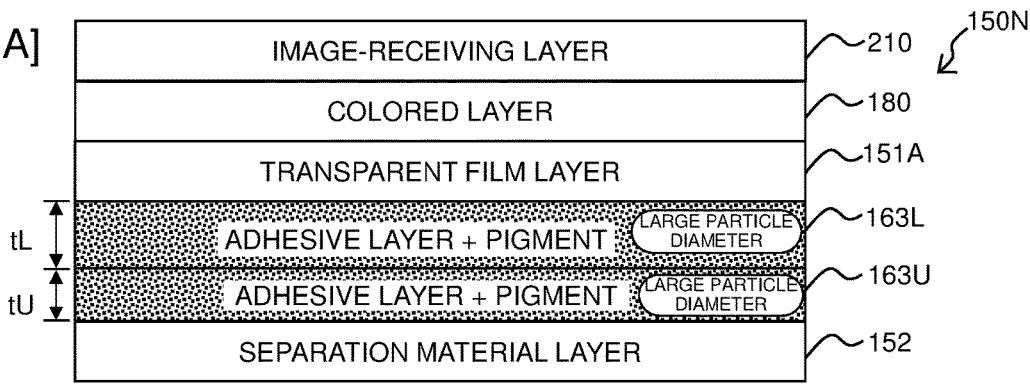
[FIG. 41A]
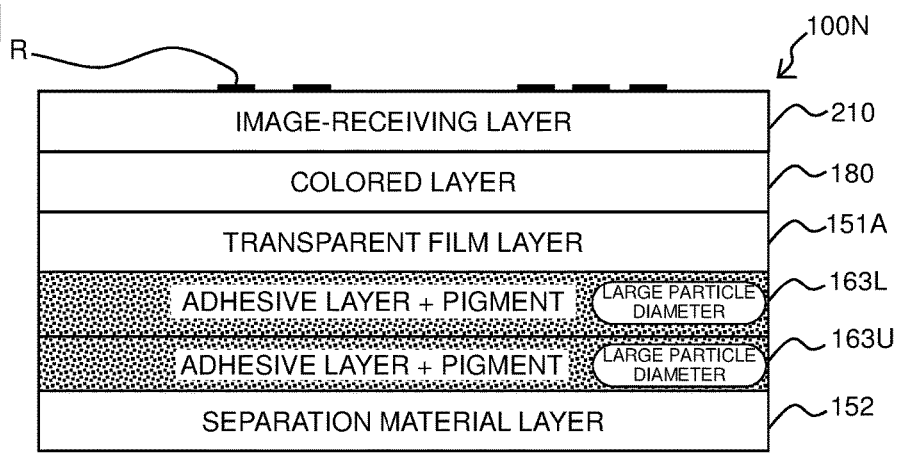
[FIG. 41B]
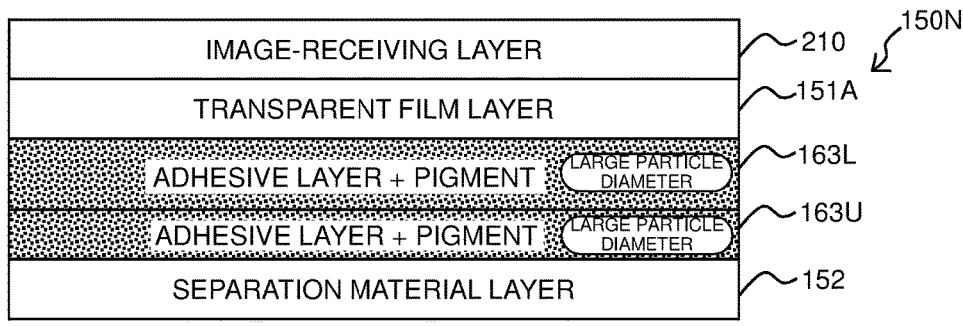
[FIG. 41C]
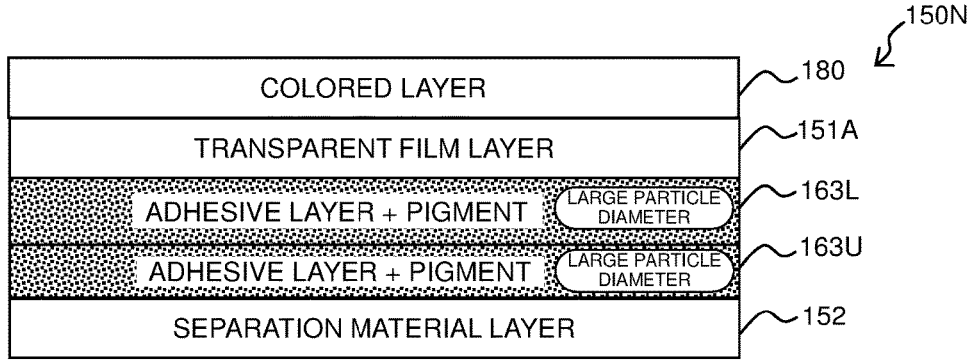
[FIG. 41D]

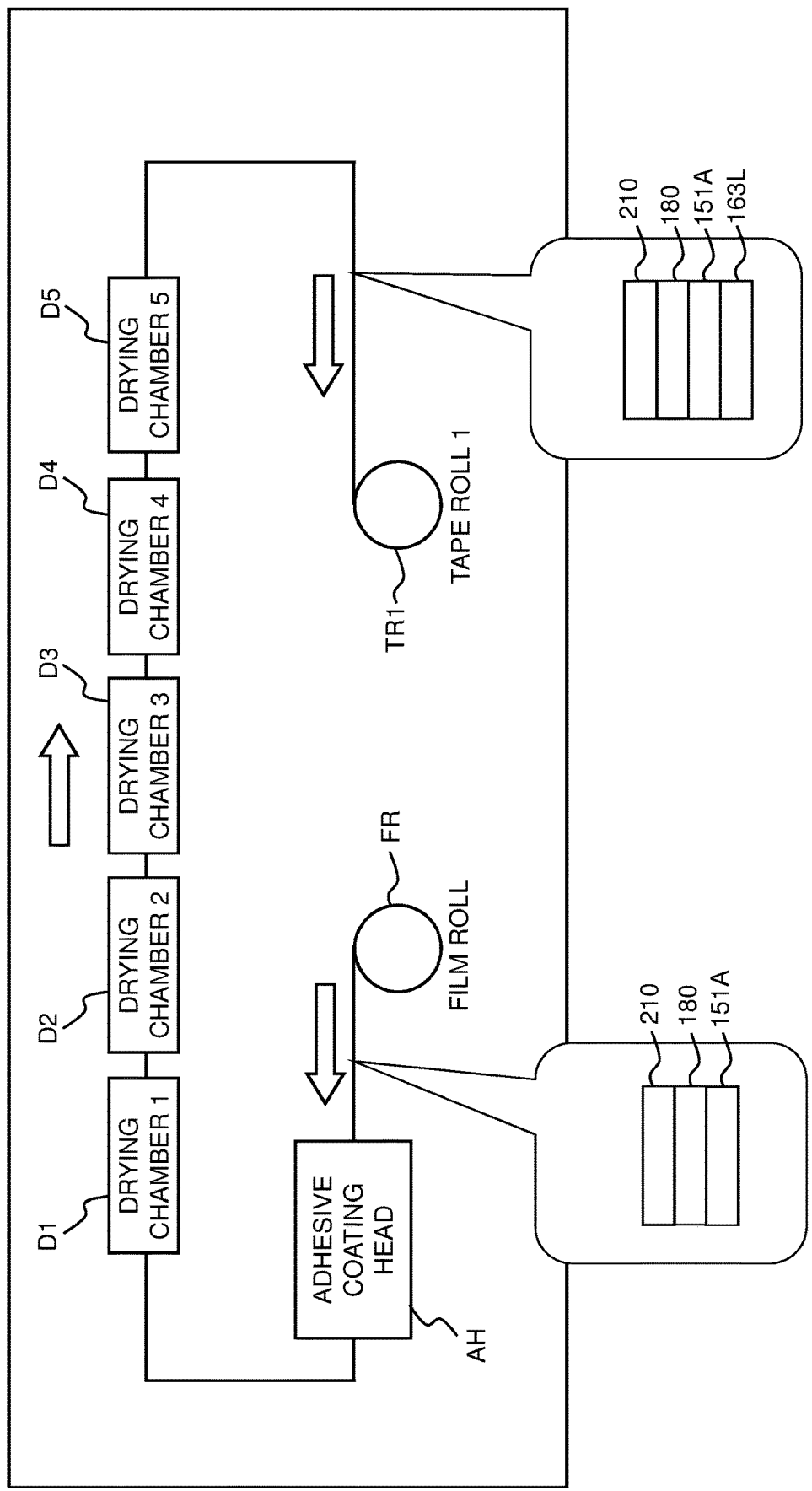

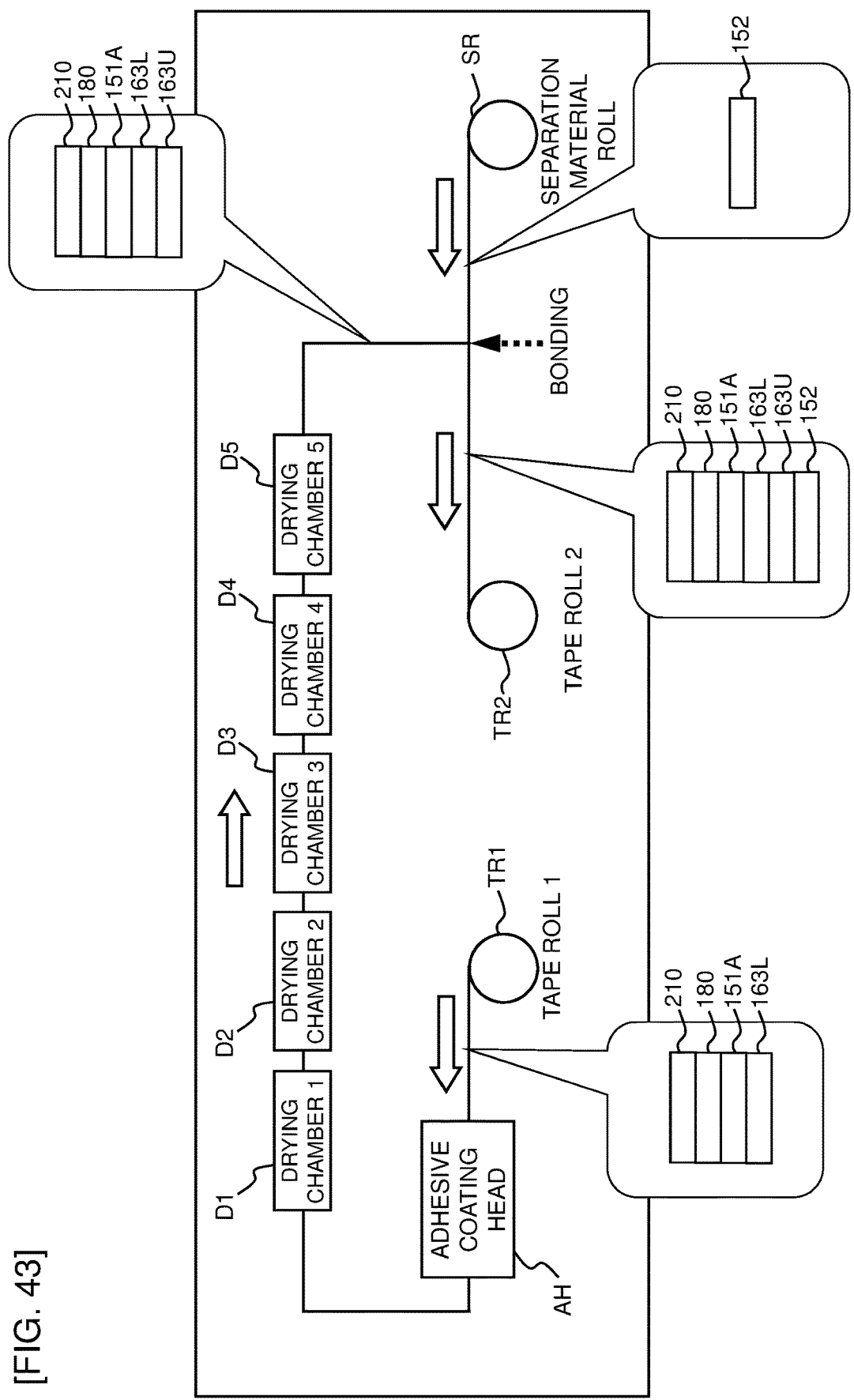
[FIG. 43]

[FIG. 44A]
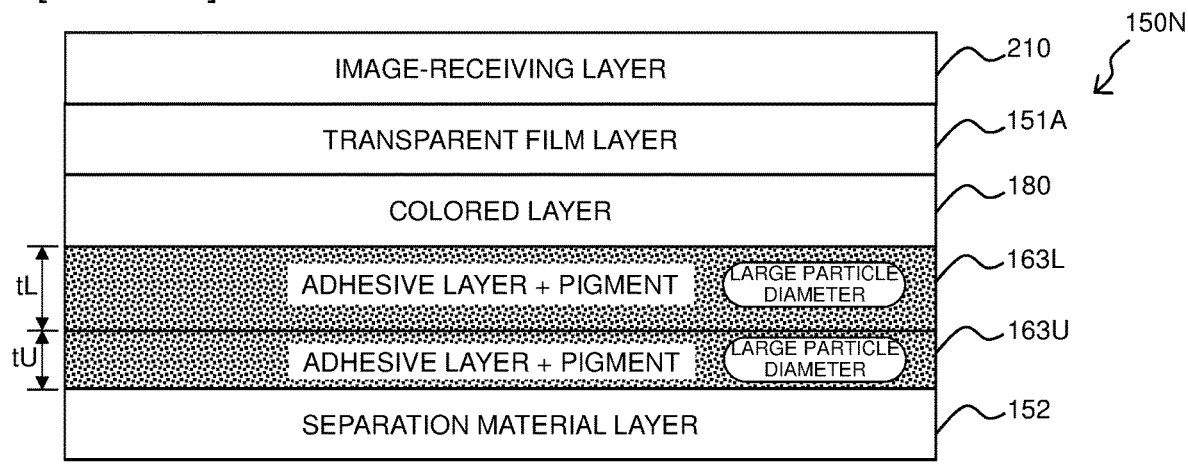
[FIG. 44B]
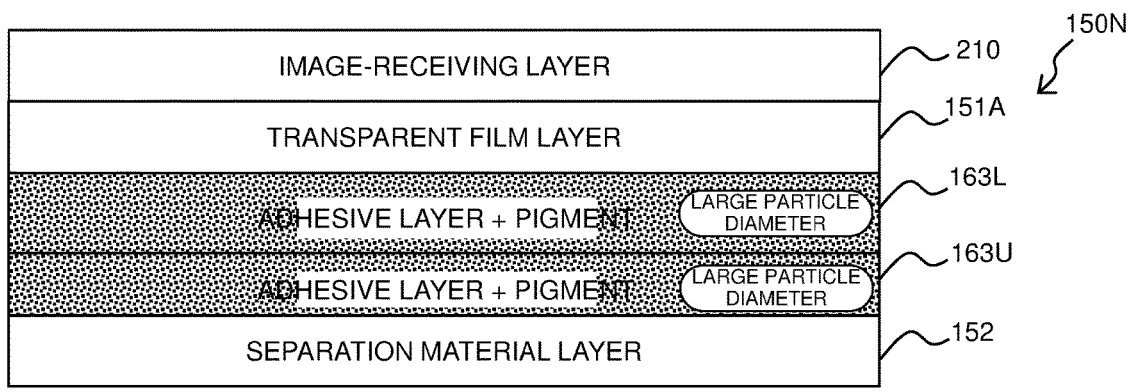
[FIG. 44C]
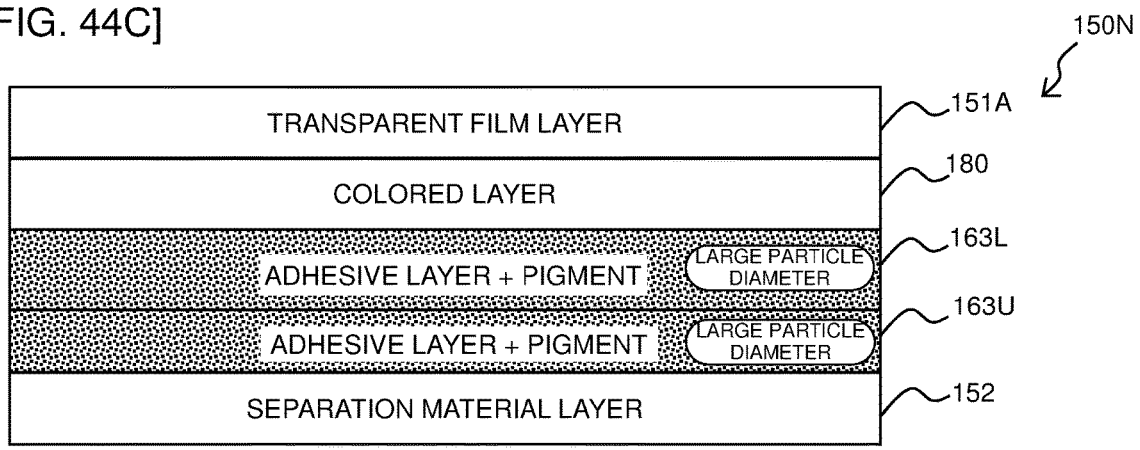

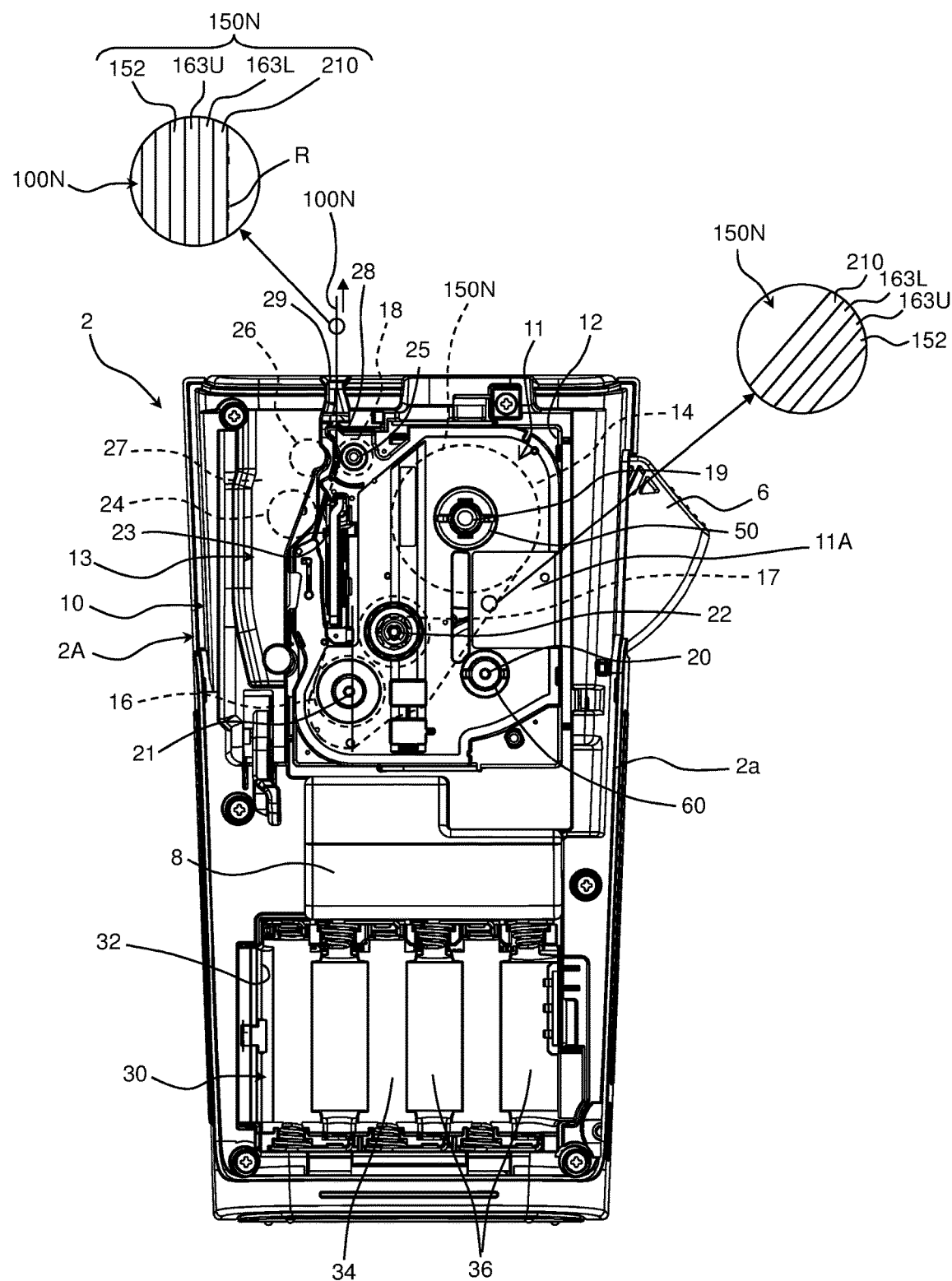
[FIG. 45]

[FIG. 46A]
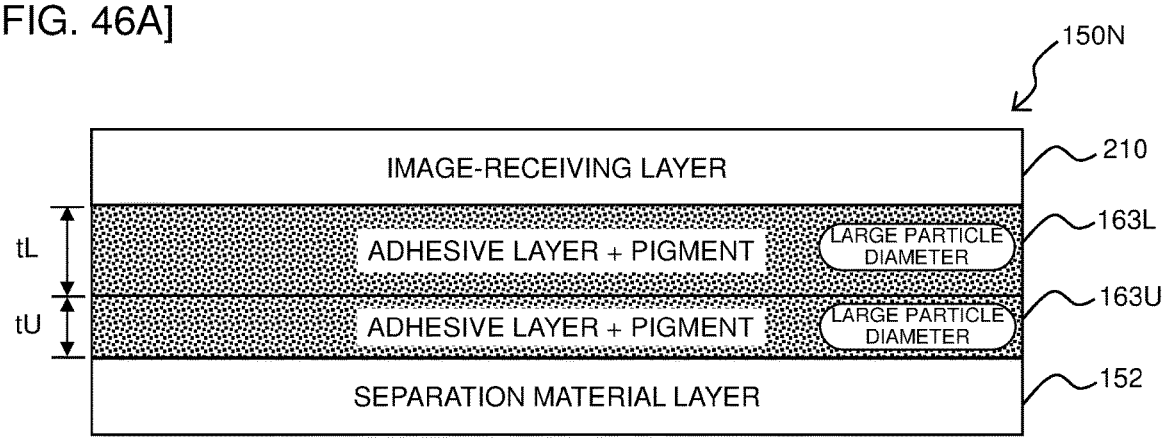
[FIG. 46B]
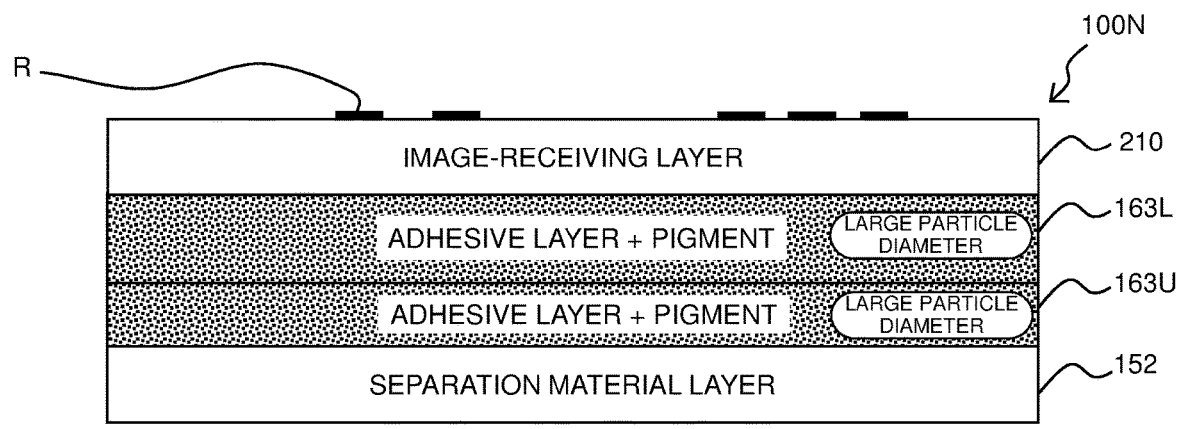

ADHESIVE TAPE CARTRIDGE, ADHESIVE TAPE ROLL, AND MANUFACTURING METHOD OF ADHESIVE TAPE ROLL

CROSS-REFERENCE TO RELATED APPLICATION

The present application claims priority from Japanese Patent Application No. 2016-195291, which was filed on Sep. 30, 2016, the disclosure of which is incorporated herein by reference in its entirety.

BACKGROUND

Field

The present disclosure relates to an adhesive tape cartridge having an adhesive tape roll into which an adhesive tape is wound, as well as to the adhesive tape roll and a manufacturing method of the adhesive tape roll.

Description of the Related Art

An adhesive tape cartridge having an adhesive tape roll into which an adhesive tape is wound has already been known. In the prior art, the adhesive tape has a layered structure including: two adhesive layers (a first adhesive layer acting as a bonding adhesive layer and a second adhesive layer acting as an affixing adhesive layer) with a base film lying therebetween; and a separation material layer (separation sheet).

For the purpose of obtaining an apparently desired color sense for example, it is conceivable in the adhesive tape of the above layered structure to add a pigment to the bonding adhesive layer that is the outermost layer. At that time, a case is conceivable where two types of pigments are desired to be used with the intention to obtain a plurality of colors in particular. However, if those two types of pigments intermix in a single layer (bonding adhesive layer), interference occurs between the two pigments, so that the pigments cannot fully exert their respective effects.

Thus, in order to separate those two types of pigments into separate layers, it is conceivable to additionally dispose two layers so as to distributedly arrange the two types of pigments into the respective layers. In this case, however, addition of the two layers results in an increased total thickness of the adhesive tape and a resultant increased number of manufacturing steps.

SUMMARY

An object of the present disclosure is to provide an adhesive tape cartridge as well as an adhesive tape roll for use therein and a manufacturing method of the adhesive tape roll, enabling a plurality of pigments to fully exert their respective effects while suppressing the increase in the total thickness of the tape and in the number of manufacturing steps.

In order to achieve the above-described object, according to the aspect of the present application, there is provided an adhesive tape cartridge comprising a housing, and an adhesive tape roll that is disposed in a housing and winds a double-faced adhesive tape, the double-faced adhesive tape comprising a base material layer, a first adhesive layer that is disposed on one side of the base material layer in a thickness direction and comprises an adhesive with a first pigment added, a second adhesive layer that is disposed on the one side of the first adhesive layer in the thickness direction and comprises an adhesive with a second pigment added, a third adhesive layer that is disposed on the other side of the base material layer in the thickness direction and comprises an adhesive, and a separation material layer that is disposed on the other side of the third adhesive layer in the thickness direction, a volume ratio of the first pigment in the first adhesive layer being greater than a volume ratio of the second pigment in the second adhesive layer.

In the disclosure of the present application, for a normal layered structure including three layers, i.e. an adhesive layer, an affixing adhesive layer, and a separation material layer, a pigment (second pigment) is added to the adhesive layer (second adhesive layer), while a new adhesive layer (first adhesive layer) is additionally disposed separately from the adhesive layer so that a pigment (first pigment) is added to the new adhesive layer. This has the following significance.

As described above, if desired to use two different pigments with the intention of obtaining two different colors for example, intermixture of those pigments within a single layer induces interference between the two pigments, preventing the pigments from fully exerting their respective effects.

Thus, in the disclosure of the present application, a pigment (second pigment) is arranged in an adhesive layer (second adhesive layer), while another adhesive layer with a pigment is newly disposed (first adhesive layer). By distributedly arranging two pigments in different layers in this manner, it is possible to suppress the interference between the two pigments arising from the intermixture, thereby enabling the pigments to fully exert their respective effects.

Since one (second pigment) of the two pigments is contained in the original adhesive layer (second adhesive layer), it is possible to suppress the increase in the total thickness of the adhesive tape and in the number of manufacturing steps. As a result, regardless of a limited space, the tape length capable of being wound onto an adhesive tape roll can be extended.

As a result of the above, according to the disclosure of the present application, two different colors can be expressed by a single tape, while suppressing the increase in the total thickness of the adhesive tape and in the number of manufacturing steps thereof.

The configuration is such that when a newly disposed layer is an adhesive layer (first adhesive layer), respective pigments are added to the two adhesive layers including the adhesive layer and the second adhesive layer. Although in general, the more a pigment is added to an adhesive layer, the lower the bonding performance becomes, this first adhesive layer has less restriction from the bonding performance, as compared with the second adhesive layer (some performance degradation is acceptable). The reason is as follows.

The first adhesive layer disposed on one side in the thickness direction of the base layer is bonded to the base layer (a colored layer when the colored layer is formed on the base layer in advance) at the time of manufacturing in the state for example where the first adhesive layer is managed in a factory manufacturing facility. On the contrary, the second adhesive layer is bonded to a print-receiving tape within a printer at the time of printing for example. For this reason, the bonding force of the second adhesive layer needs to be greater than that of the first adhesive layer (the bonding force of the first adhesive layer may be less than that of the second adhesive layer).

As a result of the above, a greater amount of the first pigment can be added to the first adhesive layer. Since the bonding performance required for the adhesive tape may be satisfied by the combination of the first adhesive layer and the second adhesive layer, the restriction from the bonding performance in the second adhesive layer can also become less than the case of the three-layered structure described above.

BRIEF DESCRIPTION OF DRAWINGS

FIG. 1 is a perspective view showing a front appearance of a print label producing device mounted with an adhesive tape cartridge of a first embodiment of the present disclosure.

FIG. 2 is a plan view showing a rear internal structure of a device body of the print label producing device.

FIG. 3 is an explanatory view showing a layered structure of a transparent print-receiving tape and a double-faced adhesive tape.

FIG. 4A is an explanatory view showing a layered structure of a print tape.

FIG. 4B is an explanatory view showing a state where the print tape is adhered to an adherend.

FIG. 5A is an explanatory view showing a layered structure of the double-faced adhesive tape with a colored layer removed.

FIG. 5B is an explanatory view showing a state where the print tape using the double-faced adhesive tape is adhered to the adherend.

FIG. 6 is a view showing a manufacturing process of the double-faced adhesive tape.

FIG. 7 is a view showing a manufacturing process of the double-faced adhesive tape.

FIG. 8 is a view showing a manufacturing process of the double-faced adhesive tape.

FIG. 9A is an explanatory view showing a modification example in which a coloring glitter pigment is added to the adhesive layer.

FIG. 9B is an explanatory view showing a modification example in which the coloring glitter pigment is added to the adhesive layer, with the colored layer removed.

FIG. 10A is an explanatory view showing a modification example having a difference in particle diameters of glitter pigments added respectively to two adhesive layers.

FIG. 10B is an explanatory view showing a modification example having a difference in particle diameters of the glitter pigments added respectively to the two adhesive layers, with the colored layer removed.

FIG. 11A is an explanatory view showing a layered structure of a double-faced adhesive tape according to a second embodiment of the present disclosure.

FIG. 11B is an explanatory view showing a state where a print tape using the double-faced adhesive tape according to the second embodiment of the present disclosure is adhered to the adherend.

FIG. 12 is a view showing a manufacturing process of the double-faced adhesive tape.

FIG. 13 is a view showing a manufacturing process of the double-faced adhesive tape.

FIG. 14A is an explanatory view showing a layered structure of a double-faced adhesive tape according to a modification example with a transparent film layer removed.

FIG. 14B is an explanatory view showing a state where a print tape using the double-faced adhesive tape according to the modification example with the transparent film layer removed is adhered to an adherend.

FIG. 15 is a plan view showing a rear internal structure of a print label producing device mounted with an adhesive tape cartridge of a third embodiment of the present disclosure.

FIG. 16A is an explanatory view showing a layered structure of an adhesive tape.

FIG. 16B is an explanatory view showing a layered structure of the adhesive tape.

FIG. 17 is a view showing a manufacturing process of the adhesive tape.

FIG. 18 is a view showing a manufacturing process of the adhesive tape.

FIG. 19A is an explanatory view showing a layered structure of the adhesive tape with the colored layer removed.

FIG. 19B is an explanatory view showing a layered structure of the adhesive tape with an image receiving layer removed.

FIG. 20A is an explanatory view showing a layered structure of an adhesive tape of a modification example in which a coloring glitter pigment is added.

FIG. 20B is an explanatory view showing a layered structure of an adhesive tape of a modification example in which the colored layer is removed.

FIG. 20C is an explanatory view showing a layered structure of an adhesive tape of a modification example with the image receiving layer removed.

FIG. 21A is an explanatory view showing a layered structure of an adhesive tape of a modification example with the transparent film layer and the colored layer being interchanged.

FIG. 21B is an explanatory view showing a layered structure of an adhesive tape of a modification example with the colored layer removed.

FIG. 21C is an explanatory view showing a layered structure of an adhesive tape of a modification example with the image receiving layer removed.

FIG. 22A is an explanatory view showing a layered structure of an adhesive tape of a modification example with the coloring glitter pigment added.

FIG. 22B is an explanatory view showing a layered structure of an adhesive tape of a modification example with the colored layer removed.

FIG. 22C is an explanatory view showing a layered structure of an adhesive tape of a modification example with the image receiving layer removed.

FIG. 23A is an explanatory view showing a layered structure of an adhesive tape of a modification example having a difference in particle diameters of glitter pigments added respectively to two adhesive layers.

FIG. 23B is an explanatory view showing a layered structure of an adhesive tape of a modification example with the colored layer removed.

FIG. 23C is an explanatory view showing a layered structure of an adhesive tape of a modification example with the image receiving layer removed.

FIG. 24A is an explanatory view showing a layered structure of a modification example with the transparent film layer and the colored layer being interchanged.

FIG. 24B is an explanatory view showing a layered structure of a modification example with the colored layer removed.

FIG. 24C is an explanatory view showing a layered structure of a modification example with the image receiving layer removed.

FIG. 25 is a plan view showing a rear internal structure of a device body of a print label producing device, in a modification example expanded to a laminated type with the film layer removed.

FIG. 26 is an explanatory view showing a layered structure of a transparent print-receiving tape and a double-faced adhesive tape.

FIG. 27A is an explanatory view showing a layered structure of a print tape.

FIG. 27B is an explanatory view showing a state where the print tape is adhered to an adherend.

FIG. 28 is a plan view showing a rear internal structure of a print label producing device mounted with an adhesive tape cartridge of a fourth embodiment of the present disclosure.

FIG. 29 is an explanatory view showing a layered structure of a double-faced adhesive tape.

FIG. 30A is an explanatory view showing a layered structure of a print tape.

FIG. 30B is an explanatory view showing a state where the print tape is adhered to an adherend.

FIG. 31 is an explanatory view showing a layered structure of the double-faced adhesive tape with a colored layer removed.

FIG. 32 is a view showing a manufacturing process of the double-faced adhesive tape.

FIG. 33 is a view showing a manufacturing process of the double-faced adhesive tape.

FIG. 34 is a view showing a manufacturing process of the double-faced adhesive tape.

FIG. 35 is an explanatory view for explaining an effect of promoting volatilization of residual solvent at the time of drying processing.

FIG. 36A is an explanatory view for explaining the effect of promoting volatilization of residual solvent at the time of drying processing.

FIG. 36B is an explanatory view for explaining the effect of promoting volatilization of residual solvent at the time of drying processing.

FIG. 37 is a plan view showing a rear internal structure of a device body of a print label producing device in a modification example with a film layer removed.

FIG. 38 is an explanatory view showing a layered structure of a transparent print-receiving tape and a double-faced adhesive tape.

FIG. 39A is an explanatory view showing a layered structure of a print tape.

FIG. 39B is an explanatory view showing a state where the print tape is adhered to an adherend.

FIG. 40 is a plan view showing a rear internal structure of a print label producing device in a modification example using a non-laminated type cartridge.

FIG. 41A is an explanatory view showing a layered structure of an adhesive tape.

FIG. 41B is an explanatory view showing a layered structure of the adhesive tape.

FIG. 41C is an explanatory view showing a modification example with a colored layer removed.

FIG. 41D is an explanatory view showing a modification example with an image receiving layer removed.

FIG. 42 is a view showing a manufacturing process of the adhesive tape.

FIG. 43 is a view showing a manufacturing process of the adhesive tape.

FIG. 44A is an explanatory view showing a layered structure of an adhesive tape of a modification example with the transparent film layer and the colored layer being interchanged.

FIG. 44B is an explanatory view showing a layered structure of an adhesive tape of a modification example with the colored layer removed.

FIG. 44C is an explanatory view showing a layered structure of an adhesive tape of a modification example with the image receiving layer removed.

FIG. 45 is a plan view showing a rear internal structure of a device body of a print label producing device in a modification example with a film layer removed.

FIG. 46A is an explanatory view showing a layered structure of an adhesive tape.

FIG. 46B is an explanatory view showing a layered structure of a print tape.

DETAILED DESCRIPTION OF THE PREFERRED EMBODIMENTS

Embodiments of the present disclosure will now be described with reference to the drawings. In the following description, "top", "bottom", "front", "rear", and "width" of a print label producing device 1 correspond respectively to directions of arrows appropriately indicated in views of FIG. 1, etc.

First Embodiment

Referring to FIGS. 1 to 10, a first embodiment of the present disclosure will be described.

<Overall Structure of Print Label Producing Device>

FIGS. 1 and 2 show an example of a print label producing device that is mounted with an adhesive tape cartridge of this embodiment. In FIGS. 1 and 2, the print label producing device 1 is handheld electronic equipment grasped by a user's hand. The print label producing device 1 comprises a device body 2 and a cover 3 attached removably to a rear surface of the device body 2.

The device body 2 includes a thin flat substantially rectangular parallelepiped housing 2A elongated in the top-bottom direction. A front surface of the housing 2A has, at its upper portion, a liquid crystal display part 4 for displaying print data, a setting screen, etc. and, below the liquid crystal display part 4, a keyboard part 5 for operating the label producing device 1. The keyboard part 5 has keys arranged thereon including letter keys such as letters, symbols, and numerals and various function keys. A side wall portion 2a on one side (left side in FIG. 1, right side in FIG. 2) in the width direction of the housing 2A has at its upper portion a cut operation lever 6 for cutting a printed label tape.

<Label Production Mechanism of Print Label Producing Device>

As shown in FIG. 2, the device body 2 comprises a label production part 10 and a battery storage part 30. The label production part 10 and the battery storage part 30 are comparted by a container part 8 containing a control substrate, a motor, etc. not shown. The battery storage part 30 has a rectangular recessed portion 32. A plurality of shallow concaves extending in the top-bottom direction are arranged along the width direction on a bottom 34 of the recessed portion 32. The same number of batteries not shown are stored in upper and lower stages within the battery storage part 30.

The label production part 10 comprises: a recessed cartridge holder 12 for removably attaching an adhesive tape cartridge 11 (hereinafter, referred to simply as "cartridge 11"), disposed so as to occupy most of substantially the upper half of the device body 2; and a printing/feeding mechanism 13 disposed in a region including the other side (left side in FIG. 2) in the width direction of the cartridge holder 12.

The cartridge 11 is called a so-called laminated type in this embodiment and comprises, within the interior of a housing 11A as shown in FIG. 2, an adhesive tape roll 14, a print-receiving tape roll 15, an ink ribbon roll 16, an ink ribbon take-up roller 17, and a feeding roller 18. The adhesive tape roll 14 is made up by winding a double-faced adhesive tape 150 around a spool 50. As shown in an enlarged view in FIG. 2, the double-faced adhesive tape 150 includes: an adhesive layer 161 to which a permeable glitter pigment is added; an adhesive layer 162 to which a solid pigment is added; a colored layer 180; a film layer 151; an adhesive layer 170; and a separation material layer 152; laminated in the mentioned order from the spool 50 lying on a radial center side toward the radial outside. As shown in FIG. 2, the print-receiving tape roll 15 is made up by winding a print-receiving tape 110 having a transmittance of 20% or more for example around a spool 60.

The printing/feeding mechanism 13 comprises a support shaft 19 of the adhesive tape roll 14, a support shaft 20 of the print-receiving tape roll 15, a support shaft 21 of the ink ribbon roll 16, a driving shaft 22 of the ink ribbon take-up roller 17, a thermal head 23, a platen roller 24, a driving shaft 25 of the feeding roller 18, and a pressing roller 26. The platen roller 24 together with the pressing roller 26 is fitted to a roll holder 27 so that swinging of the roll holder 27 can cause switching between a printing/feeding position (position shown in FIG. 2) where the platen roller 24 and the pressing roller 26 are in contact with the thermal head 23 and the feeding roller 18, respectively, and a standby position not shown where the platen roller 24 and the pressing roller 26 are apart from the thermal head 23 and the feeding roller 18, respectively.

At the time of producing print labels, the platen roller 24 and the pressing roller 26 are switched to the printing/feeding position. The platen roller 24 switched to the printing/feeding position rotates by drive of a driving shaft not shown of the device body 2 and presses the print-receiving tape 110 fed out from the print-receiving tape roll 15 and an ink ribbon not shown fed out from the ink ribbon roll 16 against the thermal head 23. As a result, ink of the ink ribbon is transferred onto the print-receiving tape 110 by heat reception from the thermal head 23 so that a desired print R (see FIG. 3, etc. described later) is formed on the print-receiving tape 110 so that the platen roller 24 feeds the print-receiving tape 110 having the print formed thereon and the ink ribbon toward the feeding roller 18. The print-terminated ink ribbon is then separated from the print-receiving tape 110 and is taken up by the ink ribbon take-up roller 17.

On the other hand, the pressing roller 26 switched to the printing/feeding position presses the print-formed print-receiving tape 110 fed by the platen roller 24 and the double-faced adhesive tape 150 fed out from the adhesive tape roll 14 against the feeding roller 18 rotating by drive of the driving shaft 25. As a result, as shown in an enlarged view (see also FIGS. 3 and 4 described later), the print-receiving tape 110 having the print R formed thereon and the double-faced adhesive tape 150 are bonded together to form a print tape 100, while simultaneously the feeding roller 18 feeds the print tape 100 toward a label discharging exit 29 disposed on an upper end of the device body 2. At a predetermined point of time when the print tape 100 is discharged from the label discharging exit 29, a user manually operates a cutting operation lever 6 to activate a cutter 28 disposed in the vicinity of the label discharging exit 29, to cut the print tape 100 to form a predetermined length of print tape 100 (i.e. print label).

<Details of Tape Layered Structure>

FIG. 3 is an explanatory view showing a layered structure of the print-receiving tape 110 and the double-faced adhesive tape 150.

As shown in FIG. 3, the double-faced adhesive tape 150 includes: the film layer 151; the colored layer 180 disposed in contact with the film layer 151 on the upper side of the diagram; the adhesive layer 162 disposed in contact with the colored layer on the upper side of the diagram, the adhesive layer 162 having a solid pigment (details will be described later) added at a desired volume ratio (5-50% relative to the entire adhesive layer); the adhesive layer 161 disposed in contact with the adhesive layer 162 on the upper side of the diagram, the adhesive layer 161 having a permeable glitter pigment added at a desired volume ratio (5-50% relative to the entire adhesive layer); the adhesive layer 170 disposed in contact with the film layer 151 on the lower side of the diagram; and the separation material layer 152 disposed in contact with the adhesive layer 170 on the lower side of the diagram so as to cover the adhesive layer 170.

At this time, this embodiment has a feature that the volume ratio (the ratio relative to the entire layer; hereinafter, the same will apply to all embodiments and modification examples) of the solid pigment in the adhesive layer 162 is greater than the volume ratio of the glitter pigment in the adhesive layer 161. Specifically, for example, the volume ratio of the solid pigment in the adhesive layer 162 is 1.5 times or more the volume ratio of the glitter pigment in the adhesive layer 161.

The volume ratio can be calculated by the following procedure for example. A glitter pigment containing adhesive having a measured volume and weight is dissolved in a solvent so that the glitter pigment is separated by centrifugation to determine the weight of the glitter pigment and measure the true specific gravity of the glitter pigment particles to determine the volume of the glitter pigment. By subtracting the volume of the glitter pigment from the volume of the glitter pigment containing adhesive, the volume of the adhesive can be determined. Furthermore, by observing a cross section of the adhesive layer with an electron microscope or an optical microscope, the area and the ratio of the pigment existing on the cross section can be determined and, by continuously increasing the cross section to be measured, conversion to volume becomes possible so that the volume ratio can be determined (hereinafter, the same will apply to the modification examples and other embodiments described later).

A thickness to of the glitter pigment containing adhesive layer 161 is smaller than a thickness tC of the adhesive layer 170; a thickness tB of the solid pigment containing adhesive layer 162 is smaller than the thickness tC of the adhesive layer 170; and the sum of the thickness to of the adhesive layer 161 and the thickness tB of the adhesive layer 162 is greater than the thickness tC of the adhesive layer 170.

The glitter pigment contained in the adhesive layer 161 has a transmittance of 20% or more.

On the other hand, the print-receiving tape 110 has the print R as described above on a surface on the side (lower side of the diagram; the other side in the thickness direction in this embodiment) facing the double-faced adhesive tape 150. The print-receiving tape 110 is bonded via the adhesive layer 161 to the double-faced adhesive tape 150.

FIG. 4A shows a layered structure of the print tape 100 formed by bonding the print-receiving tape 110 and the double-faced adhesive tape 150 together, while FIG. 4B shows a state where the print tape 100 is adhered via the adhesive layer 170 to an adherend M with the separation material layer 152 being separated from the print tape 100. As a result of the bonding, as shown in FIG. 4A, the print tape 100 is made up by laminating, from the upper side of the diagram toward the lower side thereof, the print-receiving tape 110, the adhesive layer 161 (to which the permeable glitter pigment is added), the adhesive layer 162 (to which the solid pigment is added), the colored layer 180, the film layer 151, the adhesive layer 170, and the separation material layer 152, in the mentioned order.

At this time, as shown in FIG. 5A, the configuration may be such that the adhesive layer 162 is disposed in contact with the film layer 151 on the upper side of the diagram, without interposing the colored layer 180 between the adhesive layer 162 and film layer 151. FIG. 5B shows a state where the print tape 100 produced as above using the double-faced adhesive tape 150 of such a configuration is adhered via the adhesive layer 170 to the adherend M, with the separation material layer 152 being separated from the print tape 100.

The separation material layer 152 is formed by coating a base material with a separation material for example. The base material can be paper, PET film, OPP film, polyethylene film, etc. The separation material can be silicone resin, polyethylene resin, etc.

The adhesives of the adhesive layer 161, the adhesive layer 162, and the adhesive layer 170 can be for example urethane resin-based, silicone resin-based, vinyl resin-based, polyester resin-based, synthetic rubber-based, natural rubber-based, and acrylic resin-based adhesives.

The solid pigment added to the adhesive layer 162 can be inorganic pigments such as oxides and organic pigments such as a textile printing-based pigment. The inorganic pigments can be for example: oxides such as titanium dioxide and zinc oxide; hydroxides such as alumina white and iron oxide yellow; sulfides such as zinc sulfide and lithopone; chrome oxides such as chrome yellow and molybdate orange; silicates such as white carbon and clay; sulfates such as precipitated barium sulfate and baryta powder; carbonates such as calcium carbonate and lead white; and others such as ferrocyanides (Prussian blue) and carbon (carbon black). The organic pigments can be for example: textile printing-based pigments including basic dyes such as rhodamine lake and methyl violet lake, acidic dyes such as quinoline yellow lake, vat dyes such as malachite green, and mordant dyes such as alizarin lake; azo pigments including soluble azo such as carmine 6B, insoluble azo such as disazoyellow, condensed azo such as cromophtal yellow, azo complex salts such as nickel azo yellow, and benzimidazolone azo such as permanent orange HL; phthalocyanine pigments such as phthalocyanine blue; condensed polycyclic pigments such as flavanthrone yellow; nitro-based pigments such as naphthol yellow S; nitroso-based pigments such as pigment green B; day and night fluorescent pigments such as lumogen yellow; and others such as alkali blue.

The permeable glitter pigment added to the adhesive layer 161 can be ones coating the surface of a core material such as scaly mica, glass, alumina, and metal with a colorant such as titanium oxide and iron oxide or with the solid pigment as the colorant. Some tinges of the glitter pigment may allow use of ones creating a color by interference of reflected light from the core material without coating the core material with the colorant. The glitter pigment is a collective designation of pigments having the brilliance described above and is known for example as a pearl pigment, a metallic pigment, etc.

The above materials of the separation material layer 152 and the above materials/components of the separation agent, the adhesive, the solid pigment, and the glitter pigment can be used commonly for modification examples and other embodiments that will be described later.

A manufacturing process of the double-faced adhesive tape 150 will next be described with reference to FIGS. 6 to 8.

As shown in FIG. 6, the film layer 151 having the colored layer 180 formed thereon by a known printing technique for example is fed out from a film roll FR and is supplied to an adhesive coating head AH. At the adhesive coating head AH, an adhesive of the above composition is applied to a surface of the film layer 151 opposite to the colored layer 180, to obtain a three-layered structure including the colored layer 180, the film layer 151, and the adhesive layer 170, after which the structure passes through a first drying chamber D1, a second drying chamber D2, a third drying chamber D3, a fourth drying chamber D4, and a fifth drying chamber D5, in the mentioned order, to undergo a five-stage drying process. The number of the drying chambers is not limited to five.

The separation material layer 152 fed out separately from a separation material roll SR is bonded to the adhesive layer 170 so that the tape of the three-layered structure turns into a tape of a four-layered structure, which is wound onto a first tape roll TR1.

Subsequently, as shown in FIG. 7, the tape of the four-layered structure including the colored layer 180, the film layer 151, the adhesive layer 170, and the separation material layer 152 is fed out from the first tape roll TR1 and is supplied to the adhesive coating head AH in the same manner as the above. At the adhesive coating head AH, an adhesive (containing the solid pigment) of the above composition is applied to a surface of the colored layer 180 opposite to the film layer 151, to obtain a five-layered structure including the adhesive layer 162 (having the solid pigment added), the colored layer 180, the film layer 151, the adhesive layer 170, and the separation material layer 152, after which similarly to the above, the structure passes through the first to fifth drying chambers D1 to D5, in the mentioned order, to undergo the drying process and is wound onto a second tape roll TR2.

Further, thereafter, as shown in FIG. 8, the tape of the five-layered structure including the adhesive layer 162, the colored layer 180, the film layer 151, the adhesive layer 170, and the separation material layer 152 is fed out from the second tape roll R2 and is supplied to the adhesive coating head AH in the same manner as the above. At the adhesive coating head AH, an adhesive (containing the permeable glitter pigment) of the above composition is applied to a surface of the adhesive layer 162 opposite to the colored layer 180, to obtain a six-layered structure including the adhesive layer 161 (having the permeable glitter pigment added), the adhesive layer 162, the colored layer 180, the film layer 151, the adhesive layer 170, and the separation material layer 152, after which similarly to the above, the structure passes through the first to fifth drying chambers D1 to D5, in the mentioned order, to undergo the drying process to complete the double-faced adhesive tape 150. The thus completed double-faced adhesive tape 150 is wound onto a third tape roll TR3.

Although in FIGS. 6 to 8, the case has been described by way of example where the adhesive coating head AH is disposed only at a single location, another adhesive coating head AH may separately be disposed downstream of the drying chamber D5 along the transport path. In this case, intactly after the coating process of the adhesive layer 162 and the drying process through the drying chambers D1 to D5 in FIG. 7, the coating process of the adhesive layer 161 (described using FIG. 8) can be performed.

Advantages of First Embodiment

As described above, in the first embodiment, in the normal four-layered structure including the adhesive layer for bonding, the film layer, the adhesive layer for affixing, and the separation material layer, the pigment (permeable glitter pigment in this example) is added to the bonding adhesive layer 161, while the pigment (solid pigment in this example) is added to the adhesive layer 162 disposed separately from the adhesive layer 161. This has the following significance.

If desired to use two different pigments with the intention of obtaining two different colors for example, intermixture of those pigments within a single layer induces interference between the two pigments, preventing the pigments from fully exerting their respective effects. However, if the layers containing those two pigments are disposed separately from the above four layers, a total of six layers are required, resulting in a remarkably increased total thickness of the adhesive tape as well as in a remarkably increased number of manufacturing steps.

Thus, in this first embodiment, a pigment (permeable glitter pigment) is first arranged in an adhesive layer 161, while another adhesive layer 162 with a pigment (solid pigment) is newly disposed. By distributedly arranging two pigments in different layers in this manner, it is possible to suppress the interference between the two pigments arising from the intermixture, thereby allowing the pigments to fully exert their respective effects. Since in particular, the permeable glitter pigment lies closer than the solid pigment when viewed from one side in the thickness direction (the upper side in FIGS. 3 to 5), there can be obtained an effect that glitter particles especially look three-dimensional.

By allowing the adhesive layer 161 originally arranged for bonding to contain one (permeable glitter pigment) of the two pigments, the number of layers increased from the above four layers is only one, so that the increase in the total thickness of the double-faced adhesive tape 150 and in the number of manufacturing steps can be suppressed. As a result, regardless of a limited space, the tape length capable of being wound onto the adhesive tape roll 14 can be extended.

As a result of the above, according to the first embodiment, two different colors can be represented by a single tape, while suppressing the increase in the total thickness of the double-faced adhesive tape 150 and in the number of manufacturing steps thereof. The configuration is such that when the newly disposed layer is the adhesive layer 162, respective pigments are added to the two adhesive layers 161 and 162. In general, accordingly as the amount of pigments added to an adhesive layer increases, the bonding performance decreases. Due to non-exposure to the surface, however, this adhesive layer 162 has less restriction from the bonding performance needed for the double-faced adhesive tape 150 (see the adhesion in a manufacturing facility described later), thus enabling a greater amount of solid pigment to be added. Since the bonding performance required for the double-faced adhesive tape 150 may be satisfied by the combination of the adhesive layer 162 and the adhesive layer 161, the restriction from the bonding performance in the adhesive layer 161 can also become less than the case of the four-layered structure described above.

As has been described using FIG. 7, the adhesive layer 162 disposed on one side in the thickness direction of the film layer 151 (having the colored layer 180 formed thereon) is bonded to the colored layer 180 at the time of manufacturing in the state shown in FIGS. 6 to 8 for example where the adhesive layer 162 is managed in the factory manufacturing facility. On the contrary, the adhesive layer 161 is bonded to the print-receiving tape 110 within the print label producing device 1 at the time of printing as described above. For this reason, the bonding force of the adhesive layer 161 needs to be greater than that of the adhesive layer 162. This first embodiment can meet the above requirement by setting the volume ratio of the pigment in the adhesive layer 161 to be less than that of the pigment in the adhesive layer 162 as described above.

Particularly, in this embodiment, the volume ratio of the solid pigment in the adhesive layer 162 is 1.5 times or more the volume ratio of the glitter pigment in the adhesive layer 161. This has the following significance.

A large amount of second pigment cannot be added due to the adhesive surface (to secure a bonding force of 3 N/10 mm).

On the other hand, a large amount of first pigment can be added due to less restriction from the bonding force, and the addition of 1.5 times or more can enhance the chroma and glitter feeling.

Particularly, in the first embodiment, the sum of the thickness tA of the adhesive layer 161 and the thickness tB of the adhesive layer 162 is greater than the thickness tC of the adhesive layer 170. By making the sum of the thickness tA of the adhesive layer 161 and the thickness tB of the adhesive layer 162 relatively greater, lowering of the adhesiveness arising from the addition of pigments can be compensated for and reliable adhesiveness can be obtained by the entirety of the two adhesives.

Particularly, in the first embodiment, the permeable glitter pigment of the adhesive layer 161 has a transmittance of 20% or more. This ensures a reliable visual recognition of the color of the solid pigment of the adhesive layer 162 on the far side when viewed from one side (upper side in FIGS. 3 to 5) in the thickness direction (see a broken line arrow a of FIG. 4B). Since the permeable glitter pigment having permeability is added to a layer separate from the solid pigment, the glitter feeling from the glitter pigment of the adhesive layer 161 can be restrained from being disappeared by the solid pigment of the adhesive layer 162.

Modification Examples of First Embodiment

The first embodiment is not limited to the above mode and can variously be modified without departing from its spirit and technical idea. Modification examples thereof will hereinafter be described in order. Parts similar to those of the first embodiment are designated by the same reference numerals and explanations thereof will appropriately be omitted or simplified.

(1-1) Use of Coloring Glitter Pigment

As shown in FIG. 9A, in the layered structure of the double-faced adhesive tape 150 shown in FIG. 3, the adhesive layer 162 with the solid pigment added may be replaced by an adhesive layer 162A with a coloring glitter pigment added. Similar to the adhesive layer 162, the coloring glitter pigment is added at a volume ratio of 5-50% for example to the adhesive layer 162A.

(1-2) Removal of Colored Layer

As shown in FIG. 9B, in the layered structure of the double-faced adhesive tape 150 shown in FIG. 3, the colored layer 180 may be removed. This case also presents an advantage similar to the above.

(1-3) Particle Diameter Difference Between Glitter Pigments in Two Layers

As shown in FIG. 10A, in the layered structure of the double-faced adhesive tape 150 shown in FIG. 3, the adhesive layer 162 with the solid pigment added may be replaced by an adhesive layer 162B with a glitter pigment added. At that time, in particular, the average particle diameter of a permeable glitter pigment in an adhesive layer 161B (containing the permeable glitter pigment similar to that in the adhesive layer 161) is greater than the average particle diameter of the glitter pigment in the adhesive layer 162B. Specifically, the average particle diameter of the glitter pigment in the adhesive layer 162B is less than 30 μm, whereas the average particle diameter of the permeable glitter pigment in the adhesive layer 161B is not less than 40 μm. The average particle diameter can be measured by the known laser diffraction scattering method. For example, it can be measured by LA-960 manufactured by Horiba, Ltd. (hereafter, the same will apply to modification examples and other embodiments described later). The glitter pigment and the permeable glitter pigment are of similar colors to each other and are made of the same material.

In the same manner as the first embodiment, also in this modification example, the glitter pigment is added at a volume ratio of 5-50% for example to the adhesive layer 162B similarly to the adhesive layer 162, whereas the permeable glitter pigment is added at a volume ratio of 5-50% for example to the adhesive layer 161B similarly to the adhesive layer 161. In the same manner as the first embodiment, the volume ratio of the glitter pigment in the adhesive layer 162B is greater than the volume ratio of the glitter pigment in the adhesive layer 161B. Specifically, for example, the volume ratio of the glitter pigment in the adhesive layer 162B is 1.5 times or more the volume ratio of the glitter pigment in the adhesive layer 161B.

The thickness tA of the adhesive layer 161B containing the permeable glitter pigment is smaller than the thickness tC of the adhesive layer 170 while the thickness tB of the adhesive layer 162B containing the glitter pigment is smaller than the thickness tC of the adhesive layer 170, the sum of the thickness tA of the adhesive layer 161B and the thickness tB of the adhesive layer 162B being greater than the thickness tC of the adhesive layer 170. The permeable glitter pigment contained in the adhesive layer 161B has a transmittance of 20% or more.

As shown in FIG. 10B, the colored layer 180 may be removed from the structure shown in FIG. 10A.

This modification example also presents an advantage similar to that of the first embodiment.

In particular, according to this modification example, the average particle diameter of the glitter pigment in the adhesive layer 162B is smaller than the average particle diameter of the permeable glitter pigment in the adhesive layer 161B. By arranging the glitter pigment and the permeable glitter pigment having average particle diameters different from each other separately into two layers in this manner, there can be obtained both a uniform moisture feeling induced by the glitter pigment with a small average particle diameter and a glaring granular feeling induced by the permeable glitter pigment with a large average particle diameter, making it possible to produce a unique brilliant tape. In particular, since the glitter pigment with a small average particle diameter is located on the far side while the permeable glitter pigment with a large average particle diameter is located on the near side when viewed from one side (upper side in FIG. 10) in the thickness direction, a high brilliance and depth can be obtained.

In this modification example, the average particle diameter of the glitter pigment in the adhesive layer 162B is less than 30 μm and the average particle diameter of the permeable glitter pigment in the adhesive layer 161B is greater than or equal to 40 μm. By giving a definite difference in the average particle diameter between the glitter pigment of the adhesive layer 162B and the permeable glitter pigment of the adhesive layer 161B in this manner, a high brilliance and depth can reliably be obtained.

The following technical significance also exists.

For example, in the case that two types of pigments each having a different particle diameter are contained separately in their respective adhesive layers, one with a small particle diameter is arranged in an underlying adhesive layer containing the first pigment, whereas one with a large particle diameter is arranged in an overlying adhesive layer containing the second pigment.

In this case, the particle diameter of 40 μm or more ensures visual confirmation of particle feeling, and therefore the overlying arrangement cannot impair the particle feeling as compared with the underlying arrangement.

Accordingly as the particle diameter increases, the particle feeling becomes more noticeable (60 μm or more is even better).

Furthermore, by setting the underlying small particles to be less than 30 μm, the overlying particle feeling can hardly be impaired.

Accordingly as the particle diameter reduces, the overlying particle feeling can be less impaired (10 μm or less is even better).

Other than the above, the techniques of the above embodiment and modification examples may appropriately be combined for use.

A second embodiment of the present disclosure will be described with reference to FIG. 11. Parts equivalent to those of the first embodiment and the modification examples thereof are designated by the same reference numerals, and explanations thereof will appropriately be omitted or simplified.

A layered structure of the double-faced adhesive tape according to the second embodiment is shown in FIG. 11A corresponding to FIG. 3. As shown in FIG. 11A, the double-faced adhesive tape 150 of this second embodiment has a transparent film layer 151A that is transparent (or translucent is acceptable; the same will apply to all below) instead of the film layer 151 in the layered structure shown in FIG. 10B. The adhesive layer 162B (to which the glitter pigment is added) disposed on the upper side of the film layer 151 in FIG. 10B is disposed on the lower side of the transparent film layer 151A in FIG. 11, with a resultant removal of the adhesive layer 170. The thickness magnitude relationship of the adhesive layer 161B will be described later.

As a result of the above, the double-faced adhesive tape 150 of this embodiment includes: the transparent film layer 151A; the adhesive layer 161B disposed in contact with the transparent film layer 151A on the upper side in FIG. 11A and having the permeable glitter pigment added at a desired volume ratio (5-50% relative to the entire adhesive layer); the adhesive layer 162B disposed in contact with the transparent film layer 151A on the lower side of the diagram and having the glitter pigment added at a desired volume ratio (5-50% relative to the entire adhesive layer); and the separation material layer 152 disposed in contact with the adhesive layer 162B on the lower side of the diagram and covering the adhesive layer 162B.

At this time, this embodiment has a feature that the thickness tA of the adhesive layer 161B containing the permeable glitter pigment is greater than the thickness tC of the adhesive layer 162B containing the glitter pigment.

The volume ratio of the glitter pigment in the adhesive layer 162B is smaller than the volume ratio of the permeable glitter pigment in the adhesive layer 161B. Specifically, the volume ratio of the permeable glitter pigment in the adhesive layer 161B is 1.5 times or more the volume ratio of the glitter pigment in the adhesive layer 162B. The volume ratio can be measured by the technique similar to that of the first embodiment for example.

The permeable glitter pigment contained in the adhesive layer 161B has a transmittance of 20% or more.

Similar to the modification example shown in FIGS. 10A and 10B, the average particle diameter of the permeable glitter pigment in the adhesive layer 161B containing the permeable glitter pigment differs from the average particle diameter of the glitter pigment in the adhesive layer 162B. In detail, the average particle diameter of the permeable glitter pigment in the adhesive layer 161B is greater than the average particle diameter of the glitter pigment in the adhesive layer 162B. Specifically, the average particle diameter of the glitter pigment in the adhesive layer 162B is less than 30 µm, whereas the average particle diameter of the permeable glitter pigment in the adhesive layer 161B is greater than or equal to 40 µm. The average particle diameter can be measured by the technique similar to that in the first embodiment for example. The permeable glitter pigment in the adhesive layer 161B and the glitter pigment in the adhesive layer 162B are of similar colors to each other and are made of the same material.

In the same manner as the first embodiment, the double-faced adhesive tape 150 of this second embodiment is also wound onto the adhesive tape roll 14 and is arranged, together with the ink ribbon roll 16, within the housing 11A of the cartridge 11.

FIG. 11B shows a layered structure of the print tape 100 formed by bonding together the print-receiving tape 110 and the double-faced adhesive tape 150 shown in FIG. 11A. As a result of the bonding, as shown in FIG. 11B, the print tape 100 includes, from the upper side of the diagram toward the lower side thereof, the print-receiving tape 110, the adhesive layer 161B (to which the permeable glitter pigment is added), the transparent film layer 151A, the adhesive layer 162B (to which the glitter pigment is added), and the separation material layer 152, laminated in the mentioned order.

A manufacturing process of the double-faced adhesive tape 150 will next be described with reference to FIGS. 12 and 13.

As shown in FIG. 12, the transparent film layer 151A is fed out from the film roll FR and is supplied to the adhesive coating head AH. At the adhesive coating head AH, an adhesive (containing the glitter pigment) of the above composition is applied to a surface of the transparent film layer 151A, to obtain a two-layered structure including the transparent film layer 151A and the adhesive layer 162B (to which the glitter pigment is added), after which the structure passes through the first drying chamber D1, the second drying chamber D2, the third drying chamber D3, the fourth drying chamber D4, and the fifth drying chamber D5, in the mentioned order, to undergo a five-stage drying process. The number of the drying chambers is not limited to five.

Subsequently, the separation material layer 152 separately fed out from the separation material roll SR is bonded to the adhesive layer 162B so that the tape of the two-layered structure turns to a tape of a three-layered structure including the transparent film layer 151A, the adhesive layer 162B, and the separation material layer 152, after which it is wound onto the first tape roll TR1.

Subsequently, as shown in FIG. 13, the tape of the three-layered structure of the transparent film layer 151A, the adhesive layer 162B, and the separation material layer 152 is fed out from the first tape roll R1 and is supplied to the adhesive coating head AH in the same manner as the above. At the adhesive coating head AH, an adhesive (containing the permeable glitter pigment) of the above composition is applied to a surface of the transparent film layer 151A opposite to the adhesive layer 162B, to obtain a four-layered structure including the adhesive layer 161B (to which the permeable glitter pigment is added), the transparent film layer 151B, the adhesive layer 162B, and the separation material layer 152, after which similarly to the above, the structure passes through the first to fifth drying chambers D1 to D5, in the mentioned order, to undergo the drying process to bring the double-faced adhesive tape 150 to completion. The thus completed double-faced adhesive tape 150 is wound onto the second tape roll TR2.

Although in FIGS. 12 and 13, the case has been described by way of example where the adhesive coating head AH is disposed only at a single location, another adhesive coating head AH may separately be disposed downstream of the drying chamber D5 along the transport path.

Advantage of Second Embodiment

This second embodiment can also present an advantage similar to that of the first embodiment and the modification examples. In the second embodiment, in the normal four-layered structure including the adhesive layer for bonding, the film layer, the adhesive layer for affixing, and the separation material layer, the pigment (permeable glitter pigment in this example) is added to the bonding adhesive layer 161B, while the pigment (glitter pigment in this example) is added to the affixing adhesive layer 162B. This has the following significance.

If desired to use two different pigments with the intention of obtaining two different colors for example, intermixture of those pigments within a single layer brings about interference between the two pigments, hindering the pigments from fully exerting their respective effects. However, if the layers containing those two pigments are disposed separately from the above four layers, a total of six layers are required, resulting in a remarkably increased total thickness of the adhesive tape as well as in a remarkably increased number of manufacturing steps.

Thus, in this second embodiment, respective pigments (the permeable glitter pigment and the glitter pigment) are arranged in the two adhesive layers 161B and 162B, respectively, with the transparent film layer 151A being a film layer interposed therebetween. By distributedly arranging two pigments in different layers in this manner, it is possible to suppress the interference between the two pigments arising from the intermixture, to thereby allow the pigments to fully exert their respective effects. Due to no increase in the number of the layers from the four layers, the total thickness of the double-faced adhesive tape 150 and the number of the manufacturing steps can be restrained from increasing. As a result, regardless of a limited space, the tape length capable of being wound onto the adhesive tape roll 14 can be extended.

As a result of the above, according to the second embodiment, two different colors can be represented by a single tape, while suppressing the increase in the total thickness of the double-faced adhesive tape 150 and in the number of manufacturing steps thereof. By arranging the glitter pigment and the permeable glitter pigment having average particle diameters different from each other separately into two layers, there can be obtained both a uniform moisture feeling induced by the glitter pigment with a small average particle diameter and a glaring granular feeling induced by the permeable glitter pigment with a large average particle diameter, so that a unique brilliant tape can be produced. In particular, since the glitter pigment with a small average particle diameter is located on the far side while the permeable glitter pigment with a large average particle diameter is located on the near side when viewed from one side (upper side in FIG. 11) in the thickness direction, a high brilliance and depth can be obtained.

Particularly, in this second embodiment, the average particle diameter of the glitter pigment in the adhesive layer 162B is less than 30 μm and the average particle diameter of the permeable glitter pigment in the adhesive layer 161B is greater than or equal to 40 μm. By giving a definite difference in the average particle diameter between the glitter pigment of the adhesive layer 162B and the permeable glitter pigment of the adhesive layer 161B in this manner, a high brilliance and depth can reliably be obtained.

The following technical significance also exists.

For example, in the case that two types of pigments each having a different particle diameter are contained separately in their respective adhesive layers, one with a small particle diameter is arranged in an underlying adhesive layer containing the first pigment, whereas one with a large particle diameter is arranged in an overlying adhesive layer containing the second pigment.

In this case, the particle diameter of 40 μm or more ensures visual confirmation of particle feeling, and therefore the overlying arrangement cannot impair the particle feeling as compared with the underlying arrangement.

Accordingly as the particle diameter increases, the particle feeling becomes more noticeable (60 μm or more is even better).

Furthermore, by setting the underlying small particles to be less than 30 μm, the overlying particle feeling can hardly be impaired.

Accordingly as the particle diameter becomes smaller, the overlying particle feeling can be less impaired (10 μm or less is even better).

Particularly, in the second embodiment, the permeable glitter pigment of the adhesive layer 161B has a transmittance of 20% or more. This ensures a reliable visual recognition of the color of the glitter pigment of the adhesive layer 162B on the far side when viewed from one side (upper side in FIG. 11) in the thickness direction. Since the permeable glitter pigment having permeability is added to a layer separate from the glitter pigment, the glitter feeling from the glitter pigment of the adhesive layer 161B can be restrained from being disappeared by the glitter pigment of the adhesive layer 162B.

Particularly, in the second embodiment, the volume ratio of the permeable glitter pigment in the adhesive layer 161B is 1.5 times or more the volume ratio of the glitter pigment in the adhesive layer 162B. This has the following significance.

A large amount of second pigment cannot be added due to the adhesive surface (to secure the bonding force of 3 N/10 mm).

On the other hand, a large amount of first pigment can be added due to less restriction from the bonding force and the addition of 1.5 times or more can enhance the chroma and glitter feeling.

In the structure shown in FIG. 11A, the transparent film layer 151A may be removed. Such a modification example is shown in FIG. 14A. The same reference numerals are imparted to parts equivalent to those in the first and second embodiments and their modification examples, and explanations thereof will appropriately be omitted or simplified. In this case, as shown in FIG. 14A, the double-faced adhesive tape 150 includes, from the upper side toward the lower side of the diagram, the adhesive layer 161B (to which the permeable glitter pigment is added), the adhesive layer 162B (to which the glitter pigment is added), and the separation material layer 152, laminated in the mentioned order.

FIG. 14B shows a layered structure of the print tape 100 formed by bonding the print-receiving tape 110 and the double-faced adhesive tape 150 shown in FIG. 14A together. As a result of the bonding, as shown in FIG. 14B, the print tape 100 includes, from the upper side toward the lower side of the diagram, the print-receiving tape 110, the adhesive layer 161B (to which the permeable glitter pigment is added), the adhesive layer 162B (to which the glitter pigment is added), and the separation material layer 152, laminated in the mentioned order.

This modification example also presents an advantage similar to that of the second embodiment.

Other than the above, the techniques of the above embodiments and modification examples may appropriately be combined for use.

A third embodiment of the present disclosure will be described with reference to FIGS. 15 to 24. Dissimilar to the first and the second embodiments using the laminated type cartridge 11, this embodiment is an embodiment using a cartridge called a so-called non-laminated type (in more detail, receptor type). Parts equivalent to those of the first embodiment, the second embodiment, and the modification examples thereof are designated by the same reference numerals, and explanations thereof will appropriately be omitted or simplified.

FIG. 15 illustrates a plan view corresponding to FIG. 2 of the first embodiment and showing a rear internal structure of a device body of a print label producing device in the third embodiment. In FIG. 15, the cartridge 11 for use in this embodiment comprises, within the interior of the housing 11A, the adhesive tape roll 14 (detailed layered structure will be described later), the ink ribbon roll 16, the ink ribbon take-up roller 17, and the feeding roller 18.

The adhesive tape roll 14 is made up by winding an adhesive tape 150N in relation to this embodiment around the spool 50. As shown in an enlarged view of FIG. 15, the adhesive tape 150N includes: an image receiving layer 210; the colored layer 180 similar to the above; the transparent film layer 151A that is transparent (or translucent is acceptable; the same applies hereinafter) similar to the above, the adhesive layer 161 to which the permeable glitter pigment is added similar to the above, the adhesive layer 162 to which the solid pigment is added similar to the above, and the separation material layer 152, laminated in the mentioned order from the spool 50 lying on the radial center side (corresponding to the upper side in FIG. 16 described later) toward the radial outside (corresponding to the lower side in FIG. 16 described later).

At the time of the print label production, the platen roller 24 presses the adhesive tape 150N fed out from the adhesive tape roll 14 and an ink ribbon not shown fed out from the ink ribbon roll 16 against the thermal head 23. As a result, similar to the first embodiment, ink of the ink ribbon is transferred onto the image receiving layer 210 of the adhesive tape 150N by heat reception from the thermal head 23 so that a desired print R (see FIG. 3, etc. described later) is formed on the adhesive tape 150N to obtain a print tape 100N so that the platen roller 24 feeds the print tape 100N having the print formed thereon and the ink ribbon toward the feeding roller 18. Afterward, the feeding roller 18 further feeds the print tape 100N toward the label discharging exit 29 disposed on the upper end of the device body 2. Similar to the first embodiment, at a predetermined point of time when the print tape 100N is discharged from the label discharging exit 29, the user manually operates the cutting operation lever 6 to activate the cutter 28 disposed in the vicinity of the label discharging exit 29, to cut the print tape 100N into a predetermined length of print tape 100N (i.e. print label).

<Details of Tape Layered Structure>

FIG. 16 is an explanatory view showing layered structures of the adhesive tape 150N and the print tape 100N corresponding to FIGS. 3 and 4 of the first embodiment.

As shown in FIG. 16A, the adhesive tape 150N includes: the transparent film layer 151A; the colored layer 180 disposed in contact with the transparent film layer 151A on the upper side of the diagram; the image receiving layer 210 disposed in contact with the colored layer 180 on the upper side of the diagram; the adhesive layer 161 disposed in contact with the transparent film layer 151A on the lower side of the diagram, the adhesive layer 161 having the permeable glitter pigment added at a desired volume ratio (5-50% relative to the entire adhesive layer); the adhesive layer 162 disposed in contact with the adhesive layer 161 on the lower side of the diagram, the adhesive layer 162 having the solid pigment added at a desired volume ratio (5-50% relative to the entire adhesive layer); and the separation material layer 152 disposed in contact with the adhesive layer 162 on the lower side of the diagram so as to cover the adhesive layer 162.

At this time, this embodiment has a feature that the volume ratio of the solid pigment in the adhesive layer 162 is smaller than the volume ratio of the permeable glitter pigment in the adhesive layer 161. Specifically, for example, the volume ratio of the permeable glitter pigment in the adhesive layer 161 is 1.5 times or more the volume ratio of the solid pigment in the adhesive layer 162. The volume ratio can be measured by the technique similar to that in the first embodiment for example. The solid pigment in the adhesive layer 162 and the permeable glitter pigment in the adhesive layer 161 are made of the same material.

The permeable glitter pigment contained in the adhesive layer 161 has a transmittance of 20% or more. The image receiving layer 210 also has a transmittance of 20% or more.

FIG. 16B shows a layered structure of the print tape 100N in which print R is formed on the image receiving layer 210 of the adhesive tape 150N.

A manufacturing process of the adhesive tape 150N will next be described with reference to FIGS. 17 and 18.

As shown in FIG. 17, the transparent film layer 151A having the image receiving layer 210 and the colored layer 180 formed thereon by the known printing technique for example is fed out from the film roll FR and is supplied to the adhesive coating head AH. At the adhesive coating head AH, an adhesive (containing the permeable glitter pigment) of the above composition is applied to a surface of the transparent film layer 151A opposite to the colored layer 180, to obtain a four-layered structure including the image receiving layer 210, the colored layer 180, the transparent film layer 151A, and the adhesive layer 161 (to which the permeable glitter pigment is added), after which the structure passes through the first drying chamber D1, the second drying chamber D2, the third drying chamber D3, the fourth drying chamber D4, and the fifth drying chamber D5, in the mentioned order to undergo the five-stage drying process and is wound onto the first tape roll TR1. The number of the drying chambers is not limited to five.

Subsequently, as shown in FIG. 18, the tape of the four-layered structure including the image receiving layer 210, the colored layer 180, the transparent film layer 151A, and the adhesive layer 161 is fed out from the first tape roll TR1 and is supplied to the adhesive coating head AH in the same manner as the above. At the adhesive coating head AH, an adhesive (containing the solid pigment) of the above composition is applied to a surface of the adhesive layer 161 opposite to the film layer 151A, to obtain a five-layered structure including the image receiving layer 210, the colored layer 180, the transparent film layer 151A, the adhesive layer 161, and the adhesive layer 162 (to which the solid pigment is added), after which similarly to the above, the structure passes through the first to fifth drying chambers D1 to D5, in the mentioned order, to undergo the drying process. Thereafter, the separation material layer 152 separately fed out from the separation material roll SR is bonded to the adhesive layer 162 so that the tape of the five-layered structure is completed as the adhesive tape 150N of a six-layered structure including the image receiving layer 210, the colored layer 180, the transparent film layer 151A, the adhesive layer 161, the adhesive layer 162, and the separation material layer 152. The thus completed adhesive tape 150N is wound onto the second tape roll TR2.

Although in FIGS. 17 and 18, the case has been described by way of example where the adhesive coating head AH is disposed only at a single location, another adhesive coating head AH may separately be disposed downstream of the drying chamber D5 along the transport path. In this case, intactly after the coating process of the adhesive layer 161 and the drying process through the drying chambers D1 to D5 in FIG. 17, the coating process of the adhesive layer 162 and the bonding process of the separation material layer 152 (described using FIG. 18) can be performed.

As shown in FIG. 19A, the configuration may be such that the image receiving layer 210 is disposed in contact with the transparent film layer 151A on the upper side of the diagram, without interposing the colored layer 180 between the image receiving layer 210 and the transparent film layer 151A. As shown in FIG. 19B, the colored layer 180 may be disposed in contact with the transparent film layer 151A on the upper side of the diagram, without disposing the image receiving layer 210.

Advantage of Third Embodiment

This third embodiment can also present an advantage similar to that of the first and the second embodiments and the modification examples. If desired to use two different pigments with the intention of obtaining two different colors for example in the adhesive tape, intermixture of those pigments within a single layer brings about interference between the two pigments, hindering the pigments from fully exerting their respective effects.

Thus, in this third embodiment, a pigment (permeable glitter pigment) is first arranged in an adhesive layer 161, while another adhesive layer 162 with a pigment (solid pigment) is newly disposed. By distributedly arranging two pigments in different layers in this manner, it is possible to suppress the interference between the two pigments arising from the intermixture, thereby allowing the pigments to fully exert their respective effects. Since in particular, the permeable glitter pigment lies closer than the solid pigment when viewed from the other side (upper side in FIGS. 16 and 11) in the thickness direction, there can be obtained an advantage that glitter particles especially look three-dimensional.

By allowing the adhesive layer 161 originally arranged for affixing to contain one (permeable glitter pigment) of the two pigments, the number of layers of the entire tape is limited to six, so that the increase in the total thickness of the adhesive tape 150N and in the number of manufacturing steps can be suppressed. As a result, regardless of a limited space, the tape length capable of being wound onto the adhesive tape roll 14 can be extended.

The volume ratio of the solid pigment in the adhesive layer 162 is set to be less than the volume ratio of the permeable glitter pigment in the adhesive layer 161. This has the following significance. Although in general, the more a pigment is added to an adhesive layer, the lower the bonding performance becomes, the adhesive layer 161 has less restriction from the bonding performance required for the adhesive tape (due to no exposure to the surface), thereby allowing a larger amount of permeable glitter pigment to be added. On the contrary, the volume ratio of the solid pigment in the adhesive layer 162 is reduced so that the bonding force to the adherend can be secured.

The adhesive layer 161 disposed on one side in the thickness direction of the transparent film layer 151A is bonded to the transparent film layer 151A while being managed in the factory manufacturing facility for example at the time of manufacturing as described above using FIGS. 17 and 18. On the other hand, the adhesive layer 162 needs to have a bonding force greater than that of the adhesive layer 161 because the adherend has not yet been determined and because the adhesion is made by the user. This third embodiment can deal with the above by setting the volume ratio of the solid pigment in the adhesive layer 162 to be less than the volume ratio of the permeable glitter pigment in the adhesive layer 161.

Particularly, in the third embodiment, the permeable glitter pigment of the adhesive layer 161 has a transmittance of 20% or more. This ensures a reliable visual recognition of the color of the solid pigment of the adhesive layer 162 on the far side when viewed from the other side (upper side in FIGS. 16 and 19) in the thickness direction. Since the permeable glitter pigment having permeability is added to a layer separate from the solid pigment, the glitter feeling from the permeable glitter pigment of the adhesive layer 161 can be restrained from being disappeared by the solid pigment of the adhesive layer 162.

Particularly, in the third embodiment, the volume ratio of the permeable glitter pigment in the adhesive layer 161 is 1.5 times or more the volume ratio of the solid pigment in the adhesive layer 162.

This has the following significance.

A large amount of second pigment cannot be added due to the adhesive surface (to secure the bonding force of 3 N/10 mm).

On the other hand, a large amount of first pigment can be added due to less restriction from the bonding force, and the addition of 1.5 times or more can enhance the chroma and glitter feeling.

Modification Examples of Third Embodiment

The third embodiment is not limited to the above mode and can variously be modified without departing from its spirit and technical idea. Modification examples thereof will hereinafter be described in order. Parts similar to those of the first to the third embodiments and modification examples thereof are designated by the same reference numerals and explanations thereof will appropriately be omitted or simplified.

(3-1) Use of Coloring Glitter Pigment

As shown in FIG. 20A, in the layered structure of the adhesive tape 150N shown in FIG. 16, the adhesive layer 162 with the solid pigment added may be replaced by the adhesive layer 162A with the coloring glitter pigment added. In the adhesive layer 162A, similarly to the adhesive layer 162, the coloring glitter pigment is added at a volume ratio of 5-50% for example relative to the entire adhesive layer.

(3-2) Removal of Colored Layer or Image Receiving Layer

As shown in FIG. 20B, in the layered structure of the adhesive tape 150N shown in FIG. 16, the colored layer 180 may be removed. As shown in FIG. 20C, in the layered structure of the adhesive tape 150N shown in FIG. 16, the image receiving layer 210 may be removed. These cases also present an advantage similar to the above.

(3-3) Interchange of Colored Layer and Image Receiving Layer

As shown in FIG. 21A, in the layered structure of the adhesive tape 150N shown in FIG. 16, the transparent film layer 151A and the colored layer 180 may be interchanged so that the image receiving layer 210, the transparent film layer 151A, the colored layer 180, the adhesive layer 161, the adhesive layer 162, and the separation material layer 152 are laminated in the mentioned order from the upper side toward the lower side of the diagram. As shown in FIG. 21B, the colored layer 180 may be removed from the layered structure of the adhesive tape 150N shown in FIG. 21A (in this case, the same layered structure as in FIG. 19A results). Alternatively, as shown in FIG. 21C, the image receiving layer 210 may be removed from the layered structure of the adhesive tape 150N shown in FIG. 21A. These cases also present an advantage similar to the above.

(3-4) Use of Coloring Glitter Pigment in Addition to the Interchange

Furthermore, as shown in FIG. 22A, in the layered structure of the adhesive tape 150N shown in FIG. 21, the adhesive layer 162 with the solid pigment added may be replaced by the adhesive layer 162A with the coloring glitter pigment added. In the adhesive layer 162A, similarly to the adhesive layer 162, the coloring glitter pigment is added at a volume ratio of 5-50% for example relative to the entire adhesive layer. As shown in FIG. 22B, the colored layer 180 may be removed from the layered structure of the adhesive tape 150N shown in FIG. 22A (in this case, the same layered structure as in FIG. 20B results). Alternatively, as shown in FIG. 22C, the image receiving layer 210 may be removed from the layered structure of the adhesive tape 150N shown in FIG. 22A. These cases also present an advantage similar to the above.

(3-5) Particle Diameter Difference Between Glitter Pigments in Two Layers

As shown in FIG. 23A, in the layered structure of the double-faced adhesive tape 150 shown in FIG. 16, the adhesive layer 162 with the solid pigment added may be replaced by the adhesive layer 162B with the glitter pigment added. At that time, in particular, the average particle diameter of the permeable glitter pigment in the adhesive layer 161B (containing the permeable glitter pigment similar to that in the adhesive layer 161) is greater than the average particle diameter of the glitter pigment in the adhesive layer 162B. Specifically, the average particle diameter of the glitter pigment in the adhesive layer 162B is less than 30 μm, whereas the average particle diameter of the permeable glitter pigment in the adhesive layer 161B is not less than 40 μm. The average particle diameter can be measured by a technique similar to that of the first embodiment for example.

The following technical significance also exists.

For example, in the case that two types of pigments each having a different particle diameter are contained separately in their respective adhesive layers, one with a small particle diameter is arranged in an underlying adhesive layer containing the first pigment, whereas one with a large particle diameter is arranged in an overlying adhesive layer containing the second pigment.

In this case, the particle diameter of 40 μm or more ensures visual confirmation of particle feeling, and therefore the overlying arrangement cannot impair the particle feeling as compared with the underlying arrangement.

Accordingly as the particle diameter increases, the particle feeling becomes more noticeable (60 μm or more is even better).

Furthermore, by setting the underlying small particles to be less than 30 μm, the overlying particle feeling can hardly be impaired.

Accordingly as the particle diameter reduces, the overlying particle feeling can be less impaired (10 μm or less is even better).

Similar to the third embodiment, in this modification example as well, the glitter pigment is added to the adhesive layer 162B in a volume ratio of 5-50% for example relative to the entire adhesive layer in the same manner as the adhesive layer 162, whereas the permeable glitter pigment is added to the adhesive layer 161B in a volume ratio of 5-50% for example relative to the entire adhesive layer in the same manner as the adhesive layer 161. The permeable glitter pigment contained in the adhesive layer 161B has a transmittance of 20% or more.

As shown in FIG. 23B, the colored layer 180 may be removed from the structure shown in FIG. 23A. Alternatively, as shown in FIG. 23C, the image receiving layer 210 may be removed from the structure shown in FIG. 23A.

This modification example also presents an advantage similar to that of the third embodiment.

In particular, according to this modification example, the average particle diameter of the glitter pigment in the adhesive layer 162B is smaller than the average particle diameter of the permeable glitter pigment in the adhesive layer 161B. By arranging the glitter pigment and the permeable glitter pigment having average particle diameters different from each other separately into two layers in this manner, there can be obtained both a uniform moisture feeling induced by the glitter pigment with a small average particle diameter and a glaring granular feeling induced by the permeable glitter pigment with a large average particle diameter, making it possible to produce a unique brilliant tape. In particular, since the glitter pigment with a small average particle diameter is located on the far side while the permeable glitter pigment with a large average particle diameter is located on the near side when viewed from the other side (upper side in FIG. 23) in the thickness direction, a high brilliance and depth can be obtained.

In this modification example, the average particle diameter of the glitter pigment in the adhesive layer 162B is less than 30 μm and the average particle diameter of the permeable glitter pigment in the adhesive layer 161B is greater than or equal to 40 μm. By giving a definite difference in the average particle diameter between the glitter pigment of the adhesive layer 162B and the permeable glitter pigment of the adhesive layer 161B in this manner, a high brilliance and depth can reliably be obtained.

(3-6) Interchange of Transparent Film Layer and Colored Layer in Addition to the Particle Diameter Difference As shown in FIG. 24A, in the layered structure of the adhesive tape 150N shown in FIG. 23A, the transparent film layer 151A and the colored layer 180 may be interchanged so that the image receiving layer 210, the transparent film layer 151A, the colored layer 180, the adhesive layer 161A, the adhesive layer 162A, and the separation material layer 152 are laminated in the mentioned order from the upper side (the other side in the thickness direction in the third embodiment and the modification examples) toward the lower side (one side in the thickness direction in the third embodiment and the modification examples) of the diagram. As shown in FIG. 24B, the colored layer 180 may be removed from the layered structure of the adhesive tape 150N shown in FIG. 24A (in this case, the same layered structure as in FIG. 23B results). Alternatively, as shown in FIG. 24C, the image receiving layer 210 may be removed from the layered structure of the adhesive tape 150N shown in FIG. 24A. These cases also present an advantage similar to the above.

The transparent film layer 151A may be removed from the structure shown in FIGS. 15 to 24. At that time, the structure without the film layer may be expanded to the laminated type. Such modification examples will be described with reference to FIGS. 25 to 27. The same reference numerals are imparted to parts equivalent to those of the first to the third embodiments and modification examples thereof, and explanations thereof will appropriately be omitted or simplified.

FIG. 25 illustrates a plan view, corresponding to FIG. 2 of the first embodiment and showing a rear internal structure of a device body of a print label producing device in this modification example. In FIG. 25, the double-faced adhesive tape 150 wound onto the adhesive tape roll 14 disposed in the housing 11A of the cartridge 11 of this embodiment is configured to include: as shown in an enlarged view of FIG. 25, the adhesive layer 161 with a predetermined pigment (in this example, the permeable glitter pigment as the first pigment) added; the adhesive layer 162 with the same or different type of particles as in the adhesive layer 161 (in this example, the solid pigment as the second pigment; the same applies hereinafter) added; and the separation material layer 152; laminated in the mentioned order from the spool 50 lying on the radial center side (corresponding to the upper side in FIG. 26 described later) toward the radial outside (corresponding to the lower side in FIG. 27 described layer). Similar to the above, as shown in FIG. 25, the print-receiving tape roll 15 is made up by winding the print-receiving tape 110 having a transmittance of 20% or more for example around the spool 60. The housing 11A comprises the ink ribbon roll 16 similar to the above.

<Details of Tape Layered Structure>

FIG. 26 is an explanatory view showing a layered structure of the print-receiving tape 110 and the double-faced adhesive tape 150.

As shown in FIG. 26, the double-faced adhesive tape 150 includes: the adhesive layer 161 having the permeable glitter pigment added at a desired volume ratio (e.g. 5-50% relative to the entire adhesive layer); the adhesive layer 162 disposed in contact with the adhesive layer 161 on the lower side of the diagram and having the solid pigment added at a desired volume ratio (e.g. 5-50% relative to the entire adhesive layer); and the separation material layer 152 disposed in contact with the adhesive layer 162 on the lower side of the diagram so as to cover the adhesive layer 162.

At this time, similarly to the third embodiment, this modification example has a feature that the volume ratio of the solid pigment in the adhesive layer 162 is smaller than the volume ratio of the permeable glitter pigment in the adhesive layer 161. Specifically, for example, the volume ratio of the permeable glitter pigment in the adhesive layer 161 is 1.5 times or more the volume ratio of the solid pigment in the adhesive layer 162. The volume ratio can be measured by the technique similar to that in the first embodiment for example.

The permeable glitter pigment contained in the adhesive layer 161 has a transmittance of 20% or more.

FIG. 27A shows a layered structure of the print tape 100 formed by bonding the print-receiving tape 110 and the double-faced adhesive tape 150 together, while FIG. 27B shows a state where the print tape 100 is adhered via the adhesive layer 162 to the adherend M with the separation material layer 152 being separated from the print tape 100. As a result of the bonding, as shown in FIG. 27A, the print tape 100 is made up by laminating, from the upper side (the other side in the thickness direction of this modification example) in the diagram toward the lower side (one side in the thickness direction of this modification example) in the diagram, the print-receiving tape 110, the adhesive layer 161 (to which the permeable glitter pigment is added), the adhesive layer 162 (to which the solid pigment is added), the colored layer 180, the film layer 151, the adhesive layer 170, and the separation material layer 152, in the mentioned order.

This modification example also presents an advantage similar to that of the third embodiment.

Other than the above, the techniques of the above embodiments and modification examples may appropriately be combined for use.

A fourth embodiment of the present disclosure will be described with reference to FIGS. 28 to 44. The same reference numerals are imparted to parts equivalent to those in the first to the third embodiments and their modification examples, and explanations thereof will appropriately be omitted or simplified.

Similar to the first and the second embodiments, this embodiment is an embodiment using a so-called laminated type cartridge. FIG. 28 illustrates a plan view corresponding to FIG. 2 of the first embodiment and showing a rear internal structure of a device body of a print label producing device in the fourth embodiment. In FIG. 28, the double-faced adhesive tape 150 wound onto the adhesive tape roll 14 disposed in the housing 11A of the cartridge 11 of this embodiment is configured to include: as shown in an enlarged view of FIG. 28, an adhesive layer 163U with predetermined particles (a pigment in this example; it may be a glitter pigment in particular; the same applies hereinafter) added; an adhesive layer 163L with particles of the same material as in the adhesive layer 163U (the glitter pigment in this example; the same applies hereinafter) added; the colored layer 180; the film layer 151, the adhesive layer 170; and the separation material layer 152; laminated in the mentioned order from the spool 50 lying on the radial center side (corresponding to the upper side in FIG. 29 described later) toward the radial outside (corresponding to the lower side in FIG. 29 described layer). Similar to the above, as shown in FIG. 28, the print-receiving tape roll 15 is made up by winding the print-receiving tape 110 (corresponding to a cover film) having a transmittance of 20% or more for example around the spool 60. The housing 11A comprises the ink ribbon roll 16 similar to the above.

<Details of Tape Layered Structure>

FIG. 29 is an explanatory view showing a layered structure of the print-receiving tape 110 and the double-faced adhesive tape 150.

As shown in FIG. 29, the double-faced adhesive tape 150 includes: the film layer 151; the colored layer 180 disposed in contact with the film layer 151 on the upper side of the diagram (one side in the thickness direction in the structures of FIGS. 29 to 31); the adhesive layer 163L (corresponding to a first-particle-containing adhesive layer) disposed in contact with the colored layer on the upper side of the diagram (one side in the thickness direction in the structures of FIGS. 29 to 31) and having the pigment added at a desired volume ratio; the adhesive layer 163U (corresponding to a second-particle-containing adhesive layer) disposed in contact with the adhesive layer 163L on the upper side of the diagram (one side in the thickness direction in the structures of FIGS. 29 to 31) and having the pigment of the same material as in the adhesive layer 163L added at a desired volume ratio; the adhesive layer 170 (corresponding to an affixing adhesive layer) disposed in contact with the film layer 151 on the lower side of the diagram (the other side in the thickness direction in the structures of FIGS. 29 to 31); and the separation material layer 152 disposed in contact with the adhesive layer 170 on the lower side of the diagram (the other side in the thickness direction in the structures of FIGS. 29 to 31) so as to cover the adhesive layer 170.

At this time, this embodiment has a feature that the pigment in the adhesive layers 163U and 163L has an average particle diameter of 30 μm or more. The average particle diameter can be measured by the technique similar to the above.

The volume ratio of the pigment in the adhesive layer 163U is smaller than the volume ratio of the pigment in the adhesive layer 163L. Specifically, the volume ratio of the pigment in the adhesive layer 163L is 1.5 times or more the volume ratio in the adhesive layer 163U.

A thickness tL of the adhesive layer 163L is greater than a thickness tU of the adhesive layer 163U. Specifically the thickness tL of the adhesive layer 163L is 1.5 times or more the thickness tU of the adhesive layer 163U.

The adhesive force of the adhesive layer 163U is 3 [N]/10 [mm] or more. The adhesive force (bonding force) is measured in conformity with JIS-Z0237. To put it briefly, a surface to be measured is affixed to an SUS304 stainless plate and, after the elapse of a certain period of time, a tensile tester is used to perform a measurement separating at an angle of 180 degrees at a speed of 300 mm/min (hereinafter, the same will apply to modification examples and other embodiments described later).

On the other hand, the print-receiving tape 110 has print R as described above on a surface on the side facing the double-faced adhesive tape 150 (the lower side of the diagram; the other side in the thickness direction in the structures of FIGS. 29 to 31). The print-receiving tape 110 is bonded via the adhesive layer 163U to the double-faced adhesive tape 150.

FIG. 30A shows a layered structure of the print tape 100 formed by bonding the print-receiving tape 110 and the double-faced adhesive tape 150 together, while FIG. 30B shows a state where the print tape 100 is adhered via the adhesive layer 170 to the adherend M with the separation material layer 152 being separated from the print tape 100. As a result of the bonding, as shown in FIG. 30A, the print tape 100 is made up by laminating, from the upper side of the diagram (one side in the thickness direction in the structures of FIGS. 29 to 31) toward the lower side thereof (the other side in the thickness direction in FIGS. 29 to 31), the print-receiving tape 110, the adhesive layer 163U (to which the glitter pigment is added), the adhesive layer 163L (to which the glitter pigment is added), the colored layer 180, the film layer 151, the adhesive layer 170, and the separation material layer 152, in the mentioned order.

At this time, as shown in FIG. 31, the adhesive layer 163L may be disposed in contact with the film layer 151 on the upper side of the diagram (one side in the thickness direction in the structures of FIGS. 29 to 31), without interposing the colored layer 180 between the adhesive layer 163L and the film layer 151. Furthermore, in the double-faced adhesive tape 150 shown in FIGS. 29 to 31, three or more adhesive layers having common particles, inclusive of the two adhesive layers 163U and 163L, may be disposed adjacent to one another.

A manufacturing process of the double-faced adhesive tape 150 will next be described with reference to FIGS. 32 to 34.

In FIG. 32, similarly to FIG. 6, the film layer 151 having the colored layer 180 formed thereon by a known printing technique for example is fed out from the film roll FR and is supplied to the adhesive coating head AH. At the adhesive coating head AH, an adhesive of the above composition is applied to a surface of the film layer 151 opposite to the colored layer 180, to obtain a three-layered structure including the colored layer 180, the film layer 151, and the adhesive layer 170, after which the structure passes through the first drying chamber D1, the second drying chamber D2, the third drying chamber D3, the fourth drying chamber D4, and the fifth drying chamber D5, in the mentioned order, to undergo a five-stage drying process. The number of the drying chambers is not limited to five.

Thereafter, the separation material layer 152 fed out separately from the separation material roll SR is bonded to the adhesive layer 170 so that the tape of the three-layered structure turns into a tape of a four-layered structure, which is wound onto the first tape roll TR1.

Subsequently, as shown in FIG. 33, the tape of the four-layered structure including the colored layer 180, the film layer 151, the adhesive layer 170, and the separation material layer 152 is fed out from the first tape roll TR1 and is supplied to the adhesive coating head AH in the same manner as the above. At the adhesive coating head AH, an adhesive (containing the glitter pigment as the particles for example) of the above composition is applied to a surface of the colored layer 180 opposite to the film layer 151, to obtain a five-layered structure including the adhesive layer 163L (having the glitter pigment added), the colored layer 180, the film layer 151, the adhesive layer 170, and the separation material layer 152, after which similarly to the above, the structure passes through the first to fifth drying chambers D1 to D5, in the mentioned order, to undergo the drying process and is wound onto the second tape roll TR2.

Further, thereafter, as shown in FIG. 34, the tape of the five-layered structure including the adhesive layer 163L, the colored layer 180, the film layer 151, the adhesive layer 170, and the separation material layer 152 is fed out from the second tape roll R2 and is supplied to the adhesive coating head AH in the same manner as the above. At the adhesive coating head AH, an adhesive (containing the same particles as the above, e.g. the glitter pigment) the permeable glitter pigment) of the above composition is applied to a surface of the adhesive layer 163L opposite to the colored layer 180, to obtain a six-layered structure including the adhesive layer 163U (having the glitter pigment added), the adhesive layer 163L (having the glitter pigment added), the colored layer 180, the film layer 151, the adhesive layer 170, and the separation material layer 152, after which similarly to the above, the structure passes through the first to fifth drying chambers D1 to D5, in the mentioned order, to undergo the drying process to complete the double-faced adhesive tape 150. The thus completed double-faced adhesive tape 150 is wound onto the third tape roll TR3.

Although in FIGS. 32 to 34, the case has been described by way of example where the adhesive coating head AH is disposed only at a single location, another adhesive coating head AH may separately be disposed downstream of the drying chamber D5 along the transport path. In this case, intactly after the coating process of the adhesive layer 163L and the drying process through the drying chambers D1 to D5 in FIG. 33, the coating process of the adhesive layer 163U (described using FIG. 34) can be performed.

Advantage of Fourth Embodiment

In the case of manufacturing the double-faced adhesive tape 150 by adding particles such as the pigment into the adhesive layer as described using FIGS. 32 to 34 for example, a solvent (used at the time of dilution) contained in the interior of a layer adhesively coated at the adhesive coating head AH may not fully volatilize even through the subsequent drying process in the drying chambers D1 to D5 and may remain within the adhesive layer (see broken line portions of FIG. 35). Since the adhesive performance of the adhesive layer is adversely affected if the solvent remains within the adhesive layer, there is a need to lower the coating speed or strengthen the drying conditions in order to avoid the adverse effect, resulting in increased manufacturing costs. The above trend becomes noticeable esp. when using particles with a large particle diameter (particles with an average particle diameter of 30 μm or more as in this embodiment for example).

Thus, in this fourth embodiment, the adhesive layer with the above particles added is divided into two (the adhesive layer 163L and the adhesive layer 163U) (see FIG. 36A) so that the adhesive layer 163L with the above particles added is first disposed on one side (the upper side in FIGS. 29 to 31) in the thickness direction of the film layer 151 (see the overall process shown in FIG. 33) while the adhesive layer 163U with the same particles added is disposed on one side (the upper side in FIGS. 29 to 31) in the thickness of the adhesive layer 163L.

As a result, the thickness of one adhesive layer 163U (or adhesive layer 163L) can be reduced so that the solvent can easily dry through the drying process in the drying chambers D1 to D5 (see solid arrows in FIG. 36B) so that the lowering in the adhesive performance of the adhesive layers 163U and 163L arising from the residual solvent can be suppressed.

Particularly, in the fourth embodiment, the pigment is added as the above particles to the adhesive layer 163L and the adhesive layer 163U. This enables the brilliance from the pigment to be secured.

Particularly, in the fourth embodiment, the volume ratio of the particles (the pigment in the above example) in the adhesive layer 163U is smaller than the volume ratio of the pigment in the adhesive layer 163L. This enables the adhesive performance of the adhesive layer 163U exposed on the surface to be secured. In other words, the bonding performance of the entire tape can be secured.

In particular, the volume ratio of the pigment in the adhesive layer 163L is 1.5 times or more the volume ratio in the adhesive layer 163U. This has the following technical significance.

Although it is preferable for the second-particle-containing adhesive layer to have a smaller volume ratio, the reason is that the second pigment is on the bonding side and therefore requires an adhesive force.

To secure the tinge and the brilliance required for the entirety of the two adhesive layers, the first pigment is increased to compensate for the decrease in the second pigment.

If the degree of the decrease in the second pigment is small, the bonding force is insufficient, requiring an increase in the thickness of the adhesive layer. To avoid the increase in the thickness of the tape layer, 1.5 times or more (preferably, 2 times or more) is preferred.

As has been described using FIG. 33, the adhesive layer 163L disposed on the film layer 151 (having the colored layer 180 formed thereon) is bonded to the colored layer 180 at the time of manufacturing in the state where it is managed in the factory manufacturing facility shown in FIGS. 32 to 34 for example. On the contrary, the adhesive layer 163U is bonded to the print-receiving tape 110 within the print label producing device 1 at the time of the print label production as described hereinabove. For this reason, the bonding force of the adhesive layer 163U needs to be greater than that of the adhesive layer 163L. As described hereinabove, this fourth embodiment can deal with the above by setting the volume ratio of the particles in the adhesive layer 163U to be smaller than the volume ratio of the particles in the adhesive layer 163L.

Particularly, in the fourth embodiment, the thickness tL of the adhesive layer 163L is set to be greater (than the thickness tU of the adhesive layer 163U) so that the volume ratio of the particles in the adhesive layer 163L can further be increased. Such an increase allows the residual amount of the solvent in the adhesive layer 163L to relatively increase but allows the residual amount of the solvent in the adhesive layer 163U to relatively decrease. In particular, the thickness tL of the adhesive layer 163L is 1.5 times or more the thickness tU of the adhesive layer 163U. This has the following technique significance. The second pigment is reduced to ⅔ or less (desirably, ½ or less) to obtain a minimum thickness capable of securing the bonding force of 3 N/10 mm (for the purpose of preventing the total layer thickness from increasing). Such a reduction increases the ratio of the first pigment, requiring the 1.5 times or more thickness.

Particularly, in the fourth embodiment, the adhesive force of the adhesive layer 163U is 3 [N]/10 [mm] or more. As a result, the adhesiveness by the adhesive layer 163U can be ensured.

In the structure shown in FIG. 31, the film layer 151 and the adhesive layer 170 may be removed. Such a modification example will be described with reference to FIGS. 37 to 39.

The same reference numerals are imparted to parts equivalent to those of the fourth embodiment and explanations thereof will appropriately be omitted or simplified.

FIG. 37 illustrates a plan view corresponding to FIG. 28 of the fourth embodiment and showing a rear internal structure of a device body of a print label producing device in this modification example. In FIG. 37, the double-faced adhesive tape 150 wound onto the adhesive tape roll 14 disposed in the housing 11A of the cartridge 11 of this modification example is configured to include: as shown in an enlarged view of FIG. 37, the adhesive layer 163U with predetermined particles (a pigment in this example) added; the adhesive layer 163L with particles of the same material as in the adhesive layer 163U (a pigment in this example; the same applies hereinafter) added; the colored layer 180; and the separation material layer 152; laminated in the mentioned order from the spool 50 lying on the radial center side (corresponding to the upper side in FIG. 38 described later) toward the radial outside (corresponding to the lower side in FIG. 38 described layer). Similar to the above, as shown in FIG. 37, the print-receiving tape roll 15 is made up by winding the print-receiving tape 110 (corresponding to the cover film) having a transmittance of 20% or more for example around the spool 60. The housing 11A comprises the ink ribbon roll 16 similar to the above.

<Details of Tape Layered Structure>

FIG. 38 is an explanatory view showing a layered structure of the print-receiving tape 110 and the double-faced adhesive tape 150.

As shown in FIG. 38, the double-faced adhesive tape 150 includes: the adhesive layer 163L (corresponding to the first-particle-containing adhesive layer) to which the pigment is added at a desired volume ratio; the adhesive layer 163U (corresponding to the second-particle-containing adhesive layer) disposed in contact with the adhesive layer 163L on the upper side of the diagram (one side in the thickness direction in this modification example) and having the pigment of the same material as in the adhesive layer 163L added at a desired volume ratio; and the separation material layer 152 disposed in contact with the adhesive layer 163L on the lower side of the diagram (the other side in the thickness direction in this modification example) so as to cover the adhesive layer 163L.

FIG. 39A shows a layered structure of the print tape 100 formed by bonding the print-receiving tape 110 and the double-faced adhesive tape 150 together, while FIG. 39B shows a state where the print tape 100 is adhered via the adhesive layer 162 to the adherend M with the separation material layer 152 being separated from the print tape 100. As a result of the bonding, as shown in FIG. 39A, the print tape 100 is made up by laminating, from the upper side of the diagram (one side in the thickness direction in this modification example) toward the lower side thereof (the other side in the thickness direction in this modification example), the print-receiving tape 110, the adhesive layer 163U (to which a pigment is added), the adhesive layer 163L (to which the pigment is added), and the separation material layer 152, in the mentioned order.

This modification example also presents an advantage similar to that of the third embodiment.

Modification Example of Fourth Embodiment

The fourth embodiment is not limited to the above mode and can variously be modified without departing from its spirit and technical idea. Modification examples thereof will be described hereinbelow in order.

(4-1) Application to Non-Laminated Type Cartridge

This modification example uses a cartridge called a so-called non-laminated type (in more detail, receptor type), in the same manner as in FIG. 15 of the third embodiment described above. In FIG. 40 corresponding to FIG. 15, the cartridge 11 for use in this modification example comprises, within the housing 11A, similarly to FIG. 15, the adhesive tape roll 14 (of which detailed Layered Structure will be described later), the ink ribbon roll 16, the ink ribbon take-up roller 17, and the feeding roller 18.

The adhesive tape roll 14 is made up by winding the adhesive tape 150N related to this modification example around the spool 50. As shown in an enlarged view of FIG. 40, the adhesive tape 150N includes: the image receiving layer 210; the colored layer 180; the transparent film layer 151A that is transparent (or translucent is also acceptable; the same will apply hereinafter) similar to the above; the adhesive layer 163L to which predetermined particles (a pigment in this example; it may be a glitter pigment in particular; the same will apply hereinafter) similar to those in FIG. 29 are added; the adhesive layer 163U to which particles (the glitter pigment in this example; the same will apply hereinafter) of the same material as in the adhesive layer 163L are added; and the separation material layer 152; laminated in the mentioned order from the spool 50 lying on the radial center side (corresponding to the upper side in FIG. 41 described later) toward the radial outside (corresponding to the lower side in FIG. 41 described later).

<Details of Tape Layered Structure>

FIG. 41A is an explanatory view showing a layered structure of the adhesive tape 150N and the print tape 100N.

As shown in FIG. 41A, the adhesive tape 150N includes: the transparent film layer 151A; the colored layer 180 disposed in contact with the transparent film layer 151A on the upper side of the diagram (the other side in the thickness direction in the structures of FIGS. 40 to 44); the image receiving layer 210 disposed in contact with the colored layer 180 on the upper side of the diagram (the other side in the thickness direction in the structures of FIGS. 40 to 44); the adhesive layer 163L (corresponding to the first-particle-containing adhesive layer) disposed in contact with the transparent film layer 151A on the lower side of the diagram (one sided in the thickness direction in the structures of FIGS. 40 to 44) and having the pigment added at a desired volume ratio; the adhesive layer 163U (corresponding to the second-particle-containing adhesive layer) disposed in contact with the adhesive layer 163L on the lower side of the diagram (one side in the thickness direction in the structures of FIGS. 40 to 44) and having the pigment of the same material as in the adhesive layer 163L added at a desired volume ratio; and the separation material layer 152 disposed in contact with the adhesive layer 163U on the lower side of the diagram (one side in the thickness direction in the structures of FIGS. 40 to 44) so as to cover the adhesive layer 163U.

At this time, also in this modification example, similarly to the fourth embodiment, the average particle diameter of the pigment in the adhesive layers 163U and 163L is 30 μm or more. The average particle diameter can be measured by the technique similar to the above. The volume ratio of the pigment in the adhesive layer 163U is smaller than the volume ratio of the pigment in the adhesive layer 163L. Specifically, the volume ratio of the pigment in the adhesive layer 163L is 2 times or more the volume ratio in the adhesive layer 163U. The volume ratio can be measured by the technique described above. The thickness tL of the adhesive layer 163L is greater than the thickness tU of the adhesive layer 163U. Specifically, the thickness tL of the adhesive layer 163L is 1.5 times or more the thickness tU of the adhesive layer 163U. The adhesive force of the adhesive layer 163U is 3 [N]/10 [mm] or more. The colored layer 180 has a transmittance of 20% or more. In this modification example, the image receiving layer 210 also has a transmittance of 20% or more.

FIG. 41B shows a layered structure of the print tape 100N having print R formed on the image receiving layer 210 of the adhesive tape 150N.

A manufacturing process of the adhesive tape 150N will next be described using FIGS. 42 and 43.

As shown in FIG. 42, the transparent film layer 151A having the image receiving layer 210 and the colored layer 180 formed thereon by a known printing technique is fed out from the film roll FR and is supplied to the adhesive coating head AH. At the adhesive coating head AH, an adhesive (containing the pigment) of the above composition is applied to a surface of the transparent film layer 151A opposite to the colored layer 180, to obtain a four-layered structure including the image receiving layer 210, the colored layer 180, the transparent film layer 151A, and the adhesive layer 163L (with the pigment added), after which the structure passes through the first drying chamber D1, the second drying chamber D2, the third drying chamber D3, the fourth drying chamber D4, and the fifth drying chamber D5, in the mentioned order, to undergo the five-stage drying process, and is wound onto the first tape roll TR1. The number of the drying chambers is not limited to five.

Subsequently, as shown in FIG. 43, the tape of the four-layered structure including the image receiving layer 210, the colored layer 180, the transparent film layer 151A, and the adhesive layer 163L is fed out from the first tape roll TR1 and is supplied to the adhesive coating head AH in the same manner as the above. At the adhesive coating head AH, an adhesive (containing the same pigment as the above) of the above composition is applied to a surface of the adhesive layer 163L opposite to the transparent film layer 151A, to obtain a five-layered structure including the image receiving layer 210, the colored layer 180, the transparent film layer 151A, the adhesive layer 163L, and the adhesive layer 163U (with the pigment added), after which similarly to the above, the structure passes through the first to fifth drying chambers D1 to D5, in the mentioned order, to undergo the drying process. Thereafter, the separation material layer 152 separately fed out from the separation material roll SR is bonded to the adhesive layer 163U of the tape of the 5-layered structure, to complete the adhesive tape 150N of a six-layered structure including the image receiving layer 210, the colored layer 180, the transparent film layer 151A, the adhesive layer 163L, the adhesive layer 163U, and the separation material layer 152. The thus completed adhesive tape 150N is wound onto the second tape roll TR2.

Although in FIGS. 42 and 43, the case has been described by way of example where the adhesive coating head AH is disposed only at a single location, another adhesive coating head AH may separately be disposed downstream of the drying chamber D5 along the transport path. In this case, intactly after the coating process of the adhesive layer 163L and the drying process through the drying chambers D1 to D5 in FIG. 42, the coating process of the adhesive layer 163U and the bonding process of the separation material layer 152 (described using FIG. 43) can be carried out.

As shown in FIG. 41C, the configuration may be such that the image receiving layer 210 is disposed in contact with the transparent film layer 151A on the upper side of the diagram (the other side in the thickness direction in this modification example), without interposing the colored layer 180 between the image receiving layer 210 and the transparent film layer 151A. As shown in FIG. 41C, the colored layer 180 may be disposed in contact with the transparent film layer 151A on the upper side of the diagram (the other side in the thickness direction in this modification example), without disposing the image receiving layer 210.

This modification example can also present an advantage similar to that of the fourth embodiment. The adhesive layer with particles added is divided into two (the adhesive layer 163L and the adhesive layer 163U) so that the adhesive layer 163L with the above particles added is disposed on one side (the lower side in FIG. 41) in the thickness direction of the transparent film layer 151A while the adhesive layer 163U with the same particles added is disposed on one side (the lower side in FIG. 41) in the thickness direction of the adhesive layer 163L. As a result, the thickness of one adhesive layer 163U (or adhesive layer 163L) can be reduced so that the solvent can easily dry through the drying process in the drying chambers D1 to D5 so that the lowering in the adhesive performance of the adhesive layers 163U and 163L arising from the residual solvent can be suppressed.

The glitter pigment is added as the above particles to the adhesive layer 163L and the adhesive layer 163U, enabling the brilliance from the pigment to be secured. The volume ratio of the particles (the pigment in the above example) in the adhesive layer 163U is smaller than the volume ratio of the pigment in the adhesive layer 163L, thereby enabling the adhesive performance of the adhesive layer 163U exposed on the surface to be secured, i.e., enabling the bonding performance of the entire tape to be secured. The thickness tL of the adhesive layer 163L is set to be greater (than the thickness tU of the adhesive layer 163U) so that the volume ratio of the particles in the adhesive layer 163L can further be increased. Such an increase allows the residual amount of the solvent in the adhesive layer 163L to relatively increase but allows the residual amount of the solvent in the adhesive layer 163U to relatively decrease. The adhesive force of the adhesive layer 163U is 3 [N]/10 [mm] or more, whereby the adhesiveness by the adhesive layer 163U can be ensured.

The adhesive layer 163L disposed on the transparent film layer 151A is bonded to the transparent film layer 151A while being managed in the factory manufacturing facility for example at the time of manufacturing, as described above using FIG. 42. On the other hand, the adhesive layer 163U needs to have a bonding force greater than that of the adhesive layer 163L because the adherend has not yet been determined and because the adhesion is made by the user. This modification example can deal with the above by setting the volume ratio of the pigment in the adhesive layer 163U to be less than the volume ratio of the pigment in the adhesive layer 163L.

(4-2) Interchange of Transparent Film Layer and Colored Layer

As shown in FIG. 44A, in the layered structure of the adhesive tape 150N shown in FIG. 41A, the transparent film layer 151A and the colored layer 180 may be interchanged so that the image receiving layer 210, the transparent film layer 151A, the colored layer 180, the adhesive layer 163L, the adhesive layer 163U, and the separation material layer 152 are laminated in the mentioned order from the upper side (the other side in the thickness direction) of the diagram toward the lower side (one side in the thickness direction) of the diagram. As shown in FIG. 44B, the colored layer 180 may be removed from the layered structure of the adhesive tape 150N shown in FIG. 44A (in this case, the same layered structure as in FIG. 41C results). Alternatively, as shown in FIG. 44C, the image receiving layer 210 may be removed from the layered structure of the adhesive tape 150N shown in FIG. 44A. These cases also present an advantage similar to the above.

The transparent film layer 151A and the colored layer 180 may be removed from the structure shown in FIG. 44A. Such a modification example will be described with reference to FIG. 46. The same reference numerals are imparted to parts equivalent to those in the fourth embodiment and its modification examples, and explanations thereof will appropriately be omitted or simplified.

FIG. 45 illustrates a plan view corresponding to FIG. 40 and showing a rear internal structure of a device body of a print label producing device in this modification example. In FIG. 45, similarly to the above, the cartridge 11 for use in this modification example comprises, within the interior of the housing 11A, the adhesive tape roll 14, the ink ribbon roll 16, the ink ribbon take-up roller 17, and the feeding roller 18.

The adhesive tape roll 14 is made up by winding the adhesive tape 150N in relation to this modification example around the spool 50. The adhesive tape 150N includes: the image receiving layer 210 similar to the above; the adhesive layer 163L with predetermined particles (a pigment in this example) similar to the above added; the adhesive layer 163U with particles (the pigment in this example; the same will apply hereinafter) of the same material as in the adhesive layer 163L added; and the separation material layer 152, laminated in the mentioned order from the spool 50 lying on the radial center side in FIG. 45 (corresponding to the upper side in FIG. 46 described later) toward the radial outside (corresponding to the lower side in FIG. 46 described later).

<Details of Tape Layered Structure>

FIG. 46A is an explanatory view showing a layered structure of the adhesive tape 150N according to this modification example.

As shown in FIG. 46A, the adhesive tape 150N includes: the adhesive layer 163L (corresponding to the first-particle-containing adhesive layer) having the pigment added at a desired volume ratio; the image receiving layer 210 disposed in contact with the adhesive layer 163L on the upper side of the diagram (the other side in the thickness direction in this modification example); the adhesive layer 163U (corresponding to the second-particle-containing adhesive layer) disposed in contact with the adhesive layer 163L on the lower side of the diagram (one side in the thickness direction in this modification example) and having the pigment of the same material as in the adhesive layer 163L added at a desired volume ratio; and the separation material layer 152 disposed in contact with the adhesive layer 163U on the lower side of the diagram (one side in the thickness direction in this modification example) so as to cover the adhesive layer 163U.

FIG. 46B shows a layered structure of the print tape 100N in which print R is formed on the image receiving layer 210 of the adhesive tape 150N.

This modification example also presents an advantage similar to the above.

In all of the embodiments and modification examples set forth hereinabove, when measuring numerical values of various parameters (the volume ratio, the average particle diameter, the adhesive force, and all the others) related to a tape, the measurement is made by cutting the tape into at least 10 mm×10 mm.

Other than the above, the techniques of the above embodiment and modification examples may appropriately be combined for use.

What is claimed is:

1. An adhesive tape cartridge comprising:
a housing; and
an adhesive tape roll that is disposed in said housing and winds a double-faced adhesive tape,
said double-faced adhesive tape comprising:
   a base material layer;
   a first adhesive layer that is disposed on one side of said base material layer in a thickness direction, said first adhesive layer comprising an adhesive with a first pigment added, and a first surface opposite to said base material layer in the thickness direction;
   a second adhesive layer that is disposed on one side of said first adhesive layer in the thickness direction, said second adhesive layer comprising an adhesive with a second pigment added, and a second surface in contact with the first surface;
   a third adhesive layer that is disposed on another side of said base material layer in the thickness direction, said third adhesive layer comprising an adhesive, and a third surface opposite to said base material layer in the thickness direction; and
   a separation material layer that is disposed on a side of said third adhesive layer in the thickness direction, the separation material layer comprising a fourth surface to make contact with the third surface of said third adhesive layer,
wherein the third surface adheres to an adherend at a time that the fourth surface of said separation material layer is separated from the third surface of said third adhesive layer,
wherein a volume ratio of said first pigment in said first adhesive layer is greater than a volume ratio of said second pigment in said second adhesive layer,
wherein said first adhesive layer is in contact with said second adhesive layer,
wherein said second adhesive layer is in contact with said separation material layer in a roll shape being wound,
wherein the volume ratio of said first pigment in said first adhesive layer is 1.5 times or more the volume ratio of said second pigment in said second adhesive layer,
wherein the volume ratio of said first pigment in said first adhesive layer is 5% or more and 50% or less,
wherein the volume ratio of said second pigment in said second adhesive layer is more than 5% and 50% or less,
wherein a thickness of said second adhesive layer is smaller than a thickness of said third adhesive layer,
wherein a thickness of said first adhesive layer is smaller than the thickness of said third adhesive layer,
wherein a sum of the thickness of said first adhesive layer and the thickness of said second adhesive layer is greater than the thickness of said third adhesive layer,
wherein a bonding force of said second adhesive layer is equal to or larger than 3 N/10 mm,
wherein the adhesive tape cartridge further comprises, in said housing:
   a cover film roll that winds a cover film comprising a sixth surface to be bonded to a fifth surface of said second adhesive layer of said double-faced adhesive tape, the fifth surface being opposite to the second surface in the thickness direction;
   an ink ribbon roll that winds an ink ribbon that transfers ink to the sixth surface of said cover film fed out from said cover film roll; and
   a colored layer that is disposed on said one side of said base material layer in the thickness direction and disposed on another side of said first adhesive layer in the thickness direction, said colored layer comprising an eighth surface in contact with a seventh surface of said base material layer, and a ninth surface in contact with a tenth surface of said first adhesive layer, the seventh surface being opposite to said third adhesive layer in the thickness direction, and the tenth surface laying on a side of said third adhesive layer.

2. The adhesive tape cartridge according to claim 1, wherein an average particle diameter of said first pigment is smaller than an average particle diameter of said second pigment.

3. The adhesive tape cartridge according to claim 2,
wherein the average particle diameter of said first pigment is less than 30 μm, and
wherein the average particle diameter of said second pigment is equal to or greater than 40 μm.

4. The adhesive tape cartridge according to claim 3,
wherein the average particle diameter of said first pigment is equal to or less than 10 μm, and
wherein the average particle diameter of said second pigment is equal to or greater than 60 μm.

5. The adhesive tape cartridge according to claim 1, wherein said first pigment and said second pigment are made of the same material as each other.

6. The adhesive tape cartridge according to claim 1,
wherein said first pigment is a solid pigment or a glitter pigment, and
wherein said second pigment is a glitter pigment.

7. The adhesive tape cartridge according to claim 1, wherein said second pigment has a transmittance of 20% or more.

8. The adhesive tape cartridge according to claim 1, wherein
said first pigment is a first glitter pigment;
said second pigment is a second glitter pigment; and
said first glitter pigment is one coating a surface of a core material with a colorant, wherein the core material is at least one of scaly mica, glass, alumina, and metal, and the colorant is at least one of titanium oxide, iron oxide, and a solid pigment.

9. A method of manufacturing a print label, comprising:
performing printing on the sixth surface of said cover film by ink of said ink ribbon by using the adhesive tape cartridge according to claim 1;
bonding the sixth surface of said cover film, after performing printing, to the fifth surface of said second adhesive layer of said double-faced adhesive tape;
producing a print label by using said cover film and said double-faced adhesive tape bonded to each other; and
peeling off the fourth surface of said separation material layer from said print label, and affixing the third surface of said third adhesive layer to the adherend.

* * * * *